US011397462B2

(12) United States Patent
Eledath et al.

(10) Patent No.: US 11,397,462 B2
(45) Date of Patent: Jul. 26, 2022

(54) REAL-TIME HUMAN-MACHINE COLLABORATION USING BIG DATA DRIVEN AUGMENTED REALITY TECHNOLOGIES

(71) Applicant: SRI International, Menlo Park, CA (US)

(72) Inventors: Jayakrishnan Eledath, Robbinsville, NJ (US); Supun Samarasekera, Princeton, NJ (US); Harpreet S. Sawhney, Princeton Junction, NJ (US); Rakesh Kumar, West Windsor, NJ (US); Mayank Bansal, Lawrenceville, NJ (US); Girish Acharya, Redwood City, CA (US); Michael John Wolverton, Mountain View, CA (US); Aaron Spaulding, Menlo Park, CA (US); Ron Krakower, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 926 days.

(21) Appl. No.: 14/878,448

(22) Filed: Oct. 8, 2015

(65) Prior Publication Data
US 2016/0378861 A1    Dec. 29, 2016

Related U.S. Application Data

(60) Provisional application No. 62/184,858, filed on Jun. 26, 2015.

(51) Int. Cl.
*G06T 19/00*    (2011.01)
*G06V 20/40*    (2022.01)
(Continued)

(52) U.S. Cl.
CPC ............ *G06F 3/011* (2013.01); *G06T 19/006* (2013.01); *G06V 20/41* (2022.01); *G06V 20/52* (2022.01)

(58) Field of Classification Search
CPC ............... G06F 3/011; G06K 9/00771; G06K 9/00718; G06T 19/006; G06T 2219/024; G06T 7/73; G06V 20/20
See application file for complete search history.

(56) References Cited

U.S. PATENT DOCUMENTS

| 6,587,586 B1 * | 7/2003 | Cui ........................ G06K 9/325 |
| | | 382/176 |
| 7,796,155 B1 * | 9/2010 | Neely, III ............. G06V 20/52 |
| | | 348/157 |

(Continued)

FOREIGN PATENT DOCUMENTS

WO    WO 2011114659 A1 *    9/2011    ........... G06T 19/006

OTHER PUBLICATIONS

Breen et al., Interactive Occlusion and Collision of Real and Virtual Objects in Augmented Reality, Technical report ECRC-95-02, European Computer-Industry Research Centre GmbH, pp. 1-22, 1995.*

*Primary Examiner* — Cheyne D Ly
(74) *Attorney, Agent, or Firm* — Moser Taboada

(57) ABSTRACT

A computing system includes a vision-based user interface platform to, among other things, analyze multi-modal user interactions, semantically correlate stored knowledge with visual features of a scene depicted in a video, determine relationships between different features of the scene, and selectively display virtual elements on the video depiction of the scene. The analysis of user interactions can be used to filter the information retrieval and correlating of the visual features with the stored knowledge.

19 Claims, 33 Drawing Sheets

(51) Int. Cl.
*G06V 20/52* (2022.01)
*G06F 3/01* (2006.01)

(56) References Cited

U.S. PATENT DOCUMENTS

| | | | | |
|---|---|---|---|---|
| 8,335,784 | B2* | 12/2012 | Gutt | G06F 3/04815 707/722 |
| 8,542,252 | B2* | 9/2013 | Perez | G06K 9/00201 345/420 |
| 9,092,674 | B2* | 7/2015 | Andrade | G06F 17/289 |
| 2004/0199785 | A1* | 10/2004 | Pederson | H04N 7/18 340/293 |
| 2005/0231602 | A1* | 10/2005 | Obrador | G06T 7/20 348/208.14 |
| 2008/0059522 | A1* | 3/2008 | Li | G06F 17/30793 |
| 2012/0194548 | A1* | 8/2012 | Ahn | H04W 4/203 345/633 |
| 2012/0290401 | A1* | 11/2012 | Neven | A61B 3/113 705/14.68 |
| 2013/0170697 | A1* | 7/2013 | Zises | G06T 11/00 382/103 |
| 2013/0201215 | A1* | 8/2013 | Martellaro | G09G 5/00 345/633 |
| 2014/0294257 | A1* | 10/2014 | Tussy | G06Q 10/00 382/118 |
| 2015/0161147 | A1* | 6/2015 | Zhao | G06F 16/7837 |
| 2015/0181126 | A1* | 6/2015 | Harada | G06F 17/3082 348/333.02 |
| 2015/0371440 | A1* | 12/2015 | Pirchheim | G06T 17/05 345/419 |

\* cited by examiner

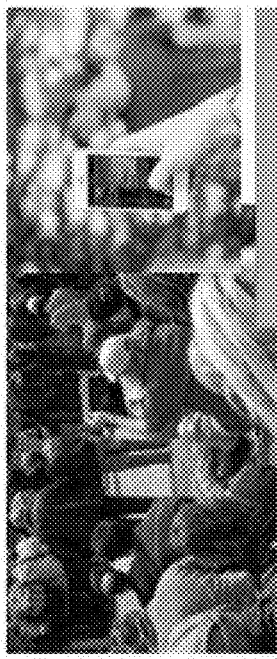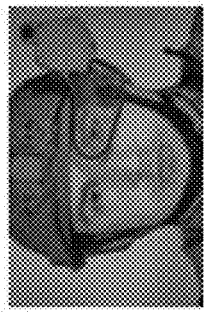
FIG. 27

User Interfaces

- User Selection
  - Approximate (Center of User view)
    - With speech based qualifiers
  - Exact
    - Tablet/Phone: Freeze-Frame and Touch
    - Head-Mounted: Cross-hair and speak
    - Head-mounted: Gestures with screen feedback
  - Gaze
- Simple Command set
  - Who
    - Do you know him?, Who is this?, Who is that man in red shirt?
  - What
    - Do you know this car?, What is that?
  - Where
    - What do you know about this place?, What is the address ?
  - Collections
    - Snap Hi-res, Snap regular, Video Hi-res, Video regular
    - Snap this face, Snap the plates

FIG. 28

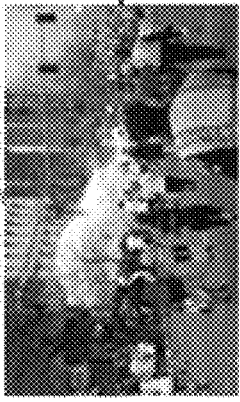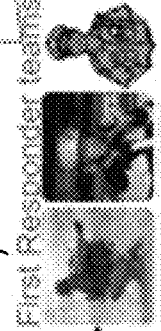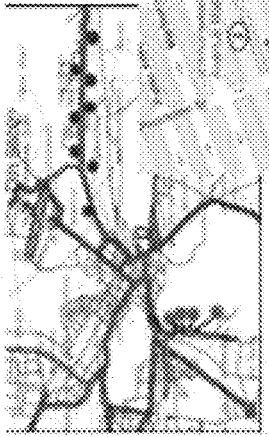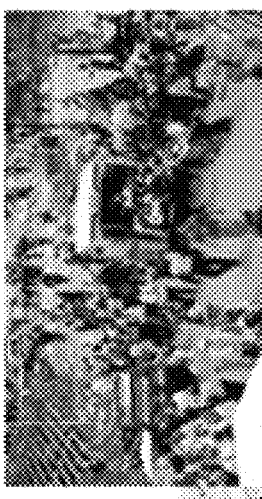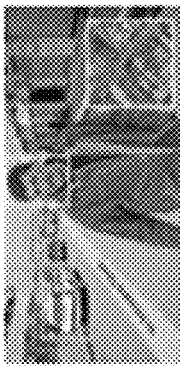
FIG. 30

FIG. 32

REAL-TIME HUMAN-MACHINE COLLABORATION USING BIG DATA DRIVEN AUGMENTED REALITY TECHNOLOGIES

CROSS-REFERENCES TO RELATED APPLICATIONS

This application claims the benefit of and priority to U.S. Provisional Patent Application Ser. No. 62/184,858, filed Jun. 26, 2015, which is incorporated herein by this reference in its entirety.

This application is related to U.S. patent application Ser. No. 14/313,578 filed Jun. 24, 2014 (US 2014-0310595) ("Augmented Reality Virtual Personal Assistant for External Representation"), which claims priority to U.S. patent application Ser. No. 13/721,276, filed Dec. 20, 2012 (US 2014-0176603) ("Method and Apparatus for Mentoring via an Augmented Reality Assistant, each of which is incorporated herein by this reference in its entirety.

Each of U.S. patent application Ser. No. 14/452,237, filed Aug. 5, 2014 ("Multi-Dimensional Realization of Visual Content of an Image Collection") (U.S. patent application Publication Ser. No. 2016-0042252); Ser. No. 13/916,702, filed Jun. 13, 2013 ("An Augmented Reality Vision System for Tracking and Geolocating Objects of Interest"); Ser. No. 14/575,472, filed Dec. 18, 2014 ("Real-time System for Multi-Modal 3D Geospatial Mapping, Object Recognition, Scene Annotation and Analytics") (U.S. Pat. No. 9,488,492); Ser. No. 14/092,474, filed Nov. 27, 2013 (US 2015-0149182) ("Sharing Intents to Provide Virtual Assistance in a Multi-Person Dialog"); Ser. No. 13/631,292, filed Sep. 28, 2012 (US 2013-0311924) ("Method, Apparatus, and System for Modeling Passive and Active User Interactions with a Computer System"), and Ser. No. 13/755,775, filed Jan. 31, 2013 (US 2014-0212853) ("Multi-modal Modeling of Temporal Interaction Sequences") describes additional examples of technology that may be used in connection with various aspects of the present invention, and each of the foregoing patent applications is incorporated herein by this reference in its entirety.

GOVERNMENT RIGHTS

This invention was made in part with government support under contract no. FA8650-14-C-7430 awarded by USAF/AFMC/AFRL/PKSE. The United States Government has certain rights in this invention.

BACKGROUND

In computer vision, mathematical techniques are used to detect the presence of and recognize various elements of the visual scenes that are depicted in digital images. Localized portions of an image, known as features, may be used to analyze and classify an image. Low-level features, such as interest points and edges, may be computed from an image and used to detect, for example, people, objects, and landmarks that are depicted in the image. Machine learning algorithms are often used for image recognition.

Augmented reality (AR) technology provides a real-time view of a physical, real-world environment in which the view is augmented with computer-generated virtual elements, which may include sound, video, graphics and/or positioning data. Some mobile computing devices provide augmented reality applications that allow users to see an augmented view of a surrounding real-world environment through a camera of the mobile computing device. One such application overlays the camera view of the surrounding environment with location-based data, such as local shops, restaurants and movie theaters.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

FIG. 27 illustrates examples of augmented reality devices that may be used in connection with one or more embodiments of the computing system of FIG. 1;

FIG. 28 is a text description of at least one embodiment of user interface technology that may be used to implement portions of the computing system of FIG. 1;

FIG. 30 is a simplified illustration of a use case scenario for at least one embodiment of the computing system of FIG. 1;

FIG. 32 is a text description of features and technical solutions provided by at least one embodiment of the computing system of FIG. 1;

DETAILED DESCRIPTION OF THE DRAWINGS

Figure 1:
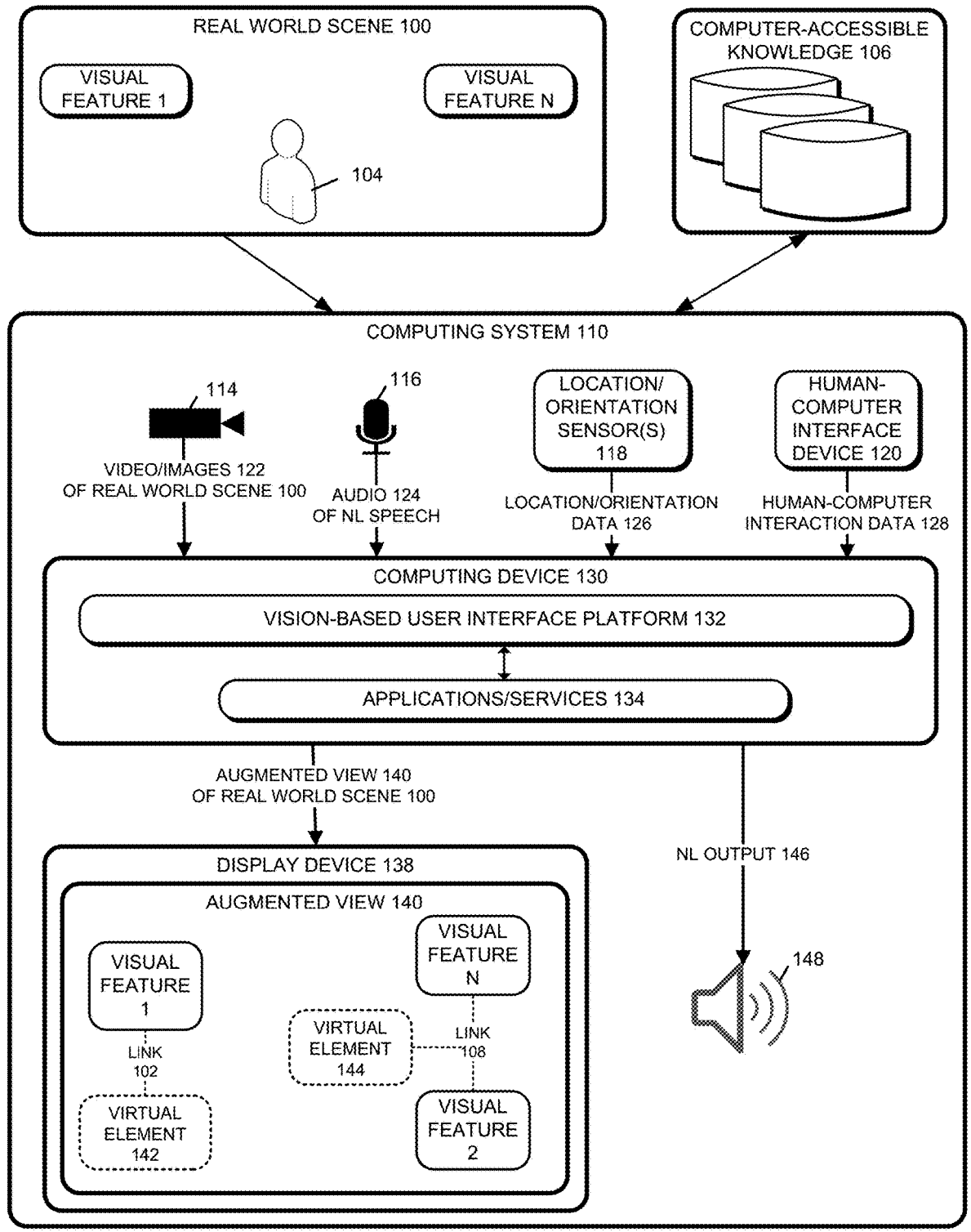
FIG. 1 is a simplified functional block diagram of at least one embodiment of a computing system including a vision-based user interface platform as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Disclosed herein is a platform, family of technologies, and systems 110 that can be used to provide a dynamic, interactive, vision-based user interface to other applications or services of the computing system. As used herein, "platform" may refer to a computing device, a system, an article of manufacture, or a computer-implemented process, which is configured with the technology disclosed herein. Among other things, embodiments of the disclosed technologies can utilize computer vision technologies to generate a semantic understanding of a live view of a real-world environment as depicted in a set of images or video produced by, e.g., a camera, and fluidly and intelligently integrate relevant, semantically-correlated computer-accessible knowledge into the user's live view of the real-world environment, in the form of annotations that are generated using, e.g., augmented reality techniques.

Embodiments of the disclosed technologies can enable the computing system 110 to conduct a "multi-modal dialog" with a user, in which different portions of the dialog comprise different forms of inputs, e.g., visual imagery, natural language speech, gestures, gaze data, computer-synthesized elements, etc. For instance, using an embodiment of the disclosed technologies, a user may, while viewing a real world scene through a camera, speak a natural language request such as "show me pictures of something like this with something like that" or "who owns that truck?"—in which "this" and "that" are elements shown in the real world scene. In response, the system 110 can extract semantic information from the portions of the visual imagery that correspond to "this" and "that," build a computer-executable query that expresses the intent of the user's speech-based request, execute the query, and present information retrieved by the query as, for example, an augmented reality overlay or system-generated natural language speech. In doing so, some embodiments of the system 110 may utilize the "dynamic information aperture" technology disclosed herein to dynamically filter or select the most relevant or valuable augmentations to display to the user, where the measure of "relevance" or "importance" of different content may be determined based on current contextual information, including semantic information extracted from the visual imagery, user interactions, and/or stored information, such as information about the user's previous interactions and information retrieved from "big data" knowledge bases.

In some embodiments, "dynamic reasoning" capabilities enable the system 110 to discover relationships between different pieces of content and create links or connections based on those discovered relationships. For instance, the system might determine that a current real world scene includes a person with dark hair getting into a red car. The system 110 may use facial recognition to identify the person, optical character recognition technology to read the car's license plate, conduct a database search to determine whether the car is registered to that person, and generate a scene augmentation that displays the person's name and an indication of whether that person is the owner of the car. In this case, the system 110 creates a link between the image of the person and the person's name, and also creates a link between the person and the car. These links can be presented visually to the user via augmented reality techniques. In a continuation of the above example, the system 110 might be able to detect (e.g., in a later frame of a video) the driver of the red car and may be able to determine the identity of the driver through facial recognition or image matching techniques. Once the system 110 identifies the driver and the person getting into the car, the system 110 may then create a link that associates the person getting into the car with the driver. Such links or connections can be implemented, for instance, by the configuration of the data structures in which information about the real world scene is stored by the computer system. The dynamic reasoning capabilities of the system 110 can be powerful in that they can uncover relationships between different visual elements, and discover relationships between visual elements and stored knowledge, which were previously unknown to either the user or the system 110.

Whereas some embodiments of the disclosed technologies may be primarily directed to facilitating human-machine interactions involving a single user, other embodiments enable interactions that involve live visual communications between or among multiple users. For example, a user recording a live event with a video camera may use the disclosed technologies to highlight a portion of an image of a real world scene (e.g., as depicted on a computing device's display screen) using augmented reality technology, and then "share" the highlight with another user who may be viewing the same scene. When the item is shared, the system 110 augments the second user's view in "live" time. The disclosed approach differs from that of existing systems like INSTAGRAM and SNAPCHAT, in which communication of the shared content occurs offline (i.e., the user has to take some action, like opening the app and tapping a notification, in order to view the shared image), in that the disclosed system can automatically update the second user's current real world view (e.g., in live, interactive time). Those skilled in the art will appreciate, however, that aspects of the disclosed technologies are not limited to application in a "live" or "real time" environment. Rather, features of the disclosed technology are equally applicable to offline implementations (e.g., in which a user is viewing a video that was recorded at an earlier time).

Embodiments of the disclosed technologies can be applied to provide, for example, situational and/or informational awareness, developing building and construction plans and schematics, traffic analysis, crowd information, photo/video recording and editing/augmentation, language translation, friend awareness, weather data, person or vehicle identification, maps and city/region guides, real-time querying, filtering, proactive suggestions, and smart display of context-pertinent information for a wide variety of military, industrial, commercial and consumer applications, including tourism and travel, shopping, social interactions, entertainment, gaming, education, training, daily routines and chores, military training, intelligence gathering activities, and many others.

The technologies disclosed herein can utilize Augmented Reality (AR) to dramatically impact the ways in which information is collected and the ways in which humans and machines collaborate, to achieve unprecedented accuracy and efficiency. For example, the disclosed implementations of AR technology can enable real-time analyze-while-collect modes in which humans are assisted to sift through the chaos of geospatial and semantic contexts of real world locations. Information collectors and analysts can receive timely and pertinent information in a dynamic environment, which can help them respond effectively to unpredictable events or rapidly changing events. A benefit of some embodiments of the disclosed technologies is the real-time interaction between smart data collection and incisive analysis, which is mediated through AR. In some embodiments, the system 110 dynamically creates an "active user context" which guides the creation and presentation of a "dynamic information aperture" with user intent modeling for real-time visual information retrieval, exchange, communication, and collaboration. In some embodiments, the active user context is built and interpreted through closely coupled interactions between geo-spatial information and on-the-fly scene understanding driven by knowledge and context. As an example, FIG. 7 demonstrates a visual collaboration between two different users of the computing system (e.g., an information analyst and an analyst in the field. In some embodiments, information on entities, locations and events extracted from a visual scene of a video is distilled from a knowledge base, guided by a data collection plan, and presented to the user through an AR interface. Exemplary technology of SRI International for geolocating objects detected in images is described in U.S. patent application Ser. No. 13/916,702, filed Jun. 13, 2013 ("An Augmented Reality Vision System for Tracking and Geolocating Objects of Interest").

Some embodiments of the disclosed technologies can provide the following benefits: effective and efficient collection of information by human collectors in complex, potentially hostile and chaotic environments; real-time automated and human-assisted assessment of data to determine what is important amongst the "chaos" of real-world entities and activities; and unobtrusive, seamless interaction between the user and the AR system.

For effective and efficient data collection, in some embodiments, a collection plan is defined (e.g., by an analyst) using software and stored in memory, and the collection plan and its associated information and data are made available via a user-worn or carried AR display. The collection plan can be represented as atomic and active workflows that are triggered either by humans or through automated observations and analysis. To provide real-time assistance, automated and human-assisted data assessment, the disclosed technologies generate an active user context that can match "ground truth" in the collection plan with the "perceived world" and prompt the user towards salient locations and entities. The disclosed technologies obtain live scene data (video, audio etc.) from the user's perspective, and develop a geospatial context and semantic context for the user's immediate environment within which user intent reasoning and information filtering is performed. Based on a current user intent, the disclosed technologies provide a "dynamic information aperture" that can control the flow of information to the user while augmenting the user's view of a scene with information from foveal and peripheral regions within the field of regard.

In some embodiments, seamless interaction between the user and the system 110 is achieved by augmenting the user's sight and sound with additional information, interfaces and personalization. For example, some embodiments provide touch/gesture/speech interfaces for initiating queries and to establish dynamic links between live data and prior knowledge (or information). The interface can be personalized using heads-up displays, smartphones, etc. As new data and observables are gathered, annotated and linked to prior knowledge, the system 110 can make the updated analysis and information available to the user.

This disclosure describes embodiments of a system 110 that dynamically updates data collection plans and filters information based on user intent, which is guided by the active user context and mediated by the AR system. To illustrate the benefits afforded by applications of the disclosed technologies for smart assistance with analytics and user interaction, consider the following two operational scenarios. In a building security scenario 1, a collection plan involves conducting surveillance of a building entrance in a busy location to establish links between known entities and their unknown acquaintances and associates. An "All Source" knowledge base is used to establish the characteristics of the location in terms of human oriented map descriptions as well as supporting visual landmarks and pictures. The collection plan also identifies key entities, say a black Mercedes, and characteristics of an individual of interest. The user knows how to get to the site but the system 110 confirms the optimal vantage point as well as the location and orientation of the building and portal tactically suited for collecting the data. On cue from the user, when a black Mercedes pulls and stops in front of the building, the system 110 "listens" to the user and processes sensor data collected by the user's computing device. The system 110 is instructed by the user (e.g., by natural language speech dialog) to capture the license plate of the vehicle and also opportunistically capture best views of faces of individuals who dismount the vehicle, and those who enter and exit the building with them. During the collection episode, the system 110 keeps track of multiple individuals within the defined parameters, collects and tags the data. Unexpectedly, as another SUV comes and stops behind the Mercedes, the user instructs the system 110 to visually follow the vehicle and its occupants too. In this scenario, while the human user focuses on complex tasks such as verifying identity of vehicles and individuals in potentially low resolution situations, the system 110 takes care of wider area links and chores that may distract the user from the focused task. After the collection episode, the user, the system 110 and the backend analysis system analyze the data with reference to the knowledge base and create a profile of individuals of interest, their links and metadata.

In a scenario 2 involving security for a public place, the collection plan is adjusted to accommodate unforeseen events at the public place. The public place is a busy bazaar where an exchange of goods is expected to occur. The collection plan roughly identifies the site and with some probability that vehicles depicted in the scene may be engaged while a transaction takes place. The user is instructed to get identifying information for as many entities as possible related to the exchange of goods. As the user situates herself at a vantage point at the site, the system 110 is instructed to provide a wider, peripheral coverage of the site for vehicles that match the provided descriptions and also to watch for unusual events. The user focuses on looking for a vehicle at the site while the system 110 surveys the area for vehicles and events of interest (based on background knowledge). As the system 110 tracks a vehicle entering from the west and stopping at the far end of the bazaar, an event occurs at the location of the vehicle. The system 110 has already recorded pictures of the vehicle, its license plate and also taken pictures of individuals who alighted from the vehicle and ran away before the explosion.

As can be discerned from this example, some embodiments of system can act as the augmented eyes, ears and mind of a user by sifting through large quantities of data and help the user focus on data of value (as determined by elements of the visual scene and the user intent). This is a non-trivial endeavor that involves real-time analysis guided by the needs of the user. FIG. 2 presents a functional architecture of an illustrative system architecture for the vision-based user interface platform 132 of FIG. 1, as described below.

Figure 29:
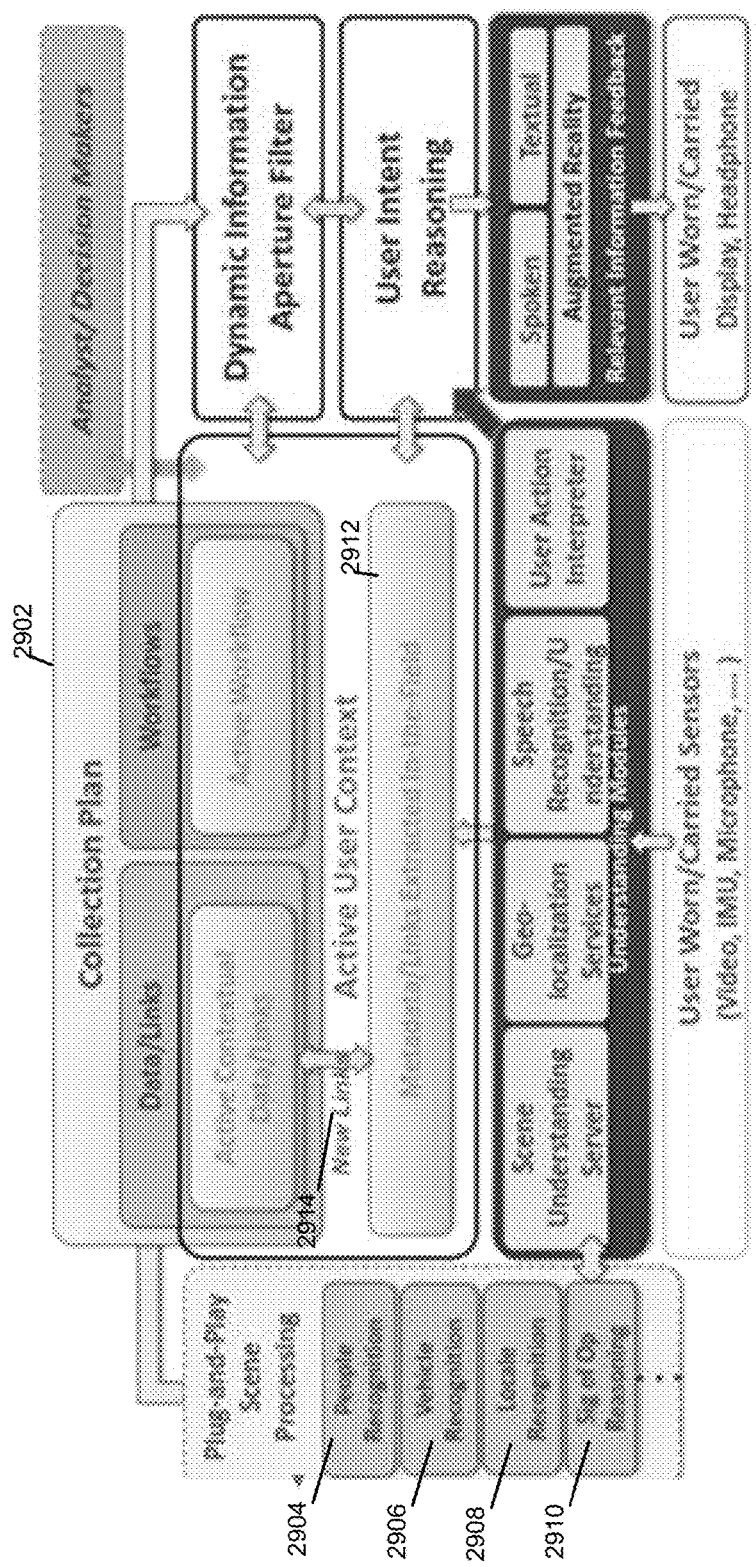
FIG. 29 is a simplified functional block diagram of at least one embodiment of a system architecture for the vision-based user interface platform of FIG. 1.

1. Data Organization and Collection Plan (e.g., FIG. 2, knowledge based services 236; FIG. 29): the system 110 is guided by a collection plan that contains collection workflows, relevant entity data and entity relationships a user may need. The system 110 enables conversion of collection plans into active and agile workflows for real-time execution. The data includes or consists of locations, layouts, entities, activities, events, and their relationships. Upon initiation of the collection plan, the user is able to activate specific workflows/action plans. Workflows can be represented as decision trees or behavior trees with decision points consisting of data entities and user interaction.

2. User-borne Sensing and User Interfaces (e.g., FIG. 1, sensors 114, 116, 118, 120; FIG. 2, sensor services 210): in some embodiments, the system 110 needs to enable a user to efficiently and effectively execute an information collection plan with certainty. To do this, an assessment of "ground truth" in the plan vs. the observations in the "perceived world" is made. This is enabled by the system 110's monitoring and understanding of the real world environment through sensors. The system 110 observes the environment and user gestures through video, and other touch/keyboard interfaces, and listens to the user environment and speech through a microphone. A core collection of user intent understanding modules (e.g., FIG. 2, multi-modal user intent understanding subsystem 228, FIGS. 15, 20, 25) interprets the input/sensor data. A geo-localization services module 214 processes sensor data to accurately geo-locate the user both indoors and outdoors even in GPS (Global Positioning System) challenged areas. A scene-understanding server (e.g., scene understanding services 220) provides interfaces to modules that recognize classes and specific instances of objects (vehicles, people etc.), locales and activities being performed (e.g., FIGS. 33-34). A speech recognition and understanding module (e.g., speech recognition 216) interprets speech to obtain actionable phrases. A user action interpreter module (e.g., subsystem 228) monitors the user's interactions (e.g., actions and gestures) to interpret specific commands and instructions. Each of these modules processes data under uncertainty and generate results with human understandable representations of uncertainty (e.g., statistical or probabilistic measures). Levels of uncertainty can be used to prompt the user for clarity and confirmation. In some cases, localization and scene understanding may be unreliable in terms of metric accuracies. In order to mitigate this aspect, the system 110 supports multiple representations and models of performance under various real-world conditions. Multiple representations will enable the system 110 to switch between say metric and topological/relational descriptions for localization that can be intuitively understood by the user. Performance characterization driven scene understanding will enable adaptive selection amongst a repertoire of algorithms as well as report objectively characterized uncertainties for object and event detectors. Exemplary user intent understanding technology of SRI International, including multi-user intent merging technology, is described in U.S. patent application Ser. No. 14/092,474, filed Nov. 27, 2013 (US 2015-0149182) ("Sharing Intents to Provide Virtual Assistance in a Multi-Person Dialog"). Exemplary technology for multi-modal user interaction understanding is described in the following patent applications of SRI International: U.S. patent application Ser. No. 13/631,292, filed Sep. 28, 2012 (US 2013-0311924) ("Method, Apparatus, and System for Modeling Passive and Active User Interactions with a Computer System"), and U.S. patent application Ser. No. 13/755,775, filed Jan. 31, 2013 (US 2014-0212853) ("Multi-modal Modeling of Temporal Interaction Sequences").

3. Understanding User Intent (e.g., FIG. 2, multi-modal user intent understanding subsystem 228, FIGS. 15, 20, 25, 28): a user can guide the system 110 to modify and potentially narrow down or broaden the scope of an information collection task. In determining user intent, the system 110 can analyze a number of different interaction cues depending on how the user expresses his intent and how the system 110 understands user intent. Examples include: "Do not look for just the red pickup but any pickup leaving this building," or "I am focusing on the cafeteria across the street but keep an eye on the intersection for a bearded, middle-aged man who may emerge from the north east corner." The user-intent reasoning module (e.g. module 230) interprets user inputs and correlates these with the representations derived from the sensing and understanding modules (e.g., services 210, subsystem 228). The system 110 generates an active user context (e.g., observations 240, 242), which includes live data elements, prior data that are linked to the live data, and the currently active workflow. This provides the framework to interpret user actions and commands. The active user context also provides an active mechanism to dynamically filter a large knowledge base associated with the collection plan.

4. Filtering and Extracting Relevant Information (e.g., dynamic information aperture reasoning subsystem 230): A user often works in the "chaos" of a dynamic world rather than within a pre-defined closed world. As such, the system 110 addresses the problem of on-the-fly adaptation of an "information aperture" to enable dynamic tasking. Guided by user directives, the reasoning module (e.g., subsystem 230) provides a dynamic information aperture into the knowledge filtered by the user context. The system 110 can figure out important events (such as threats) and emerging saliencies autonomously, and prompt the user to validate these in the context of the user's current activity and user intent. Examples of such interactions include: "You are currently focused on following that person but you should look at this other person who seems to be following you," or "I have seen this same vehicle three times now driving around within the last 5 minutes?" The illustrative system 110 uses plug-and-play scene processing modules (e.g., services 220, FIG. 29 plug-and-play scene processing) that include scene, object and event recognition technologies to incorporate a powerful signals-of-opportunity capability in the system 110.

1.2.3. Collection Plan (e.g., FIG. 29)

A collection plan may be embodied as a data organization and links module and/or the workflow module in the system 110 architecture. The data organization module is configured to: (1) to represent and provide queryable access to processed data pertaining to the current state of collected knowledge; and (2) to represent, monitor, and update the latest information needs of the user.

Data Organization. Data collected in the system 110 can be stored and organized for situational awareness, analysis and reasoning by automated algorithms and human users (stored in, e.g., computer accessible knowledge 106, stored models 420). In some embodiments, data organization is based on intuitive schemas and a flexible ontology so that a wide variety of usage scenarios can be represented while enabling a human understandable form of data. Data representation can be configured to support efficient querying and visualization for users to dial up needed information. In some embodiments, a high-performance triple store and a graph structure that encodes the knowledge base are used for data representation. In a triple store, data objects—entities, events, the relations between them, attributes, etc.—are stored as subject-predicate-object triples. Query languages such as SPARQL can be used to provide flexible and efficient access to the underlying data. SPARQL may be used as an interlingua in approaches to data retrieval via natural language queries to facilitate end-user access of the data. In a graph representation, nodes represent the objects of interest along with their attributes, and edges between the nodes represent inter-object relationships.

Visual features are detected and indexed, e.g., by the scene understanding services 220. Real-time access to visual feature data is facilitated by the system 110's ability to rapidly cache data based on context. Visual feature indexing technology using multiple randomized trees is illustratively used for this purpose, in some embodiments. Embodiments of the system 110 extract key attributes of the current user-context, and use it to derive and re-prioritize visual indices. Exemplary scene understanding technology of SRI International is described in U.S. patent application Ser. No. 14/452,237, filed Aug. 5, 2014 ("Multi-Dimensional Realization of Visual Content of an Image Collection").

Collection Plan Representation and Active Workflows. A system for aiding the user in collecting timely and relevant information includes a number of capabilities:

The system 110 knows its information needs, at a macro level and a micro level. The macro level needs are the high level conclusions that the agency needs to reach. The micro level needs are the lower-level facts and indicators that contribute to the macro level needs. (An example of a macro level information need might be "Is Jim Jones an employee of ABC company?" An example of a micro level information need might be "Has Jim Jones's vehicle been observed at or near 752 Elm Ave [a meeting location]?"). A data collection plan may include of a number of micro-level questions, and the system 110 can link these to macro-level scenarios and events that, so that the relevance of collected information is recognized and acted upon by the system 110. The system 110 communicates key elements of the collection plan to the user. The system 110 recognizes when information collected by the user (or collected by the AR system in the collector's surroundings) is relevant to a need, and potentially updates the collection plan accordingly. (e.g., "push" of new information needs to the user).

Given an updated collection plan or newly collected information elsewhere in the network, the system 110 proactively or preemptively recognizes when information stored in the network is relevant to the user and/or may provide critical context for the user's activities. (e.g., "push" of valuable contextual information to the user). The system 110 performs these and other types of information pushes in a way that's responsive to the user's preferences—i.e., based on the settings of the information aperture.

In some embodiments, information collection and event recognition technologies, and link analysis techniques, are used to monitor long-term events and update data collection needs based on the latest information collected. Macro-level information needs are represented as a pattern to be instantiated; micro-level information needs are embodied as individual elements of the pattern that have not yet been matched—e.g., who owns this vehicle, or is there a professional relationship between person X and person Y. Applying these technologies, the system 110 updates the state of its monitoring as new information is collected, re-evaluates and re-prioritizes information needs based on the latest data, and dynamically pushes updated collection plans and contextual information to the user.

1.2.4. User-Borne Sensing and User Interfaces

User-borne sensing includes auditory, visual, gestural inputs as well as sensing from user carried appliances (such as cellular signal trackers). The sensing layers coupled with the visual and auditory feedback are part of the user interface of the illustrative system. The illustrative interfaces are designed to be intuitive, responsive and adaptive to the user needs.

Auditory Inputs and Speech Recognition/Understanding: Auditory input can be user speech or specific sounds from the environment. Speech recognition accuracy in a noisy environment is handled by the use of features that are based on the human auditory systems that are more robust to degradation in speech, and/or by identifying the speaker and language being spoken, and/or by spotting the keywords from a predefined set related to the topic. The system 110 combines the high confidence hypothesis matches produced by multiple subsystems to arrive at a final interpretation of the user's speech.

Core vocabularies, e.g., based on activity or domain descriptions and, e.g., a knowledge base of the geographic locale of interest can be used. Methods that evaluate the core vocabulary as an initial step and upon unsatisfactory results expand the recognition task to a larger unconstrained vocabulary may also be used.

Visual Inputs and Geo-spatial Understanding: Augmented reality often requires very precise estimation of the user's 6-DOF pose with very low latency. The inserted objects (e.g., overlays of virtual elements) should not drift or jitter as the user moves. The user may move very rapidly and change her viewpoints at rates greater than 180 deg./sec. Multiple users must see the inserted icons at the same location, so true and correct collaboration can happen.

Today many compact mobile platforms integrate cameras, IMUs, magnetometers and GPS on the platform. These provide a robust framework for geo-localizing the user in the real world. The illustrative system uses a combination of these sensors for six degrees of freedom pose estimation of the user's view, which can be used both for localization even in multistoried indoor environments, as well as for enabling highly accurate AR. These sensors can be used to do both GPS-enabled and GPS-denied navigation when prior landmark databases have been pre-built. The illustrative system relies on an IMU centric error-state Kalman filter and a dynamic mapping process that can recover 6-DOF pose and also a map of the area. Each sensor has its own failure modes. The GPS can frequently fail in or near buildings. Magnetometers can be corrupted by nearby ferrous objects. Video can degrade due to lighting or occlusions. The multi-sensor based filtering approach used by the system 110 is able to detect failures and automatically adapt to use all reliable information while accounting for uncertainties in estimation. Using the multi-sensor approach, in the system 110, methods for precise, low latency geo-localization without prior landmarks being built in cluttered urban environments are enabled. As each user moves through the environment, landmark databases are built on the fly. These landmark databases can be shared with other users visiting the same locale.

In the illustrative system the reliability measures for localization are propagated to the decision making process and for AR user feedback. In some embodiments, for visualization, augmented content is defined as (i) position-orientation specific, (ii) position specific, (iii) viewpoint specific or as (iv) non geo-specific. Based on the confidence in accuracy the visual feedback can be adapted to use less geo-specific information for overlaying information. When the geo-localization reports uncertainties in location and/or orientation, the system 110 can use qualitative localization and direction modes. For instance, instead of suggesting " . . . after going North on this road for 100 m you will see the coffee shop on the right," the system 110 might indicate " . . . within the next 5 blocks, if you see a bookstore, the coffee shop will be close-by."

Visual Inputs and Scene Understanding: Visual sensing provides awareness of scene context (e.g., terrain type, indoor vs. outdoor, etc.), events (an activity or event, traffic patterns, etc.), and entities (people, vehicles, infrastructure etc.) in a geographic locale. Scene understanding technology of the illustrative system includes automated recognition of specific scene and object instances, reliable face and pedestrian detection and activity recognition. Place/landmark recognition and logo recognition and retrieval technology is used to extract context about static content in the scene. Some embodiments utilize parts-based deformable models, convolutional neural networks and subspace image embeddings for object detection. Motion analysis technology is used to detect movers, identify flow patterns of traffic, crowds and individuals, and detect motion pattern anomalies to identify salient image regions for the user to focus attention.

Some embodiments of the visual understanding technology used by the system 110 mitigate errors in detection and recognition algorithms by incorporating context-specific performance analysis and adaptation. Visual detection and recognition may not work well across all possible operating conditions. Parameter tuning and selection is used to provide higher performance of the vision algorithms. Automated performance characterization technology is used to characterize multiple algorithms under various operational conditions using data from open sources. For instance, an array of entity and event detection algorithms can be systematically characterized offline with respect to their performance in context such as indoor-vs-outdoor, daylight-vs-dusk, urban-vs-rural etc. This enables the system 110 to mitigate the risk of unreliable detection by applying the most appropriate algorithms for the context at hand. Furthermore, visual understanding algorithms can exploit the user context. For instance, knowing that the user is walking along a sidewalk, vehicle detection at close quarters can take advantage of the expected pose for the vehicles. Each visual understanding algorithm produces results with associated confidence scores so that higher-level reasoning components like the dynamic information aperture filter can adaptively ask for user guidance and to adapt the workflow.

User Action Interpreter: This module interprets user gestures as well as user movements based on analytics on user-worn sensors. Gesture recognition can be performed using, e.g., the Microsoft Kinect sensor. This sensor actively projects a known infra-red (IR) pattern onto the scene and computes a depth image by imaging the scene with a camera sensitive to the IR wavelengths. The monocular depth measurements from Kinect have been used for capturing human pose and for quickly tracking limbs and joints. It has also been used for the purpose of hand-tracking and for recognizing specific actions like pointing gestures for human-robot interaction purpose. However, since the sensor relies on reflected IR illumination, the depth perception is poor for reflective objects. In addition, the sensor does not work well outdoors due to interference from IR wavelengths in sunlight. Accordingly, outdoor gesture recognition can be better performed using other types of sensors (e.g., two dimensional (2D) or three dimensional (3D) sensors such as stereo sensors) and gesture recognition algorithms.

1.2.5. Understanding User Intent

Understanding user intent enables the system 110 to provide a meaningful response to user interactions with the system 110. User intent understanding involves multi-modal interpretation of user-borne sensing and the active user context. For example, if a user asks "Who is in that red car?," the system 110 has to know which vehicle "that red car" refers to. The system 110 may consult the active user context maintained by the system 110. Alternatively, the intent-reasoning engine may actively direct a query through the dynamic information aperture to obtain information on red vehicles in the user's view. The retrieved information is further analyzed against the user's head/gaze direction and pointing to determine the relevant car of interest.

In some embodiments, a factor graph framework is used to implement semantic and data inputs in understanding user intent while also modeling uncertainties. The speech recognition module translates the speech to text, parses the sentence, identifies the relevant objects and passes them to the scene understanding module. Scene understanding continuously adds relevant objects with their meta-information into the current user context with the associated uncertainties. The user action interpreter creates, e.g., a factor graph with the multi-modal inputs from speech, text and visual processing, and also encodes priors related to typical layouts of 3D scenes and object sizes and relationships. Online belief propagation with the factor graph is used to determine user intent. By maintaining an active user context within the context of mission needs, the complexity of the dynamically created factor graph can be controlled to enable interactive reasoning. Tools such as Markov Logic Networks can be used to evaluate the efficiency and reliability of combining rules with data driven reasoning. If the user action interpreter cannot come up with a unique intent, the information is passed to the intent reasoner. The intent reasoner evaluates the various intent candidates and determines the best match based on the current and prior intents. If the intent reasoner cannot determine the best match, it will first ask the dynamic information aperture module for additional information. The additional information is interpreted within the multi-modal context to resolve the user intent. If the multi-modal reasoning leads to inconclusive intent the reasoner will default to asking for additional information from the user to finalize the user intent. Some examples of higher level intents that can be initiated by the user include: (i) selection of a live entity, (ii) searching the knowledge base for an entity, (iii) link a live entity to an element(s) in the knowledge base, and (iv) establish a link between multiple live entities.

1.2.6. Filtering and Extracting Relevant Information

The dynamic information aperture (DIA) filter module (e.g., reasoning subsystem 230) determines the information that will be presented to the user and coordinates action across other modules of the system (e.g., scene understanding services 220, knowledge base services 236, display services 250, audio output services 256, collaboration services 258). The disclosed information aperture technology can be thought of in terms of foveal and peripheral data and information regions within the field of regard. While the user is focused on the foveal region, the DIA module helps in augmenting the user's view in the foveal region while also processing data in the periphery. The task-driven information aperture determines what data to process and what scene understanding algorithms to run, depending on the collector's mission and its evolution over time. Aspects of the DIA module are identified below.

The DIA reasoning subsystem 230 maintains the current information context for the system 110 by caching relevant data from the knowledge base. This allows the system 110 to focus analytics on the cache for rapid response. The relevance is determined by correlating live analysis of the user inputs and scene understanding to the data in the knowledge base. The context can include information directly touched by the user or data links in the immediate periphery of the active data. This need guides the knowledge representations outlined in Section 1.2.3.

The DIA reasoning subsystem 230 responds directly to user requests. Guided by the user intent module (e.g., subsystem 228), DIA 230 queries the knowledge base. DIA 230 turns high-level semantic inquiries into coordinated backend function calls to appropriate processing modules. A performance characterization module (which may be implemented as a subsystem of the DIA 230) is able to interpret the context in determining what algorithms are most appropriate for the current data context to ensure best algorithms with appropriate parameters are initiated. Online scene content analysis guides the selection of optimal parameters and types of algorithms for execution.

DIA 230 mines data in the peripheral regions of the scene 100 that are not the current focus of attention of the user. The DIA module 230 evaluates mission goals and available computational resources to determine if it should autonomously initiate background processes to mine peripheral information. The initiated processes support both data corroboration to verify new data and data collaboration where additional relevant information is generated around new data.

DIA 230 manages content delivery to the user. It is very easy to overload a user with too much information. User cognitive load may be provided as an input to the dynamic information aperture. A user model can be formulated that maps interface complexity and past and current user behavior to the cognitive load, using a self report-based training process in which the user explicitly signals when the cognitive load exceeds his or her capacity. The user model enables dynamic choice of information aperture that tailors the cognitive load to suit the prediction made by the user model on the basis of the past and current user behavior as well as the scene (interface) complexity. For example, when the user's expected cognitive load is low, the dynamic aperture will be adjusted to give the user more detailed and dense information, while when the expected cognitive load is high, the dynamic aperture will be adjusted to give the user sparse and easy to consume information.

Display and Processing Hardware: A person-carried system that is lightweight and potentially, discreet, with appropriate SWaP (size-weight-power) constraints, is used, in some embodiments. Wearable displays (such as Google Glass) and mobile processors are exemplary platforms for the system 110.

Navigation and Localization Technologies: High performance multi-modal fusion technologies for navigation and localization are available from SRI International. These technologies work with GPS or GPS-denied scenarios while also adapting dynamically to heterogeneous sensor characteristics. Real-time dynamic mapping methods provide visual landmark based localization for sharing and navigation across people/collections. These methods are actively being ported to mobile processors with built-in sensors.

AR Systems: Augmented Reality (AR), including, in mobile devices, marker based AR, can be used in connection with the system 110. Markerless AR applications on mobile platforms, such as those available from Qualcomm, can also be used.

Speech Understanding: Siri (developed and initially commercialized by SRI) and other commercial products and related technologies available from SRI International can be used for speech recognition and understanding.

User Workflows, Virtual Personal Assistant and Dialog Systems: Speech based multi-step complex workflows and interactive dialog interfaces in new virtual personal assistant (VPA) frameworks are available from SRI International.

Real-time Scene Understanding and Performance Characterization: Multi-modal (video, audio, text) based recognition of objects, locations and actions is available from SRI International. SRI technology includes image based instance search for scenes, logos and other similar patterns with sub-linear indexing and search on databases of a few million images. SRI technology also includes a performance characterization system for selecting appropriate algorithms and parameters to use for particular tasks based on the image content. Additional features and capabilities of the disclosed platform 132 and system 110 are described below.

Data Organization and Collection Plan: scene and active user context guided visual and semantic indexing and caching data related to entities, events and their relationships; efficient and high accuracy indexing and search with graph models and databases.

User-borne Sensing and User Interfaces: context (mission, location)-driven vocabularies for speech recognition in noisy environments.

Topological, semantic, and geometric geo-localization with uncertain data: high accuracy and reliability 6DOF, low latency localization with/without GPS for AR; jitter-free and drift free, accurate insertion of icons as multiple users move and survey the scene; reliable object/entity detection under uncertainties using contextual performance prediction.

Understanding: factor graphs are used for reasoning and inference of user intent under uncertainties.

User Intent: unified, probabilistic modeling of and reasoning with rules/priors and data-driven constraints with Markov Logic Network-like formulations and algorithms.

Filtering and Extracting Relevant Information: semi-automated processing of foveal and peripheral information zones to realize a dynamic information aperture at visual and task-processing levels; indexing and search with graph databases for real-time information filtering.

Augmented Reality interfaces integrated with real-time audio-visual scene context analysis and backend knowledge bases as disclosed herein enable an unprecedented collaboration between information collection, analysis and real world activities. Benefits of the system 110 include those described below.

When humans focus their attention on some key aspects of activities, they can easily miss significant other entities and activities within their field of regard. the system 110's concept of augmenting the foveal information space for a collector while also remaining aware within the peripheral information space will enable human augmentation without the associated perceptual and cognitive loads.

The system 110 can automatically capture and tag collections without the need for any human intervention. This addresses a common problem where lots of data may be collected but it remains largely unused because it is hard to tag and search. The system 110 can provide gains in efficiency and effectiveness of a user for any given activity. It is expected that time to complete an activity, quality of data collected during a mission, and responses to spontaneous unpredicted incidents will all be improved both quantitatively and qualitatively. In scenarios where a reasonable communication bandwidth between multiple users is available, the system 110's real-time contextual visualization and analytics provide an opportunity for multi-user communication and collaboration. For example, links and events that are currently within the attention of a user's context but not within the attention of another user's context, can be processed by the first user, who can in real-time communicate the links and events and/or other information (e.g., suggestions, comments) to the other user.

Figure 2:
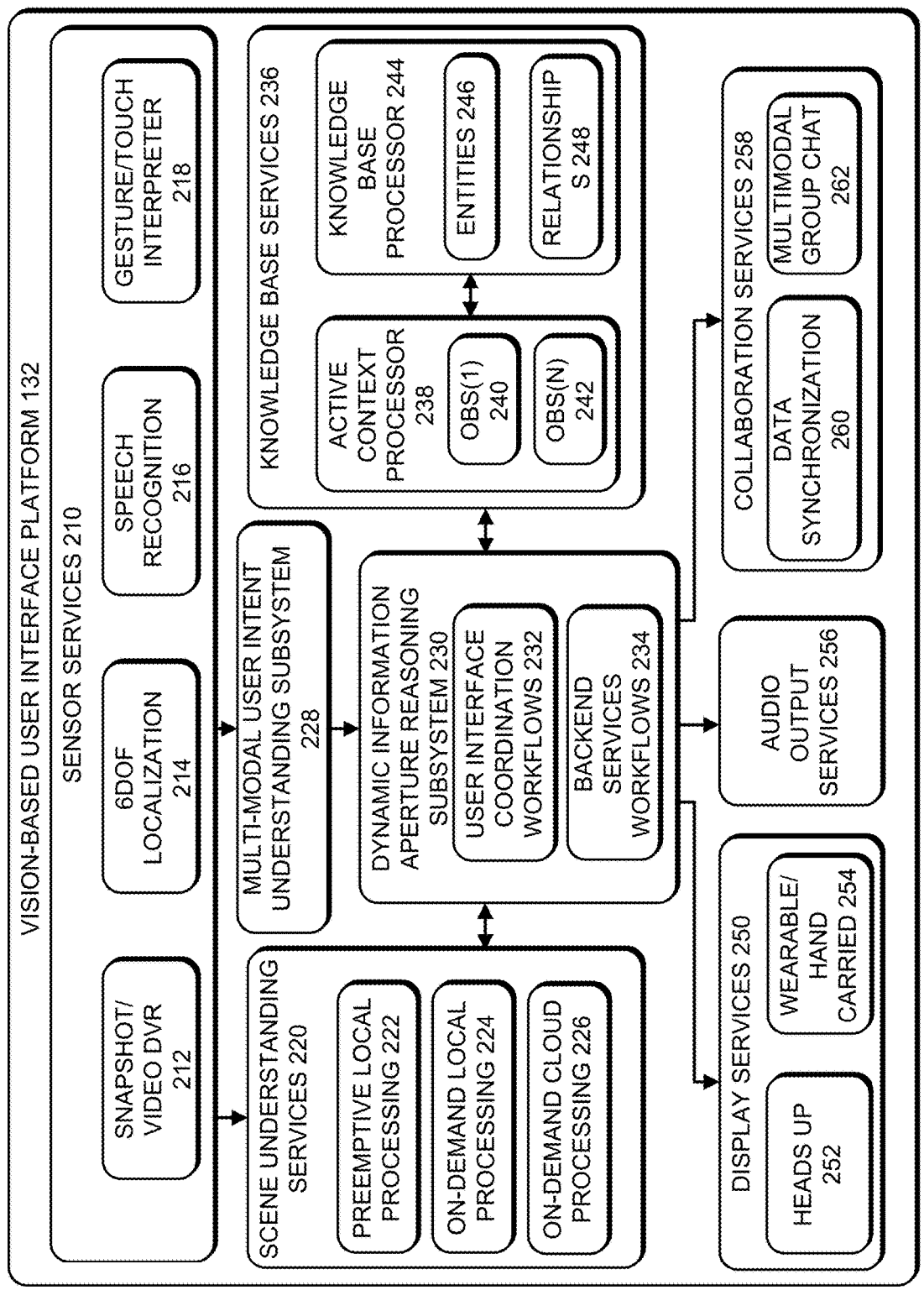
FIG. 2 is a simplified functional block diagram of at least one embodiment of a system architecture for the vision-based user interface platform of FIG. 1.

Referring now to FIG. 1, an embodiment of a vision-based user interface platform ("platform") 132 of the computing system 110 is shown in the context of an environment that may be created during the operation of the computing system 110 (e.g., an execution or "runtime" environment provided by hardware, firmware, and/or software). The illustrative platform 132 executes artificial intelligence technologies including computer vision and natural language processing algorithms to, among other things, make "seamless" connections between visual features of a real world scene 100 and elements of computer-accessible knowledge 106. The platform 132 displays virtual elements on views of the real world scene 100, using one or more display devices 138 of the computing system 110. The platform 132 may coordinate the display of the virtual elements with a natural language dialog session, to, for example, provide assistance to a person performing an activity, such as a shopping expedition, information gathering, navigation, attending a social event or sporting event, or another type of task during which a vision-based interface to stored knowledge may be helpful. In this way, the system 110 can, for example, aid individuals in identifying and focusing on relevant parts of stored information at the appropriate moment during the activity, link the relevant parts of the stored information with corresponding objects in the real world view, and correlate parts of the real world view that are currently of interest with relevant parts of the stored information.

As used herein, "knowledge" may refer to any type of query-retrievable stored content, including a document file, an image file, a video file, an audio file, a web page, etc.

The illustrative system 110 includes a number of devices 114, 116, 118, 120 that receive or generate multi-modal inputs, such as video/images 122, audio 124, location/orientation data 126, and human computer interaction data (e.g., gestures, "taps," mouse clicks, keypad input, facial expressions, etc.) 128, which are elicited from the real world scene 100 and/or user interactions with the computing system. The real world scene 100 includes a person 104 and one or more visual features 1 to N (where N is a positive integer), and where multiple visual features 1, N may have relationships with one another that are discovered through use of the system 110. Such relationships may include, for example, component-subcomponent relationships, inter-component relationships, part-whole relationships, spatial relationships, interpersonal relationships, professional relationships, familial relationships, physiological connections, owner-property relationships, and/or may others. As used herein, "visual feature" may refer to people, physical objects, combinations of people and objects, including constituent parts, actions, events, scenery, etc. Where this description refers to a person, human, people, or similar terminology, it should be appreciated that aspects of the description may also be applicable to physical objects, and vice versa.

A camera 114 acquires images (e.g., video 122) of the real world scene 100. As used herein, a "camera" may refer to any device that is capable of acquiring and recording two-dimensional (2D) or three-dimensional (3D) video images of portions of the real-world environment, and may include cameras with one or more fixed camera parameters and/or cameras having one or more variable parameters, fixed-location cameras (such as "stand-off" cameras that are installed in walls or ceilings), and/or mobile cameras (such as cameras that are integrated with consumer electronic devices, such as desktop computers, laptop computers, smart phones, tablet computers, wearable electronic devices and/or others. The video 122 may be stored in computer memory as a video file and analyzed by the system 110 as disclosed herein.

A microphone 116 acquires audio inputs 124, such as natural language speech of the person 104. The audio 124 may be stored in computer memory as an audio file and analyzed by the system 110 as disclosed herein. One or more location/orientation sensors 118 acquire location/orientation data 126 in order to spatially align or "register" the video 122 with the real world scene 100 so that object detection and/or object recognition algorithms and other computer vision techniques can determine an understanding of the real world scene 100 from the point of view of the user. The sensor(s) 118 may include an inertial measurement unit (IMU), an accelerometer, a gyroscope, a compass, a global positioning system (GPS) transceiver, and/or other devices for obtaining information about the position of the camera 114 (or motion of the camera 114) with respect to the real world scene 100. For example, if the camera 114 is supported by the person 104 (e.g., as a component of a wearable or body-mounted device), the location/orientation data 126 provides information (e.g., head tracking navigation) to allow the system 110 to detect and respond to the person's movements, which can change the field of view of the camera 114. As used herein, "field of view" (FOV) may refer to, among other things, the extent of the observable real world that is visible through the lens of the camera 114 at any given moment in time. The field of view may depend on, for example, the particular position and spatial orientation of the camera 114, the focal length of the camera lens (which may be variable, in some embodiments), the size of the optical sensor, and/or other factors, at any given time instance. Objects that are outside a camera's FOV at the time that the video 122 is recorded will not be depicted in the video 1222.

One or more human-computer interface devices 120 acquire human-computer interaction data 1228. The human-computer interface device(s) 120 may include, for example, a touchcreen display, a touch-sensitive keypad, a kinetic sensor and/or other gesture-detecting device, an eye-tracking sensor, and/or other devices that are capable of detecting human interactions with a computing device.

The devices 114, 116, 118, 120 are illustrated in FIG. 1 as being in communication with a computing device 130. It should be understood that any or all of the devices 114, 116, 118, 120 may be integrated with the computing device 130 or embodied as a separate component. For example, the camera 114, microphone 116, and/or sensor(s) 118 may be embodied in a wearable device, such as a head-mounted display, GOOGLE GLASS-type device or BLUETOOTH earpiece. Alternatively, the devices 114, 116, 118, 120 may be embodied in a single computing device, such as a smartphone or tablet computing device.

As described in more detail below, the system 110 includes the vision-based user interface platform 132, which is a computer application embodied in the computing device 130. The platform 132 is embodied as a number of computerized modules and data structures, including hardware, firmware, software, or a combination thereof, e.g. as units of computer code or instructions that are implemented using a computer programming language such as Java, C++, or Python alone or in combination with other devices or modules (e.g., object libraries, runtime libraries, systems software, device drivers, etc.).

The platform 132 analyzes the multi-modal inputs 122, 124, 126, 128 as they are detected over time, and in response to the multi-modal inputs 122, 124, 126, 128, determines and updates a semantic understanding of the real world scene 100 at different time instants (e.g., as the performance of an activity unfolds). The platform 132 selectively correlates time-dependent instances of the semantic understanding of the scene 100 with elements of the computer-accessible knowledge 106. The platform 132 coordinates the presentation of system-generated natural language speech output 146 and virtual elements 142, 144 (which may include links 102, 108) at different time instants (e.g., during the performance of an activity), in order to relate real world elements of the scene 100 to corresponding knowledge 106 and vice versa, in accordance with the current context of the real world scene 100. For example, as an activity progresses, the platform 132 can map different portions of the knowledge 106 to different portions of the real world scene 100 (and vice versa) by selectively presenting different visual and speech cues.

As illustrated in the embodiments of FIGS. 5-13, described below, the visual cues include the one or more virtual elements 142, 144, and the audio cues include natural language output 146. The one or more virtual elements 142 are presented by the platform 132 as visual element(s) of an augmented view 140 of the real world scene 100 (e.g., as a virtual overlay on the real world view. In the illustrated embodiment, the augmented view 140 can be selectively presented on one or more different display devices depending, for example, on the user's current context, e.g., where the user has multiple computing devices (e.g., smart phone, tablet, smart watch, AR glasses, etc.), the augmented view 140 including the virtual element(s) 142 may be presented on a display device 138 that the user is currently using or which is relevant to the user's current activity. Similarly, the platform 132 outputs the speech cues, e.g., natural language output 146, using one or more speakers 148. The speaker(s) 148 may be an integrated component of the display device 138, another device, or may be embodied in a separate component (such as audio headphones or ear buds). Moreover, any or all of the components 138, 148 may be integrated with the computing device 130, in some embodiments. Portions of the platform 132 can act as a "front-end" to a number of applications/services 134, in some embodiments. The applications/services 134 may include, for example, a search engine, a messaging service, a social media application, a navigation tool, geographic mapping software, etc.

Figure 5:
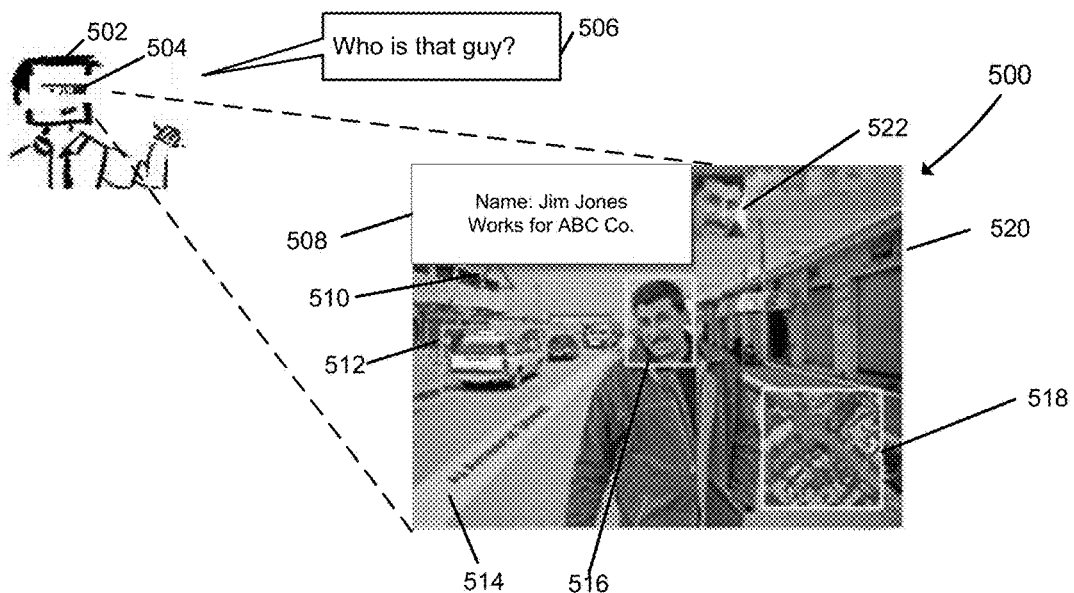
FIGS. 5-13 illustrate exemplary usage scenarios of embodiments of the computing system of FIG. 1, including exemplary scene augmentations.

In FIG. 5, an image of a scene 500 is augmented by the system 110 with virtual elements 508, 510, 512, 514, 516, 518, 520, and 522. The system 110 filters the virtual elements to be displayed based on the objective of the user 502 viewing the scene through a wearable see through display device 504 (which could alternatively be a mobile device camera). For instance, in this case the system 110 may determine that the user 502 is on an information gathering mission. Scene understanding technology of the system 110 recognizes the visual features highlighted by elements 510, 512, 516, 520. Correlations of visual features of the scene 500 with stored knowledge 106, performed by the system 110, are used to generate virtual elements 508, 514, 518 and 522. Virtual element 508 displays retrieved text, and virtual element 522 displays a retrieved photo, corresponding to the visual feature 516. Virtual element 514 displays a retrieved street name corresponding to a geographic location of the scene 500, which may be obtained from, e.g., GPS data received by the user's device 504. Virtual element 518 displays a retrieved image depicting an aerial view of the user's location. The display of virtual elements 508, 522 is responsive to the user's natural language speech query 506.

Figure 6:
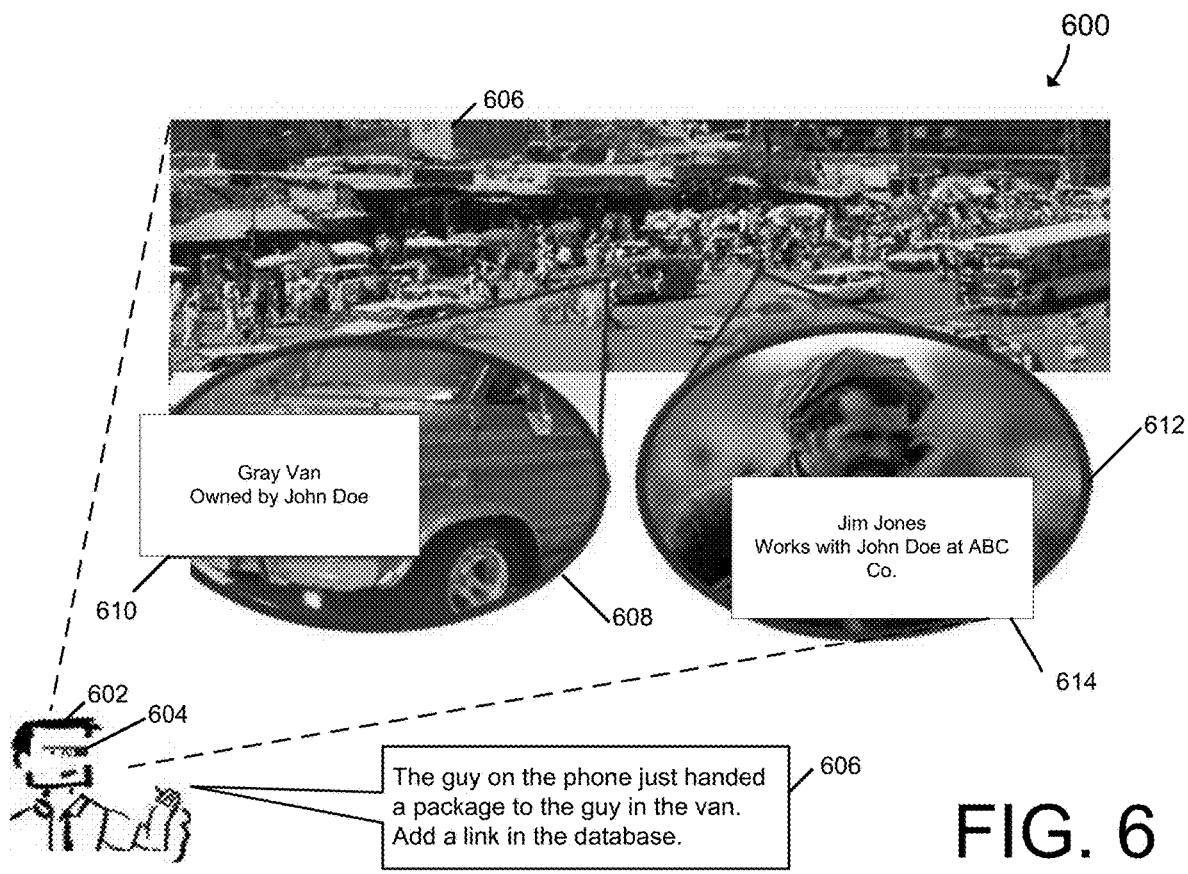

Similarly, in FIG. 6, the system 110 analyzes an image 606 of a real world scene 600 viewed through an AR device 604 of the user 602. The system 110 extracts visual features 608 and 612 and performs information retrieval based on semantic elements that the system 110 associates with the extracted visual features 608, 612. Based on the system 110's semantic understanding of the feature 608, the system 110 generates and displays virtual element 610, which identifies retrieved information about the vehicle depicted in the image. Based on the system 110's semantic understanding of the feature 612, the system 110 generates and displays virtual element 614, which identifies the person depicted in the image as well as employment information about the person. The user issues a natural language request 606, which the system 110 interprets using speech recognition and understanding technology. The system 110's interpretation of the user's request causes the system 110 to discover a relationship between the two features 608, 612 that did not previously exist in the system 110. In response to the user's request 606, the system 110 creates a link between the features 608, 612 and stores the link and related information in the knowledge base 106 or other databases or searchable storage locations.

Figure 7:
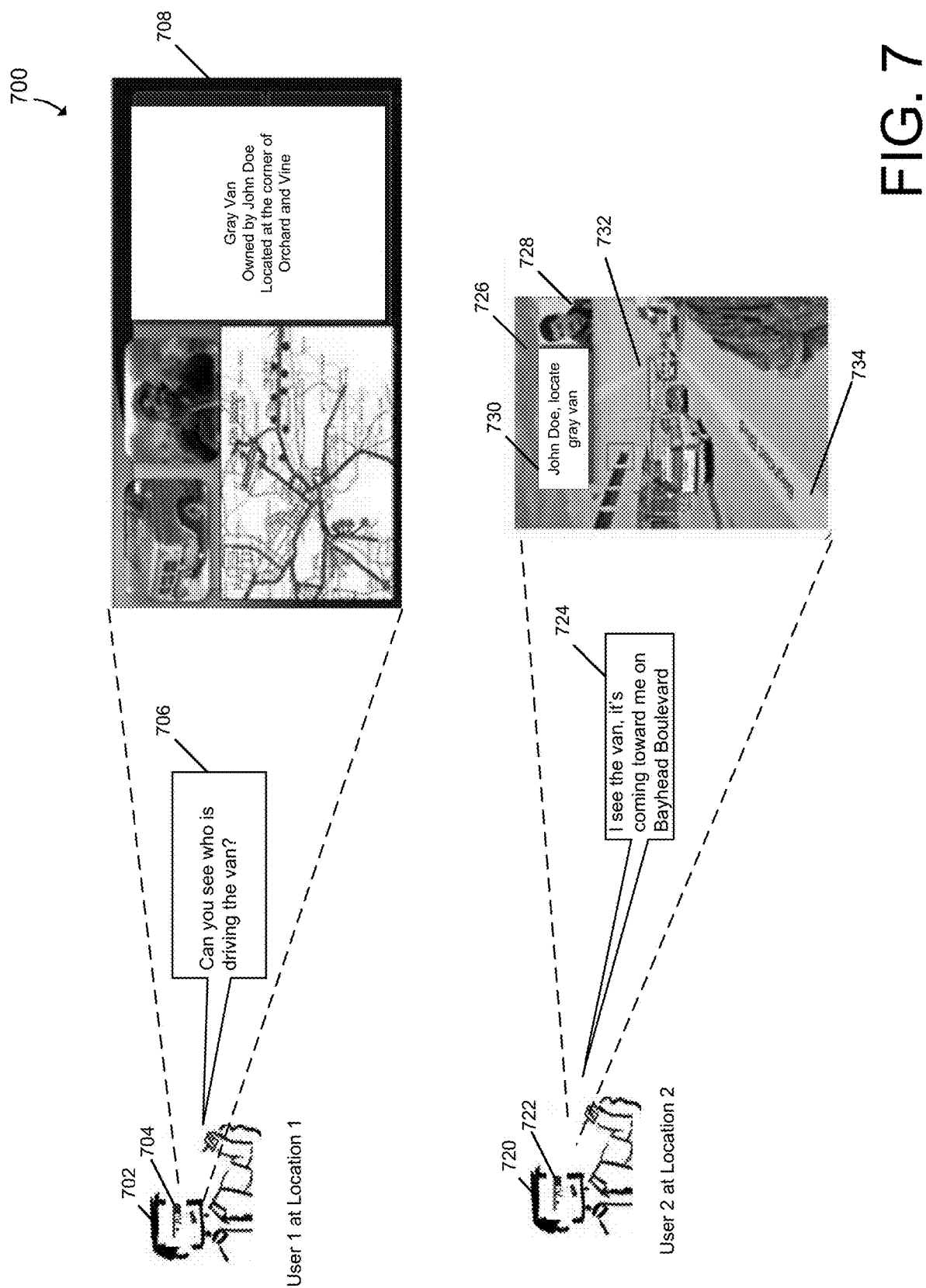

In FIG. 7, two users 702, 720 are separately viewing portions of a scene 700 from different vantage points. The interactive communication facilities of the system 110 coordinate the users' dialog 706, 724 with virtual overlays 7078, 728, 730, 732, 743, in real time. Back end knowledge 106 retrieved in response to visual interactions of the user 702 (gray van associated with John Doe) is transferred to the second user 720 by virtual element 730. Additionally, map information retrieved during the user 702's interaction with the system 110 may be used to produce the virtual element 734, which is displayed on the user 720's view 726 of the scene 700.

Figure 8:
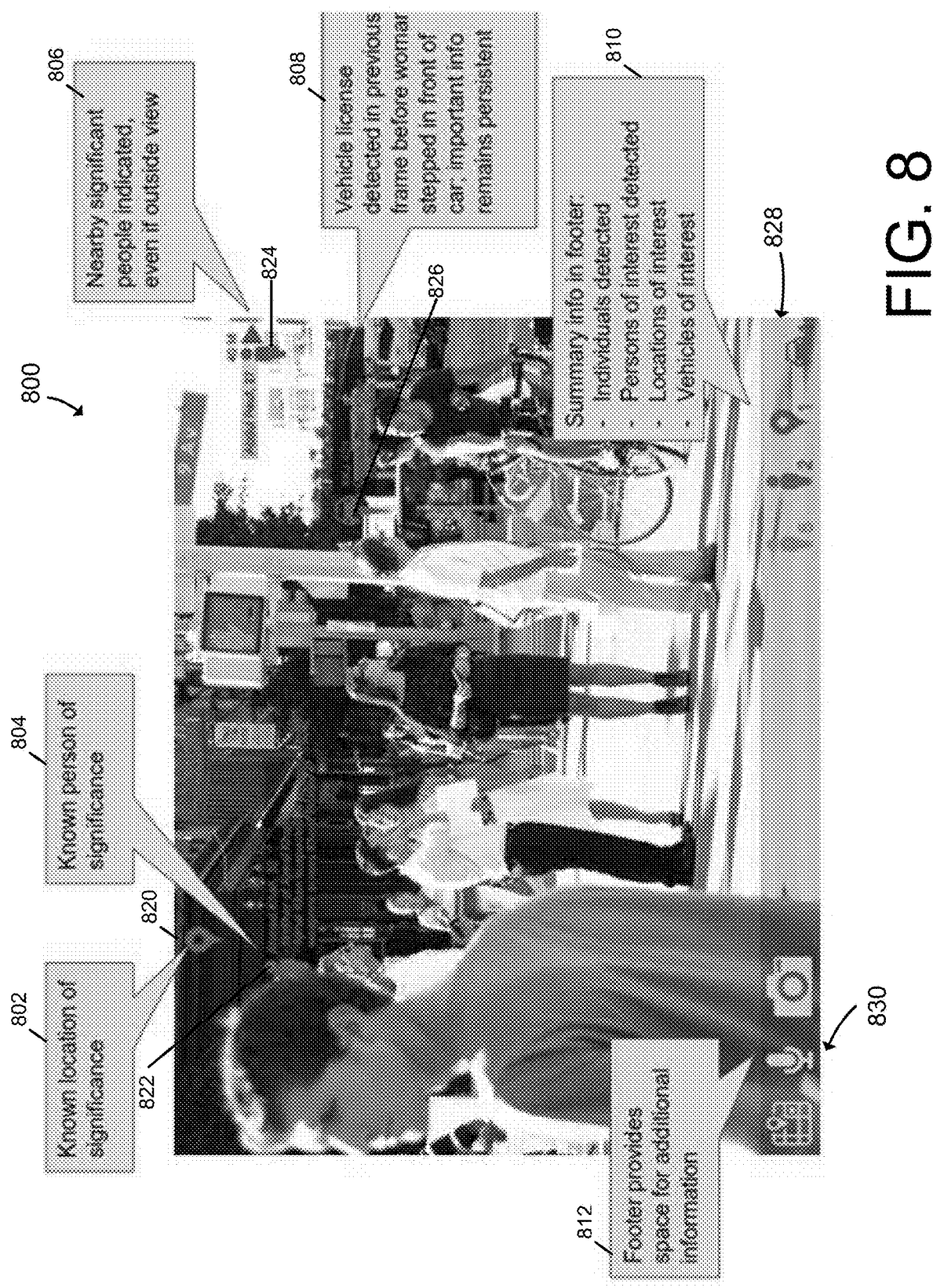

In FIG. 8, the boxes 802, 804, 806, 808, 810, 812 are not part of the augmented reality overlay but provide explanations for the corresponding virtual elements that are added to the scene 800 by the system 110 (e.g., people, location, and vehicle icons). Box 802 explains that the graphical overlay 820 is placed on the image 800 at a location (e.g., x, y pixel coordinates) that corresponds to a building whose geographic location is known. By selecting the overlay (e.g., by speech or tapping on the overlay graphic 820), the user can obtain additional information about the location. Box 804 explains that the graphical overlay 822 is placed on the image 800 at a location (e.g., x, y pixel coordinates) that corresponds to a person whose identity is known as a result of integration of the AR functionality with back-end services and stored knowledge as disclosed herein. The illustrative overlay 822 includes a person-shaped graphic as well as a textual summary of the retrieved information about the identified person depicted in the image.

Box 806 explains that the graphical overlay 824 is placed on the edge of the image 800 (e.g., x, y pixel coordinates) because the system 110 has previously identified a person who is now outside the user's current field of view. For example, the user may have been "panning" the scene quickly or "missed" the fact that the person of interest had been present in the scene at an earlier time. In this case, a graphical overlay (e.g., a triangle as shown) is used to indicate the direction in which the detected but now outside-the-view person is located. This enables the user to quickly comprehend that simply turning his or her attention to the right (e.g., by turning one's head, if using a wearable device, or panning a handheld camera with one's hand) will bring the person of interest into view. While illustrated with respect to the identification of a person of interest, it should be understood that the capabilities illustrated by the overlay 824 can be used in connection with other recognized features of the image 800, such as objects, actions, portions of the landscape, or other aspects of the scene.

Box 808 explains that the graphical overlay 826 is placed on the image 800 at a location (e.g., x, y pixel coordinates) that corresponds to a vehicle for which additional information is known as a result of integration of the AR functionality with back-end services and stored knowledge as disclosed herein. The illustrative overlay 826 includes a vehicle-shaped graphic as well as a textual summary of the retrieved information about the identified vehicle depicted in the image. Notably, the system 110 is able to detect and extract the vehicle from the image, and use the extracted portion of the image to perform information retrieval, even though the vehicle is in the background part of the scene and is partially obstructed.

Box 810 explains that the graphical overlays 828 summarize the results of the intelligent image analysis performed by the system 110, e.g., providing numerical totals of each type of entity of interest detected in the image 800 (i.e., six persons, 2 persons of interest, 1 location of interest, and 1 vehicle of interest). Notably, the system 110 may use color coding (e.g., green vs. red), or another distinguishing technique, to identify "persons" in general separately from "persons of interest" more specifically. For instance general persons detected may be tagged with green overlays, but persons of interest may be tagged with red overlays. The system 110 may have knowledge that certain persons are "of interest" based on, for example, user input or inquiries (i.e., who is that guy, I'm looking for John Doe) or as a result of a pre-defined data collection plan, which may be specified by the user or based on a particular objective of the use of the system 110.

Figure 9:
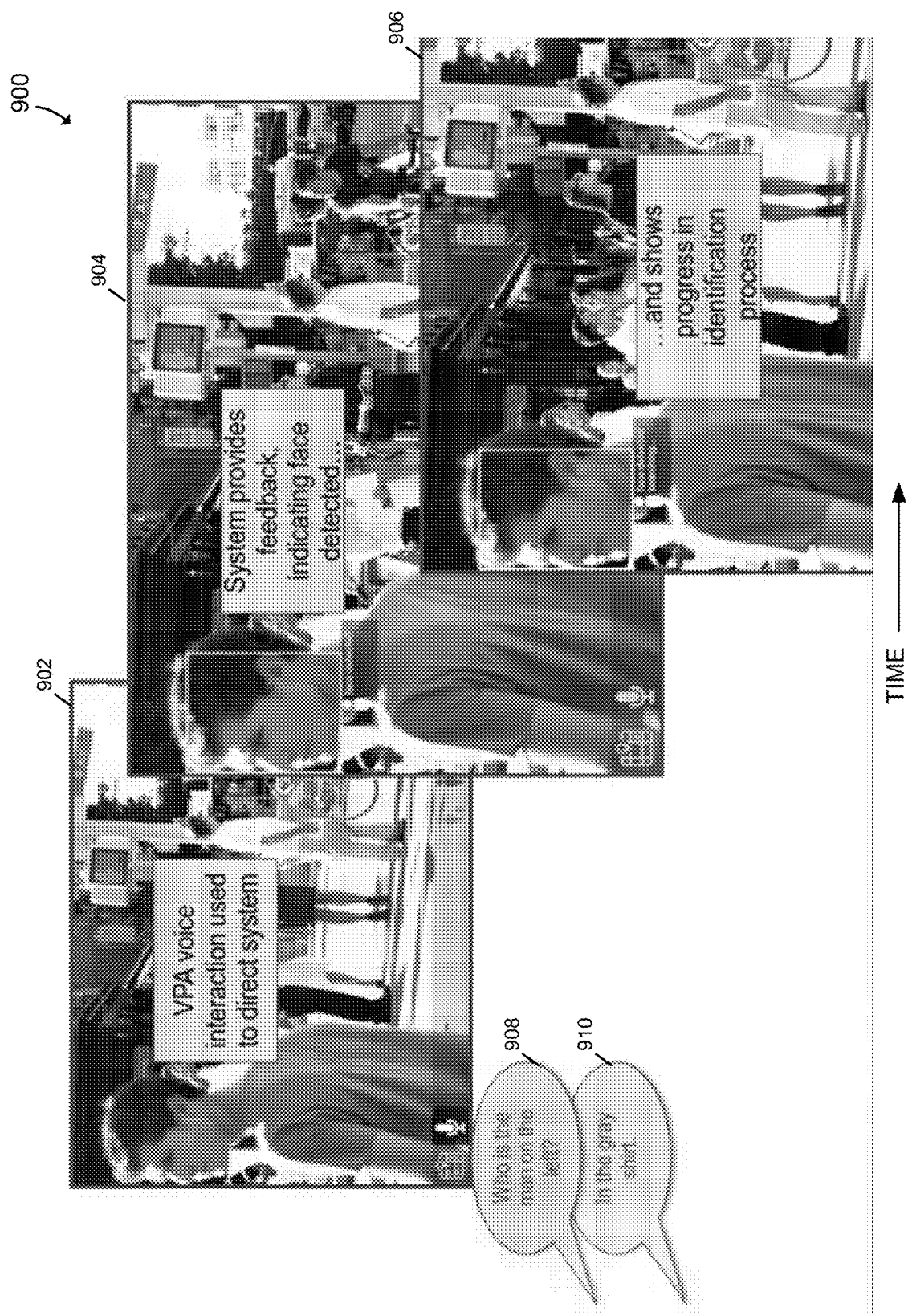

FIG. 9 illustrates a multiple-round "dialog" between the system 110 and a user, which occurs over a time interval, where the user's contributions to the dialog are in the form of speech 908, 910 and the system's contributions to the dialog are in the form of augmented reality overlays. In FIG. 9, the text boxes shown on the images 902, 904, 906 are not part of the augmentations but are added for explanatory purposes. For example, the text box overlaid on the image 902 explains that the natural language dialog or "virtual personal assistant" features of the system 110 are used in combination with the image processing features to interpret the user's dialog input 908, 910. The system 110 extracts from the dialog "man" "on left" and "gray shirt" and extracts from the image that portion of the image that depicts the face of the man on the left in the gray short. This is shown in the image 904 by the bounding box surrounding the man's face. The text box overlaid on the image 904 indicates that the system 110 provides feedback to let the user know that the user's inquiry has been received and is being processed. In this case, the feedback is visual, in the form of the bounding box surrounding the man's face. While difficult to see in the image 904, a text label is also overlaid below the bounding box, indicating "face detected . . . ". The text box overlaid on image 906 provides additional feedback to the user to indicate that an information retrieval process has been initiated to identify the face within the bounding box (using, e.g., a facial recognition algorithm).

Figure 10:
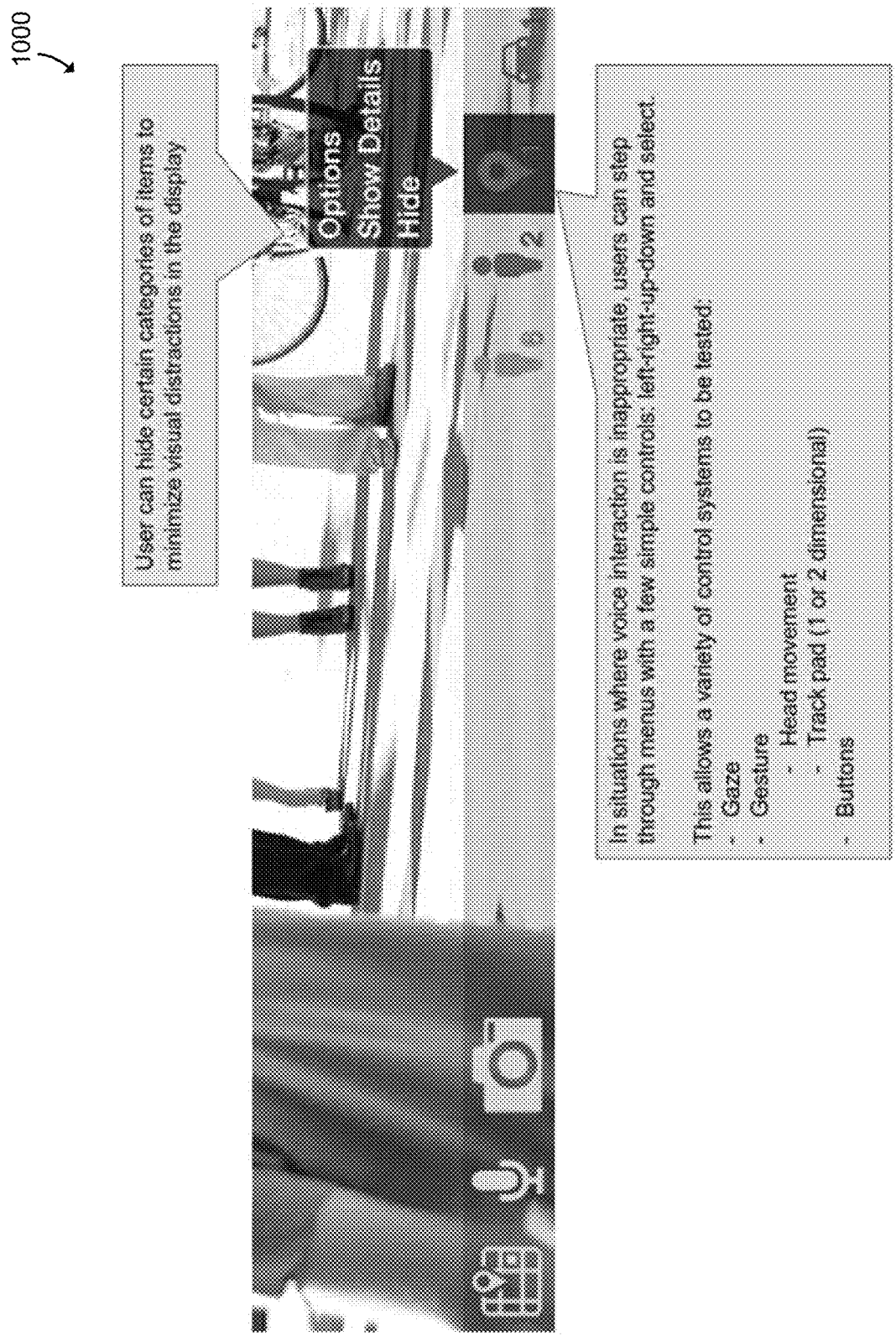
Figure 11:
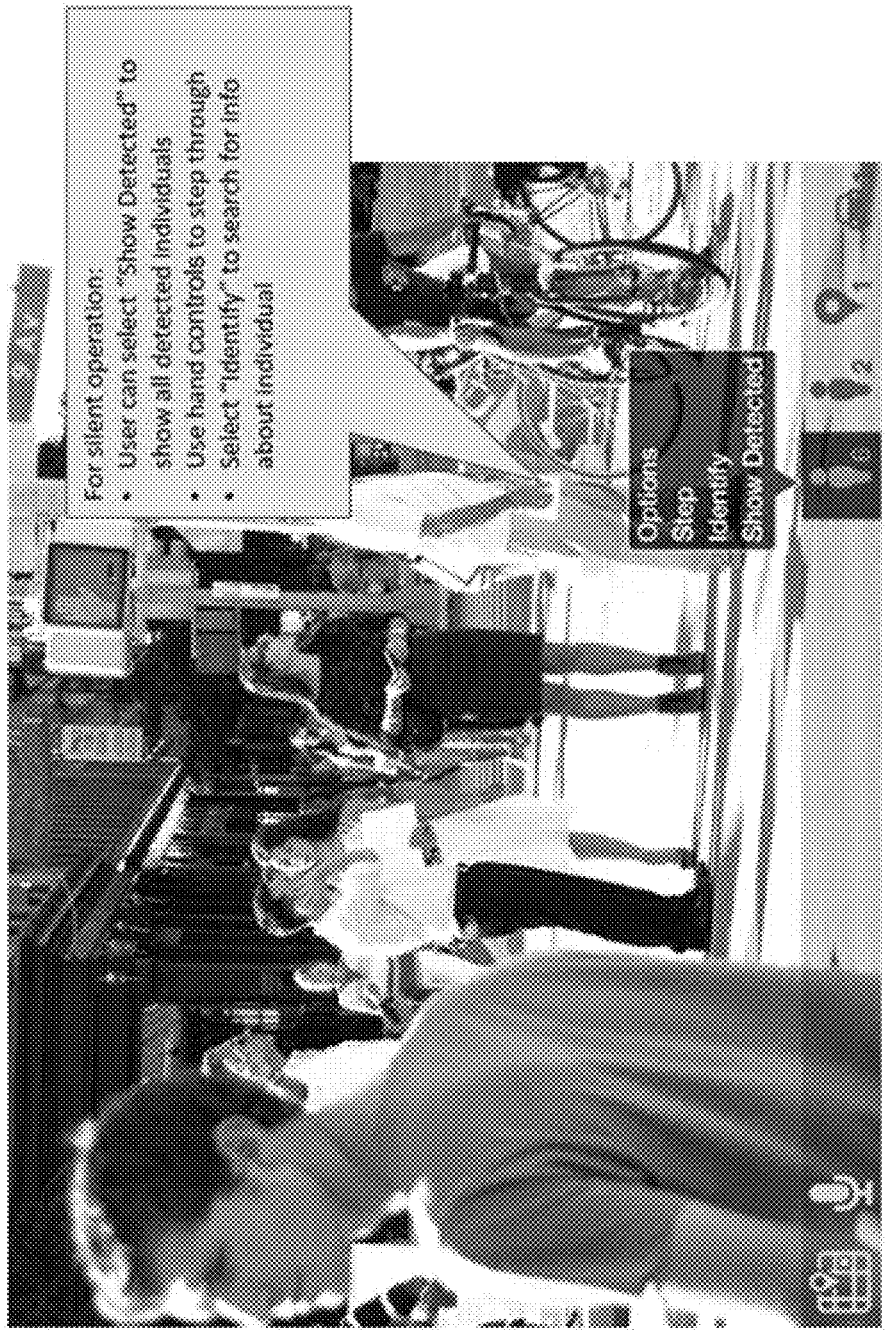
Figure 12:
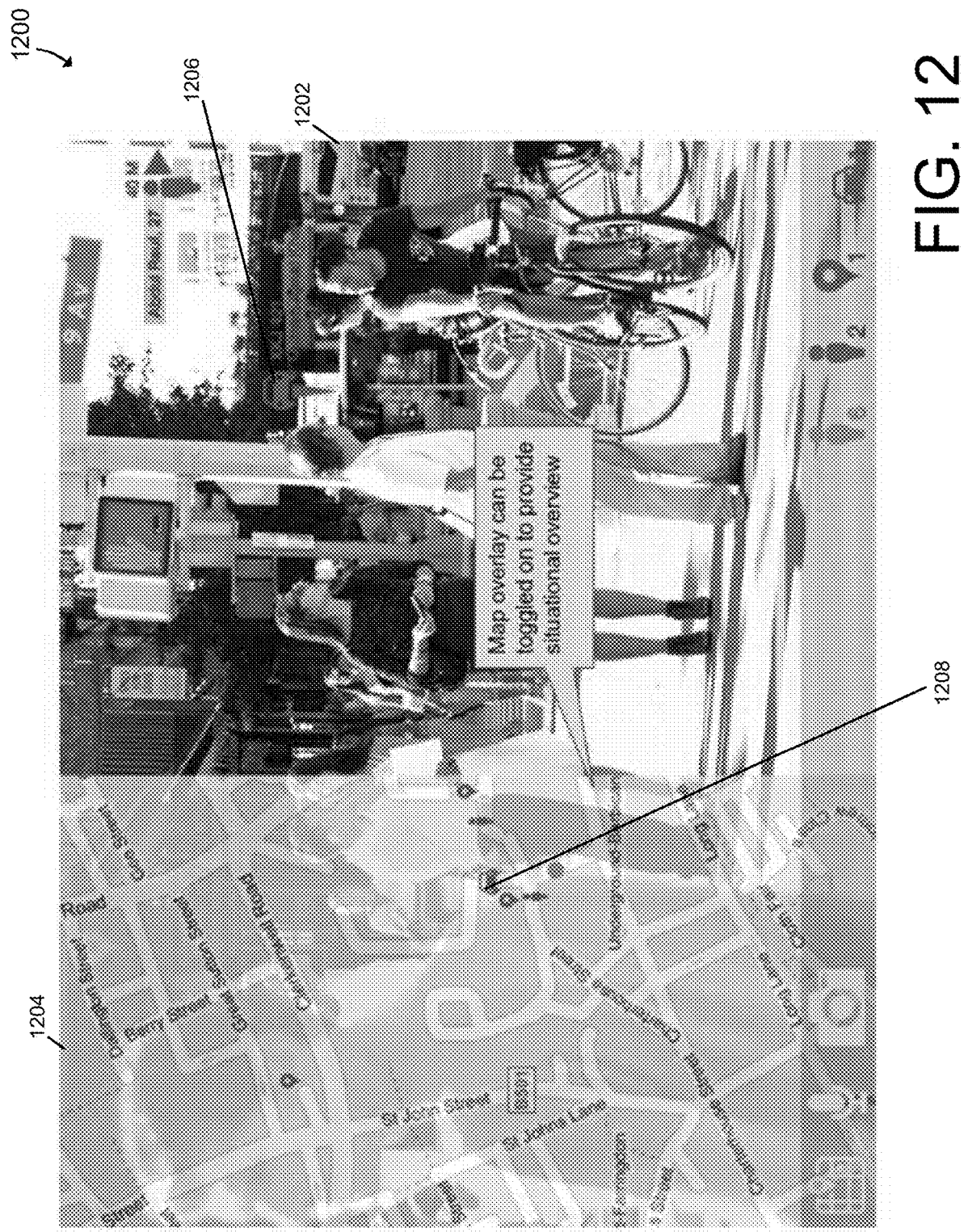

FIGS. 10-12 similarly use text boxes to explain the functionality and features provided by the scene augmentations shown therein. The text boxes in FIG. 10 explain that the system 110 has the capability of switching back and forth between different modes of assistance at the request of the user or based on changes in the user's context (i.e., location). For example, depending on the user's context (e.g., for privacy or to minimize distractions), one or more of the graphical overlays can be omitted or hidden from the visual display. Additionally, the user can utilize the graphical overlays as touch-screen elements in situation in which voice interaction is inappropriate or undesired for any reason. FIG. 10 also notes that non-verbal non-touch cues, such as gaze and/or gestures, may be used to interact with the system 110. FIG. 11 further illustrates a "silent mode" of operation of the system 110 in which pop-up graphical menu items can be displayed and selected by means other than voice interaction (e.g., tap, gaze, gesture).

FIG. 12 illustrates a map/scene correlation implementation in which the system 110 correlates a view 1202 of the real world scene with an overhead view of a real or virtual map 1204 of the corresponding geographic area. In this illustration, the system displays graphical overlays on the real world scene and corresponding graphical overlays on the map, so that the user has a side by side street view and overhead view of the scene and virtual elements meaningfully connecting the two views. For example, the vehicle graphical overlay 1206 on the real world scene 1202 identifies a vehicle in the scene (from which the user can view certain characteristics of the vehicle, such as color or make/model) as well as it's spatial location within the scene 1202, including surrounding people and objects. The graphical overlay 1208 on the map 1204 identifies the geographic location of the same vehicle; i.e., the system 110 creates a link between the two overlays 1206, 1208 across the two different views 1202, 1204 of the scene 1200.

Figure 13:
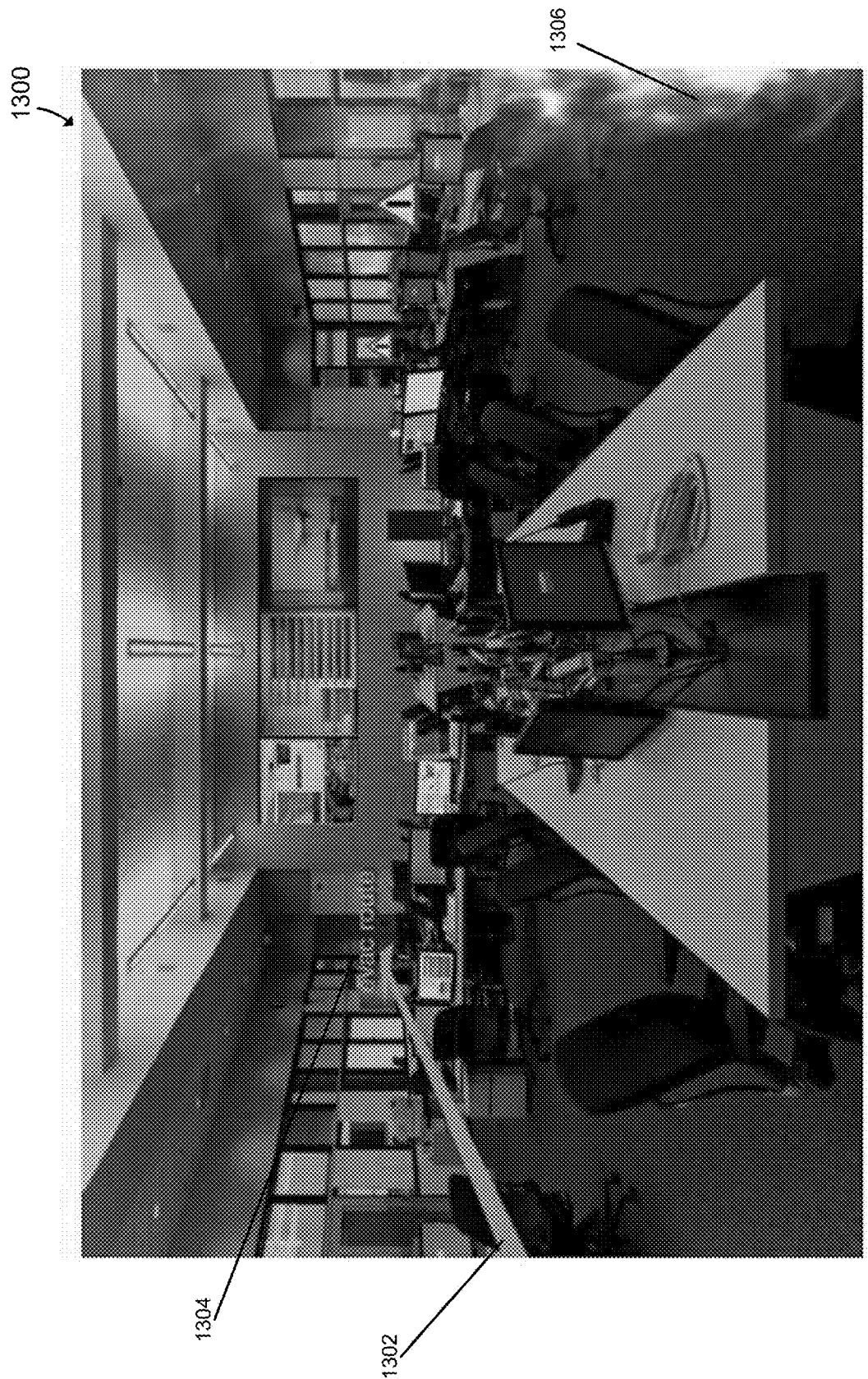

FIG. 13 illustrates an emergency response scenario in which fire 1306 is detected or recognized by the system 110 (e.g., by one or more sensors and/or image analysis) and in response, the system 110 augments the user's view of the scene 1300 with virtual elements 1302, 1304, which show the user the way to the evacuation route. To do this, the system 110 determines the evacuation route based on information retrieved from the back end knowledge base 106 and formulates the virtual elements in relation to semantic elements extracted from the image of the scene 1300. In this way, the system 110 can guide the user through an emergency procedure. The natural language dialog features of the system 110 enable the user to ask questions and interactively diagnose problems. The overlays, e.g., virtual elements 1302, 1304, can be animated in some embodiments, e.g., with visual routing that is dynamically updated in response to the user's movement progressing along the route. The scene understanding features of the system 110 allow the system 110 to automatically observe user actions and state of objects in the scene 1300, and provide feedback and warnings as needed.

The scene understanding features of the system 110 allows the system 110 to provide information indicative of "danger areas" or potential exits that the user should not take due to hazards. Such information may be provided by, for example, virtue elements 1302 and 1304, and may take the form of warning triangles without callouts, for example. Hazards may be pre-identified and entered into system 110 and/or may be detected by other means, such as through the use of sensors. Such sensors may include, for example, building smoke detectors, and/or security cameras. Information related to hazards may also be integrated from reports from other users of the system 110 from user-borne sensing and user interfaces (e.g., FIG. 1, sensors 114, 116, 118, 120), which may include, for example, image processing of video from a system worn by another user who can see the hazard, by processing a verbal report form a user such as "Hallway E is on fire", and/or by processing a gesture from a user such as drawing an "X" over a doorway.

Referring now to FIG. 2, an embodiment of the platform 132 is shown in greater detail, in the context of an environment that may be created during the operation of the system 110 (e.g., an execution or "runtime" environment). The illustrative platform 132 is embodied as a number of computerized modules, components, and/or data structures, each of which is implemented as software, firmware, hardware, or a combination of hardware, firmware, and software. In general, as used herein, "module," "subsystem," "service" and similar terminology may refer to computer code, instructions, and/or electronic circuitry, which may be embodied in a non-transitory computer accessible medium such as memory, data storage, and/or processor hardware.

The illustrative platform 132 includes a number of sensor services modules 210 (a snapshot/video DVR module 212, a 6DOF localization module 214, a speech recognition module 216, and a gesture/touch interpreter module 218), a number of scene understanding services 220 (a preemptive local processing module 222, an on-demand local processing module 224, and an on-demand cloud processing module 226), a multi-modal user intent understanding subsystem 228, a dynamic information aperture reasoning subsystem 230 (including user interface coordination workflows 232 and backend services workflows 234); knowledge base services 236 (including active context processor 238, which generates, e.g., observations 240, 242) and knowledge base processor 244 (where knowledge is represented as, e.g., entities 246 and relationships 248), display services 250 (including heads up display services 252 and wearable/hand carried display services 254), audio output services 256, and collaboration services 258 (including cross-device data synchronization services 260 and multimodal group chat services 262).

The illustrative snapshot/video DVR (digital video recorder) module 212 utilizes, e.g., DVR technology to select and record video from a live video feed. The illustrative 6DOF localization module 214 tracks the user's head movements relative to objects of interest in the scene 100, using algorithms for high precision and low latency, in order to provide accurate and jitter free insertion of overlays on the user's display device (e.g., see through eye wear). Regarding the scene understanding services 220, the preemptive local processing module 222 enables local processing, e.g., on a mobile device. The processing is preemptive (or proactive) in that it does need to be initiated by a user cue. In other words, the preemptive processing can respond to changes in the active context (as evidenced by, e.g., observations 240, 242 and/or user intent) by proactively offering AR-enabled suggestions and notifications at the mobile device. The on-demand local processing module 224 and the on-demand cloud processing module 226 may be responsive to user input such as a natural language query, request, or command. The system 110 may select the processing mode, e.g., local vs. cloud, based on the active context and/or other factors, such as the type of processing required (e.g., I/O intensive vs. computational intensive) by the request.

Regarding the dynamic information aperture reasoning subsystem 230, the user interface coordination workflows 232 may be embodied as, e.g., predefined rules, templates, scripts or sequences of computer programming logic that are initiated to update the user interface (e.g., to add or delete virtual elements/overlays) in response to the user intent generated by the intent understanding subsystem 228. The backend services workflows 234 may be embodied as, e.g., predefined rules, templates, scripts or sequences of computer programming logic that are initiated in order to perform the back end processing, such as rules for creating and storing e.g., in a database, links between different visual features of the scene 100, links between visual features and virtual elements, etc., based on scene understanding performed by the scene understanding services 220 and/or information retrieval results obtained by the dynamic information aperture reasoning 230. Alternatively or in addition, the backend services workflows 234 may construct and execute queries of the stored knowledge 106 and perform other information processing tasks, such as associating semantic elements determined by the scene understanding services 220 with portions of the scene 100. The DIA reasoning subsystem 230 dynamically adjusts the "filter" on the retrieval of stored knowledge 106 based on the user intent and/or active context.

Figure 19:
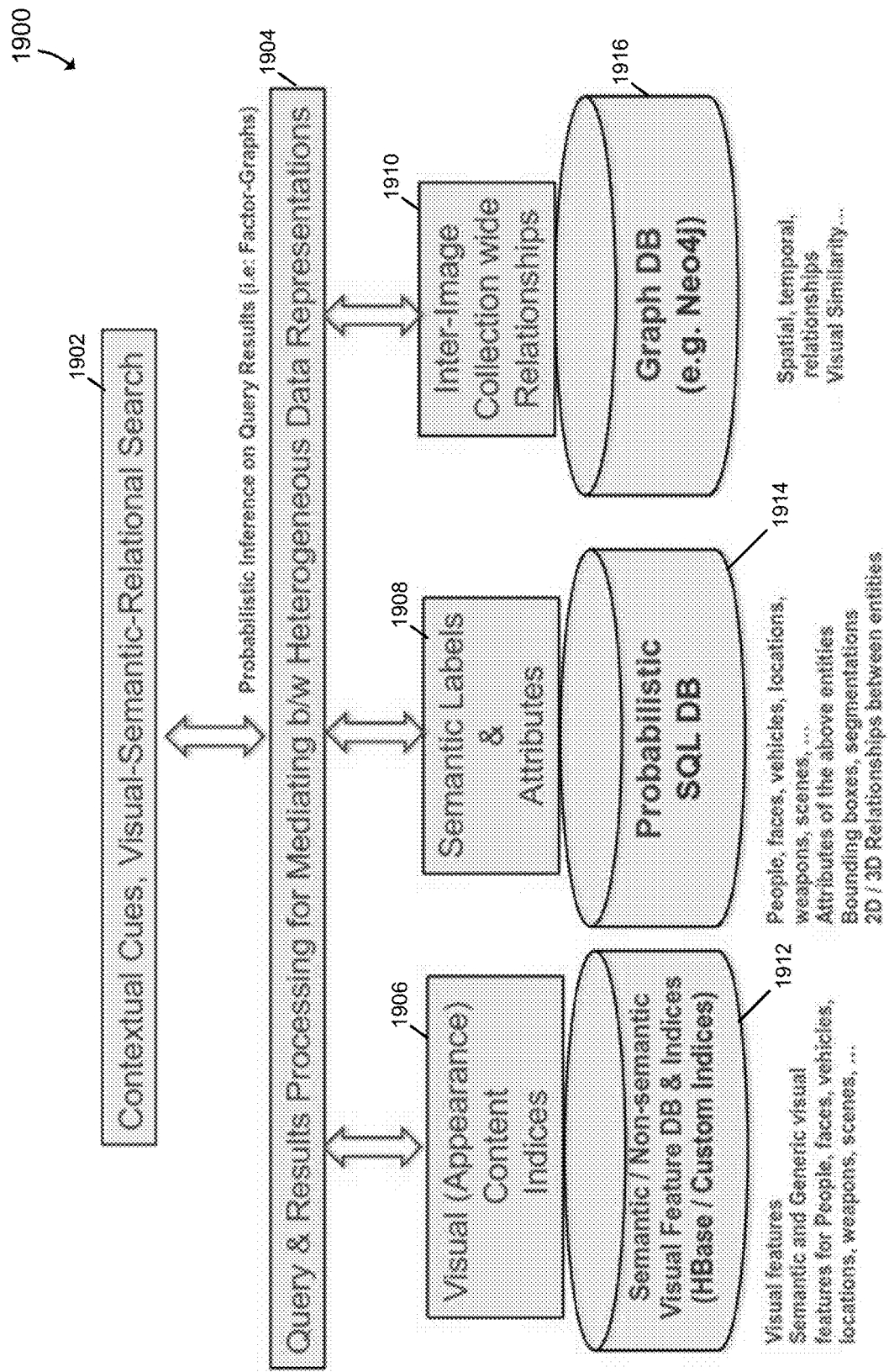
FIG. 19 is a simplified functional block diagram of at least one embodiment of semantic scene understanding technology that may be used to implement portions of the computing system of FIG. 1.
Figures 21A, 21B:
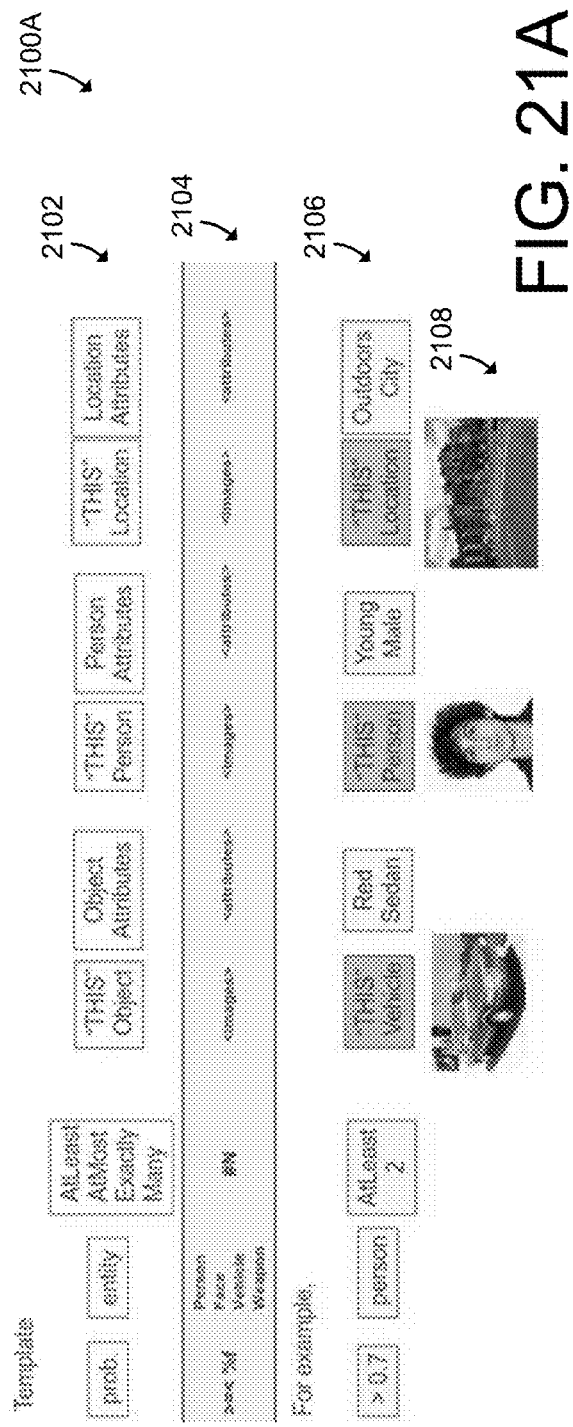
FIG. 21A is a simplified schematic illustration of at least one embodiment of vision-based query construction technology of the computing system of FIG. 1.
FIG. 21B provides a textual explanation of at least one embodiment of technology for semantic querying with visual attributes as disclosed herein, in connection with the exemplary illustration of FIG. 21A.

The DIA 230 encodes live information extracted from the scene 100 with prior or background knowledge 106. The live information can include not only video from cameras but also geographic location information, communications, and/or user inputs, in some embodiments. To encode the live information with elements of the knowledge 106, relational ontologies that define rules between entities and their hierarchies are used (e.g., FIG. 22), in some embodiments (e.g., built on core types that define entities; schema.org is an example). Alternatively or in addition, multi-relational graphs (e.g., FIGS. 23-24) can be used to encode live information with prior/background knowledge 106. Illustrative technology for drawing inferences from semantic graphs is described in, for example, SRI International's published technical report, "Link Analysis Workbench," AFRL-IF-RS-TR-2004-247 (September 2004), available online at https://fas.org/irp/eprint/law.pdf. The dynamic information aperture technology 230 can use contextual cues extracted from the scene 100 to answer complex semantic and visual queries in real time with low latency and high accuracy. An example of this capability is shown in FIGS. 21A-21B. An illustrative backend architecture for enabling this capability is shown in FIG. 19 and is also described in U.S. patent application Ser. No. 14/452,237, filed Aug. 5, 2014 ("Multi-Dimensional Realization of Visual Content of an Image Collection").

The illustrative knowledge base services 236 determine and generate the relationships or links between live events (as interpreted by the scene understanding services 220) and the stored knowledge 106. The knowledge base services 236 generate and maintain (e.g., stored in a searchable database) the observations 240, 242, which connect the elements of the scene 100 with the correlated subsets of the stored knowledge 106.

The illustrative collaboration services 258 include data synchronization services 260, which coordinate the display of data across multiple computing devices (either multiple devices of the user or devices of different users of the system 110), e.g., so that virtual elements are displayed consistently and updated appropriately in real time across the devices. The multimodal group chat services 262 employ interactive messaging (e.g., Internet relay chat or IRC) technology to enable users of the system 110 to share virtual elements with one another in a live, real time communication environment.

FIG. 29 illustrates an alternative embodiment 2900 of the architecture shown in FIG. 2. The embodiment of FIG. 29 implements a collection plan 2902 along with other features described herein. Illustratively, the collection plan 2902 includes a set of predefined links between entities and information and a set of predefined workflows (e.g., when you see a face, perform face recognition using this algorithm, etc.). Additionally, FIG. 29 illustrates examples of visual scene (image processing) technology, including people recognition 2904, vehicle recognition 2906, locale recognition 2908, significance of operation reasoning 2910. Publicly available feature recognition technology may be used to implement these visual feature recognition features. Alternatively or in addition, examples of visual feature recognition technology are disclosed in one or more of the materials incorporated herein by reference. For example, static visual features include features that are extracted from individual keyframes of a video at a defined extraction rate (e.g., 1 frame/second). Some examples of static visual feature detectors include Gist, SIFT (Scale-Invariant Feature Transform), and colorSIFT. The Gist feature detector can be used to detect abstract scene and layout information, including perceptual dimensions such as naturalness, openness, roughness, etc. The SIFT feature detector can be used to detect the appearance of an image at particular interest points without regard to image scale, rotation, level of illumination, noise, and minor changes in viewpoint. The colorSIFT feature detector extends the SIFT feature detector to include color keypoints and color descriptors, such as intensity, shadow, and shading effects. Dynamic visual features include features that are computed over x-y-t segments or windows of a video. Dynamic feature detectors can detect the appearance of actors, objects and scenes as well as their motion information. Some examples of dynamic feature detectors include MoSIFT, STIP (Spatio-Temporal Interest Point), DTF-HOG (Dense Trajectory based Histograms of Oriented Gradients), and DTF-MBH (Dense-Trajectory based Motion Boundary Histogram). Some additional examples of feature detection algorithms and techniques, including low-level, mid-level, and semantic-level feature detection and image recognition techniques, are described in Cheng et al., U.S. Utility patent application Ser. No. 13/737,607 ("Classification, Search, and Retrieval of Complex Video Events"); and also in Chakraborty et al., U.S. Utility patent application Ser. No. 14/021,696, filed Sep. 9, 2013 ("Recognizing Entity Interactions in Visual Media").

Further, FIG. 29 highlights the real time/live link/metadata extraction technology 2912, described herein. In the embodiment of FIG. 29, a pre-defined data collection plan is used to guide the visual feature extraction. Semantic correlation as described herein between visual elements and/or between visual elements and stored knowledge can produce new links 2914 between elements or between elements and knowledge.

Figure 14:
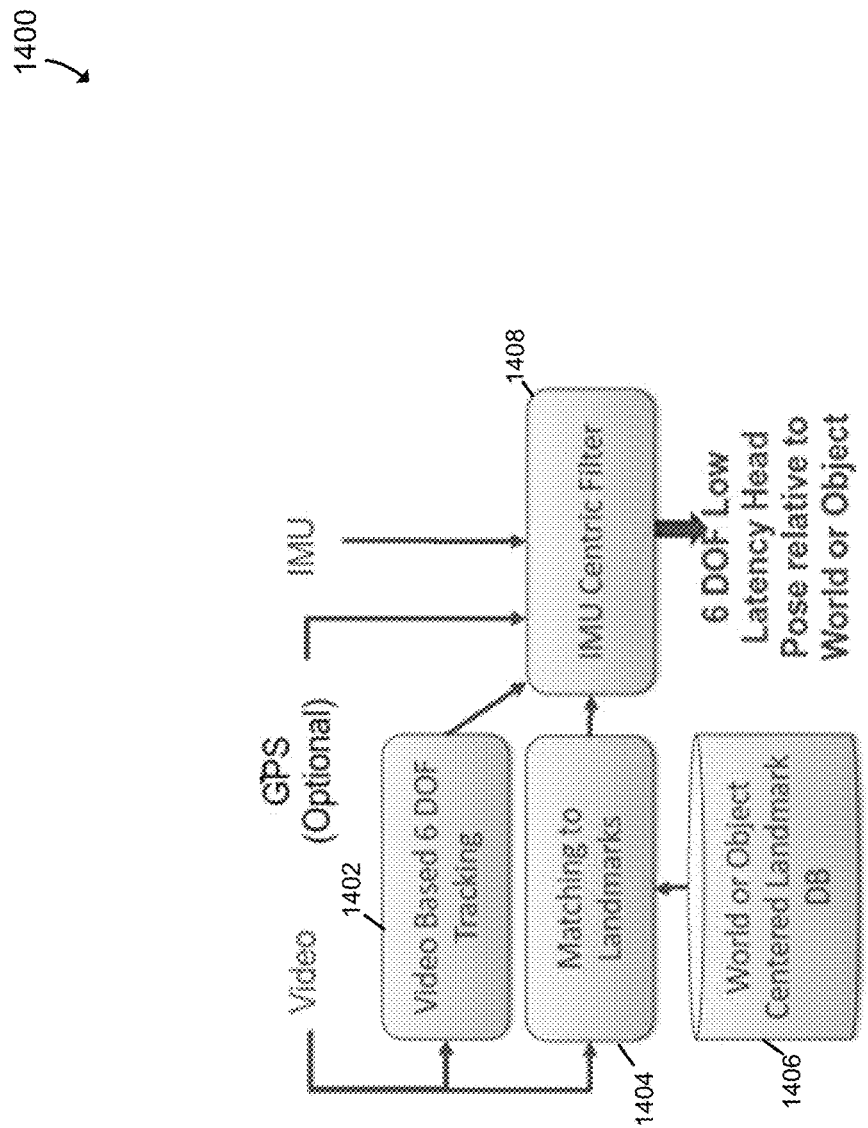
FIG. 14 is a simplified functional block diagram of at least one embodiment of the six degrees of freedom (6DOF) localization module of FIG. 2.

FIG. 14 illustrates further details of an embodiment of the 6DOF localization module 214. The illustrative implementation 140 of the 6DOF localization module 214 includes a video based 6DOF tracking module 1402, a landmark matching module 1404, a searchable database 1406, which includes world or object-centered landmarks, and an inertial measurement unit (IMU) centric filter 1408. Each of the modules and data structures 1402, 1404, 1406, 1408 may be implemented in software, hardware, firmware, or a combination thereof, e.g., as units of computer code implemented using a programming language such as Java, C++, or Python, and/or data structures (e.g., eXtensible Markup Language or XML data structures) and stored in computer memory (e.g., non-transitory machine readable media). Briefly, the modules 1402, 1404 receive and analyze the video inputs provided by the user's camera device, apply one or more computer vision algorithms to the video inputs to extract visual features, such as people and objects, and search the database 1406 for information about the extracted visual feature (e.g., geographic location, person or object identification, etc.). The IMU centric filter 1408 correlates the geographic location information extracted from the video inputs with the output of the user's IMU sensor (typically embedded in or integrated with the user's mobile device) to determine the user's head position or pose, relative to the scene depicted in the video. In other words, the functionality provided by the 6DOF localization module 1400 allows the system 110 to continuously in live time answer the question, what part of the world is the user looking at right now?

Figure 15:
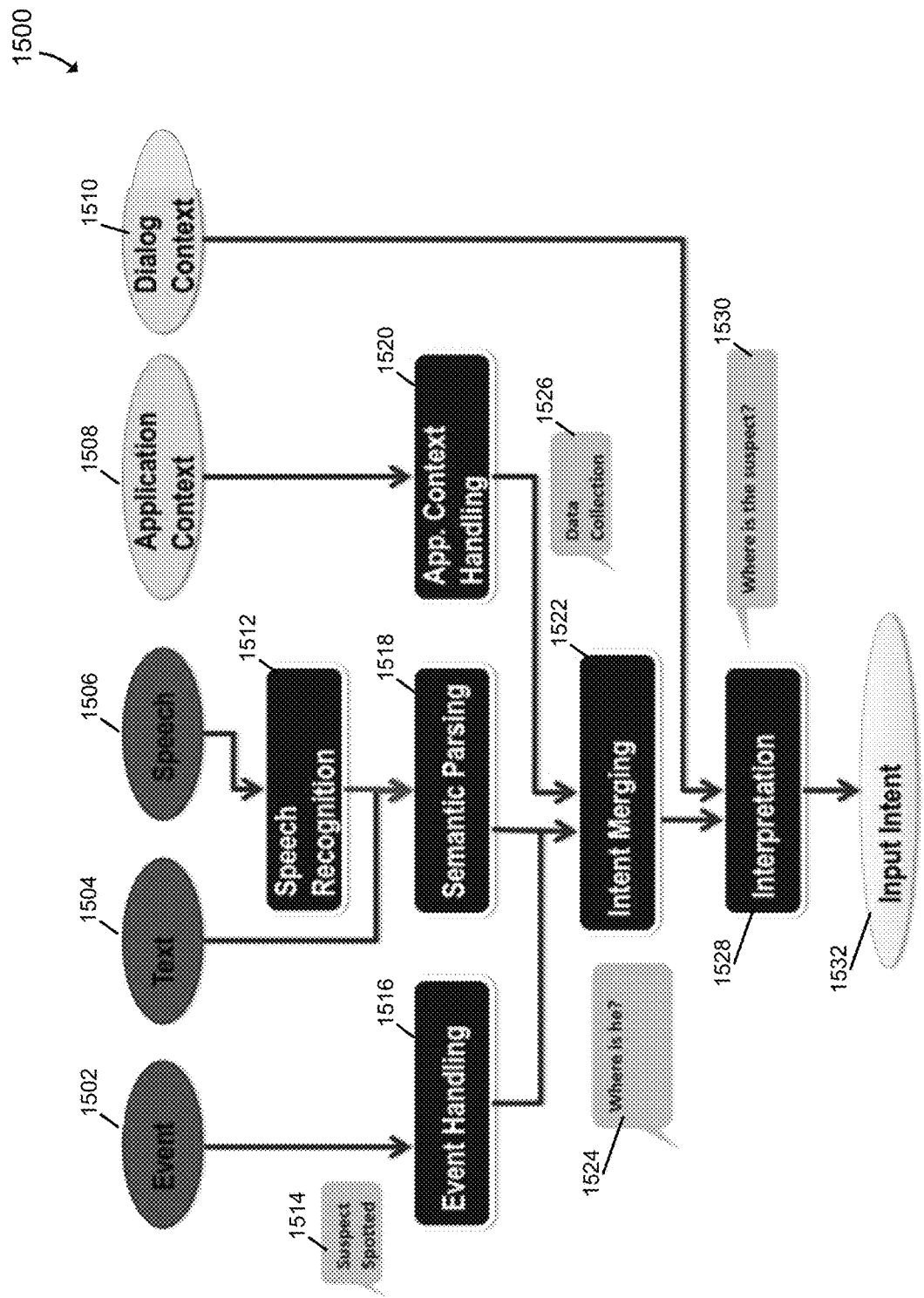
FIG. 15 is a simplified functional block diagram of at least one embodiment of the multi-modal user intent understanding subsystem of FIG. 2.

FIGS. 15, 18, 20, 25, 26 illustrate further details of embodiments of the intent understanding subsystem 228. FIG. 15 illustrates a technique for receiving, processing and correlating multiple different inputs that relate to a user interaction in order to determine a user intent (input intent 1532). In the illustrative example, the subsystem 1500 processes inputs including events 1502 (e.g., software application events, such as tapping, video capture, etc.), text 1504 (e.g., user typing), speech 1506, application context 1508 (e.g., environmental sensor data, such as geographic data, motion data, etc.), and dialog context 1510 (e.g., dialog history, including previous rounds of dialog, which may or may not relate to the current interaction). An event handler 1516 processes the application events 1502. In the illustration, the event handler 1516 performs image processing and recognizes a subject in a video feed supplied by the application event 1502. As illustrated by the box 1514, the system 110 may issue output to alert the user that "the suspect has been spotted." The natural language text 1504 is merged with text produced by a speech recognition subsystem 1512 as a result of handling the speech input 1506. A semantic parser 1518 (e.g., a rules-based parser or statistical inference based parser, or combination thereof) parses the natural language input corresponding to the text 1504 and/or speech 1506 (e.g., syntactic and/or semantic parsing) and generates an interpretation of the input (i.e., what did the person say, is it a question or a request, what is the user looking for, etc.). An application context handler 1520 interprets the application context data 1508; for example to resolve the user's current location based on GPS inputs or to resolve the user's current activity status (e.g., sitting, walking, running, or driving) based on motion inputs. An intent merging module The intent merging module 1522 correlates the outputs of the event handler 1516, the semantic parser 1518, and the application context handler 1520 and formulates one or more intents. To do this, the system 110 may apply rules or templates to insert arguments into appropriate fields of a data structure that is designed to capture the user's intent in a structured way (e.g., instantiate or populate fields of an XML data structure). At this level, the system 110 reasons that the user's intent involves data collection about a person (box 1526) (e.g., the person spotted at 1514) and more specifically that the user is interested in knowing where the person of interest is located (box 1524). The interpretation module 1528 generates the final input intent 1532 (e.g. a structured version of the inquiry "where is the suspect?" such as get_location(object=person, gender=male)) by informing the merged multimodal intent produced by the intent merging module 1532 with information obtained from the dialog context 1510 (e.g., the dialog history). In this case, the system 110 gleans from the dialog context 1510 that the person of interest is a "suspect." As such, continuing the illustrated example, the final input intent 1532 may be get_location(object=person, gender=male, type=known suspect).

Figure 18:
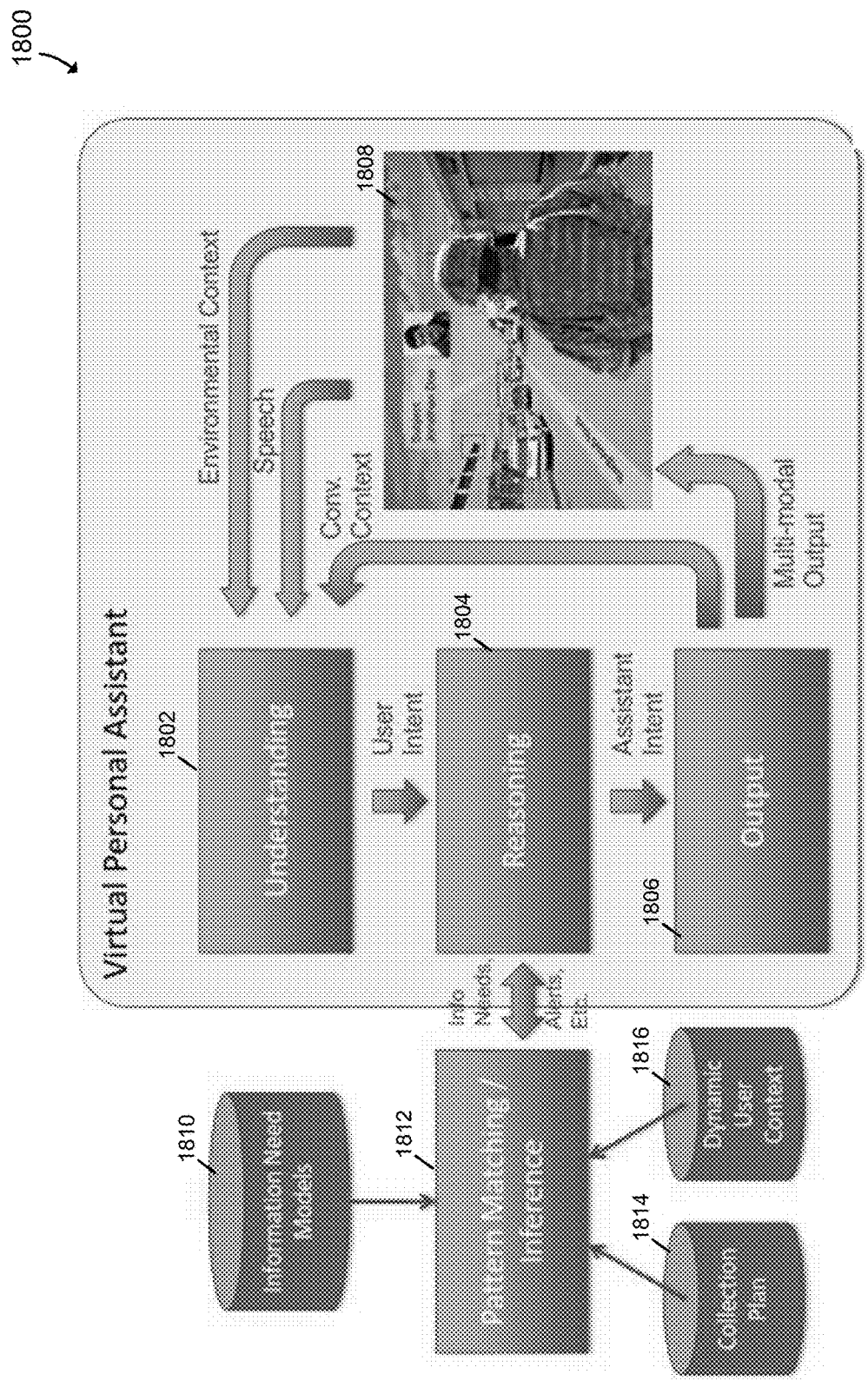
FIG. 18 is a simplified functional block diagram of at least one embodiment of virtual personal assistant technology that may be used to implement portions of the vision-based user interface platform of FIG. 1.

FIG. 18 illustrates a schematic view of another embodiment 1800 of virtual personal assistant technology that may be used to implement the multimodal dialog features of the system 100. In the embodiment 1800, an understanding module 1802 produces a user intent using, e.g., technology such as that described above with reference to FIG. 15. A reasoning module 1804 analyzes the user intent and determines a course of action for the system 110 to follow in order to handle or respond to the user intent. To do this, the reasoning module 1804 may apply one or more pattern matching algorithms or statistical or rules-based inference algorithms, which in turn utilize a plurality of data sources or knowledge bases such as information need models 1810, collection plan 1814, and dynamic user context 1816 (e.g., a combination of live and stored data) to perform inferencing. For example, the reasoning module 1804 may infer based on the user intent and processing performed by the inference module 1812 that there is a need to perform a query on a certain database to find the information the user is looking for. The reasoning module 1804 initiates the processing (which may be referred to as execution of task flows or workflows) that it determines to be most appropriate in response to the user intent and produces an output intent or "assistant intent). The reasoning module 1804 supplies the output intent/assistant intent to an output generator module 1806, which converts the result of task flow/workflow execution and/or other processing initiated by the reasoning module 1804 into suitable output, e.g., graphical/textual overlays, system-generated natural language, etc., and sends the output to the appropriate output device (e.g., display, speaker), as illustrated by augmented image 1808. The system is iterative or "closed loop" in the sense that the results of the system's interpretation and reasoning process can be fed back to the understanding module 1802 to inform and perhaps improve the system's future understanding efforts. Additionally, speech, context information, and/or other interaction data may be captured as a result of subsequent user interactions with the system 110 as a result of the user viewing the augmented display 1808. These inputs can be fed back to the understanding module 1802, e.g., to continue a multiple round dialog with the user.

Figure 20:
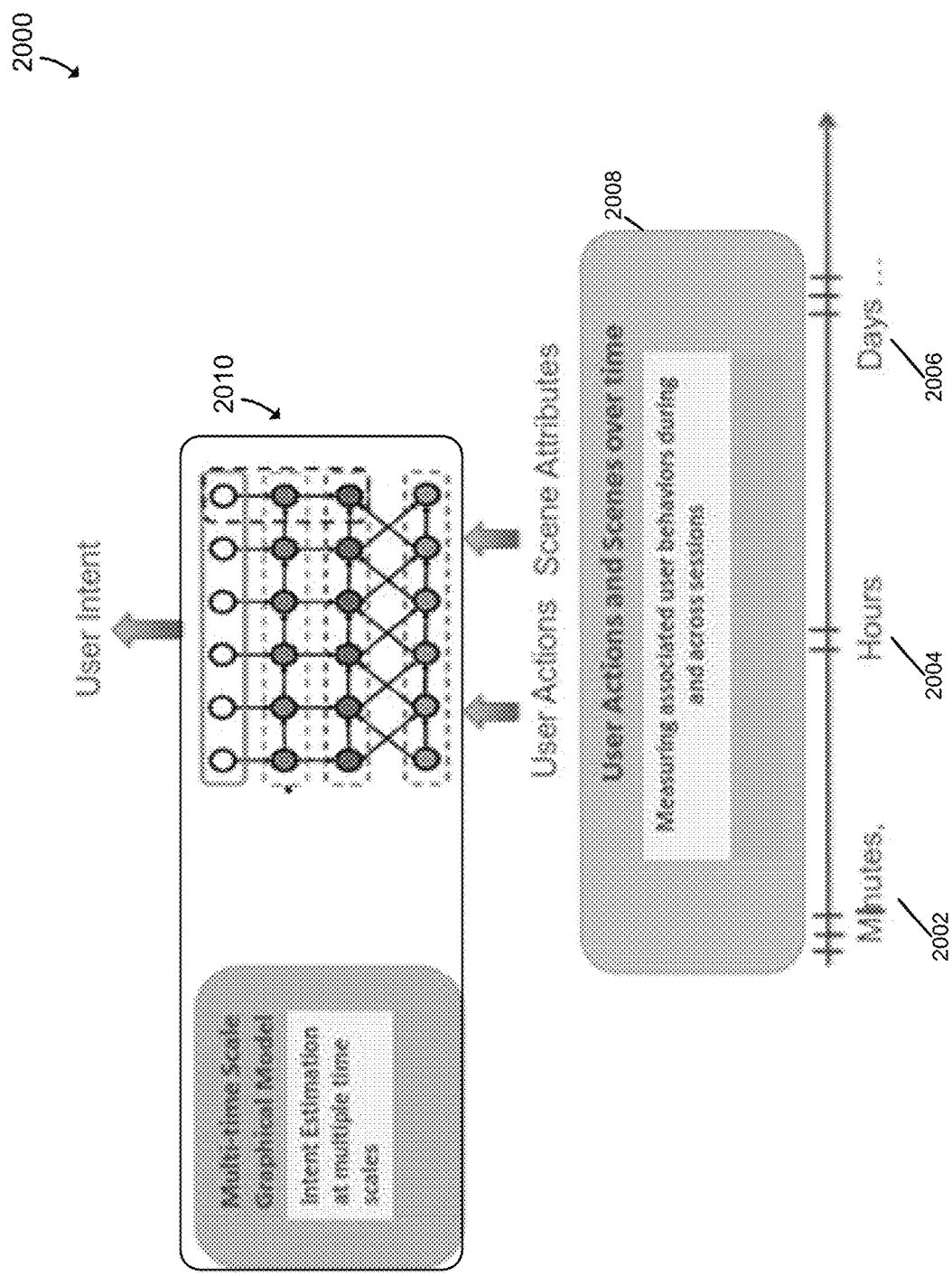
FIG. 20 is a simplified functional block diagram of at least one embodiment of interaction interpretation technology that may be used to implement portions of the multi-modal user intent understanding subsystem of FIG. 2.
Figure 25:
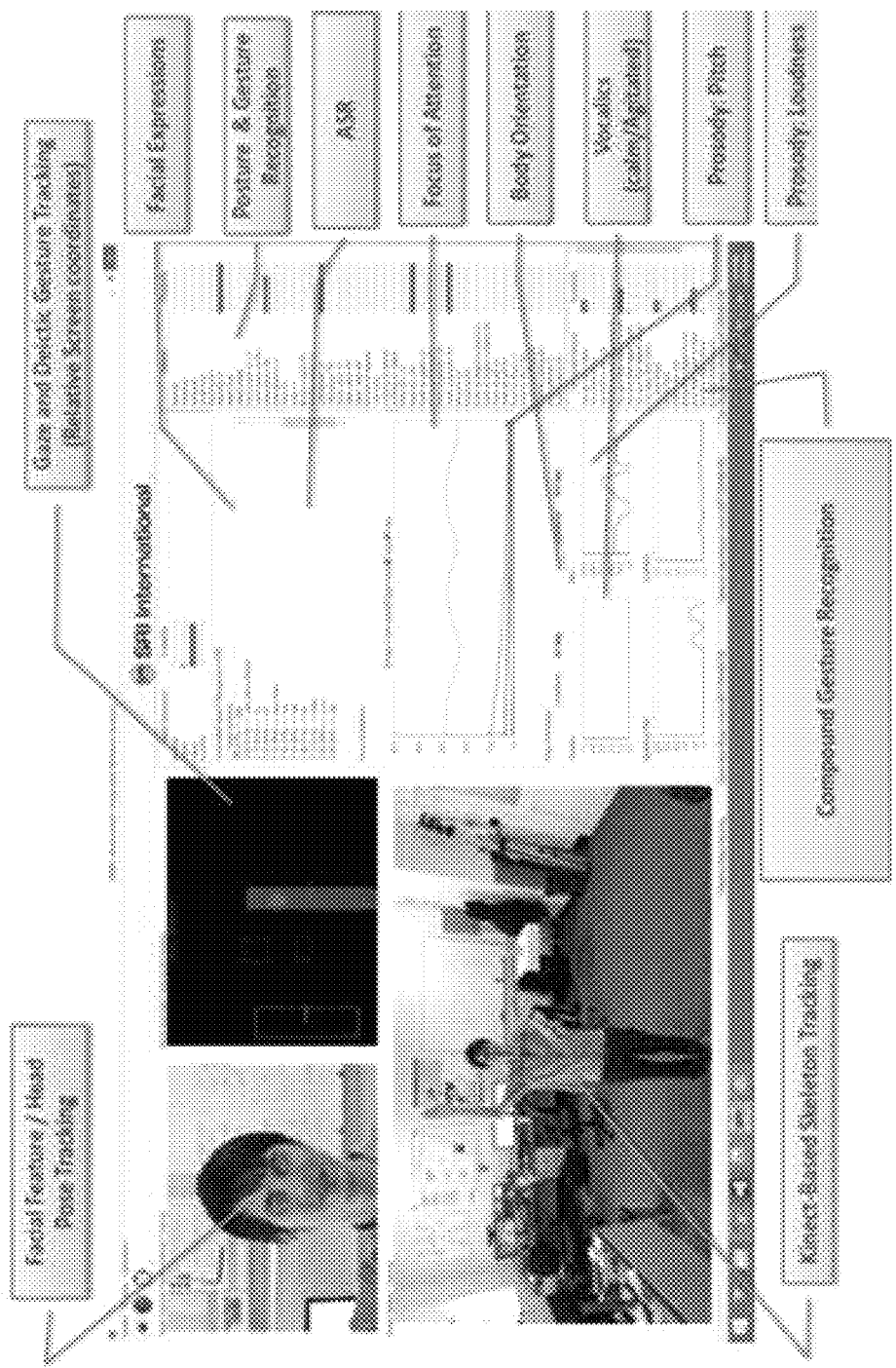
FIG. 25 is a simplified illustration of at least one embodiment of multi-modal user behavior and gesture sensing technology that may be used to implement portions of the vision-based user interface platform of FIG. 1.

FIG. 20 illustrates an embodiment 2000 of technology that can be used to improve the system 110's development of the user intent by observing and analyzing user actions and scenes over multiple different time scales (e.g., minutes 2002, hours 2004, days 2006). The embodiment 2000 uses a number of sensing devices to capture multimodal inputs (including user interaction data and visual scene attributes) over the different time scales, estimates the user intent at the different time scales (e.g., short, medium and long term intents) using, e.g., a graphical modeling approach such as a probabilistic statistical model 2010. The model 2010 is exercised to produce a final user intent, which is informed by small and/or large scale changes in the user's behavior or the visual scene over time. For example, by modeling user behavior over multiple time scales, the system 110 may be able to match a current facial expression with a similar expression of the user several days ago, and align the interpretation of the current expression with the interpretation of the previous similar expression, to resolve, for example, affective state of the user (e.g., mouth open indicates weariness rather than agitation, etc.). These affective state indicators can be incorporated into the intent understanding system described above with reference to FIG. 15. SRI International's U.S. patent application Ser. No. 13/755,775, filed Jan. 31, 2013 (US 2014-0212853) ("Multi-modal Modeling of Temporal Interaction Sequences") describes additional examples of technology that may be used for this purpose. FIG. 25 illustrates a KINECT-based system that may be used to collect user affective state-related information that is processed by the technology of FIG. 20. The data capture and analysis system of FIG. 25 can extract from a video, algorithmically recognize and analyze a number of different sensor outputs relating to facial expression, head pose, gaze (e.g., focus and/or duration of attention), posture, gesture, body orientation, speech, vocalics, prosody (e.g., pitch and/or loudness).

Figure 26:
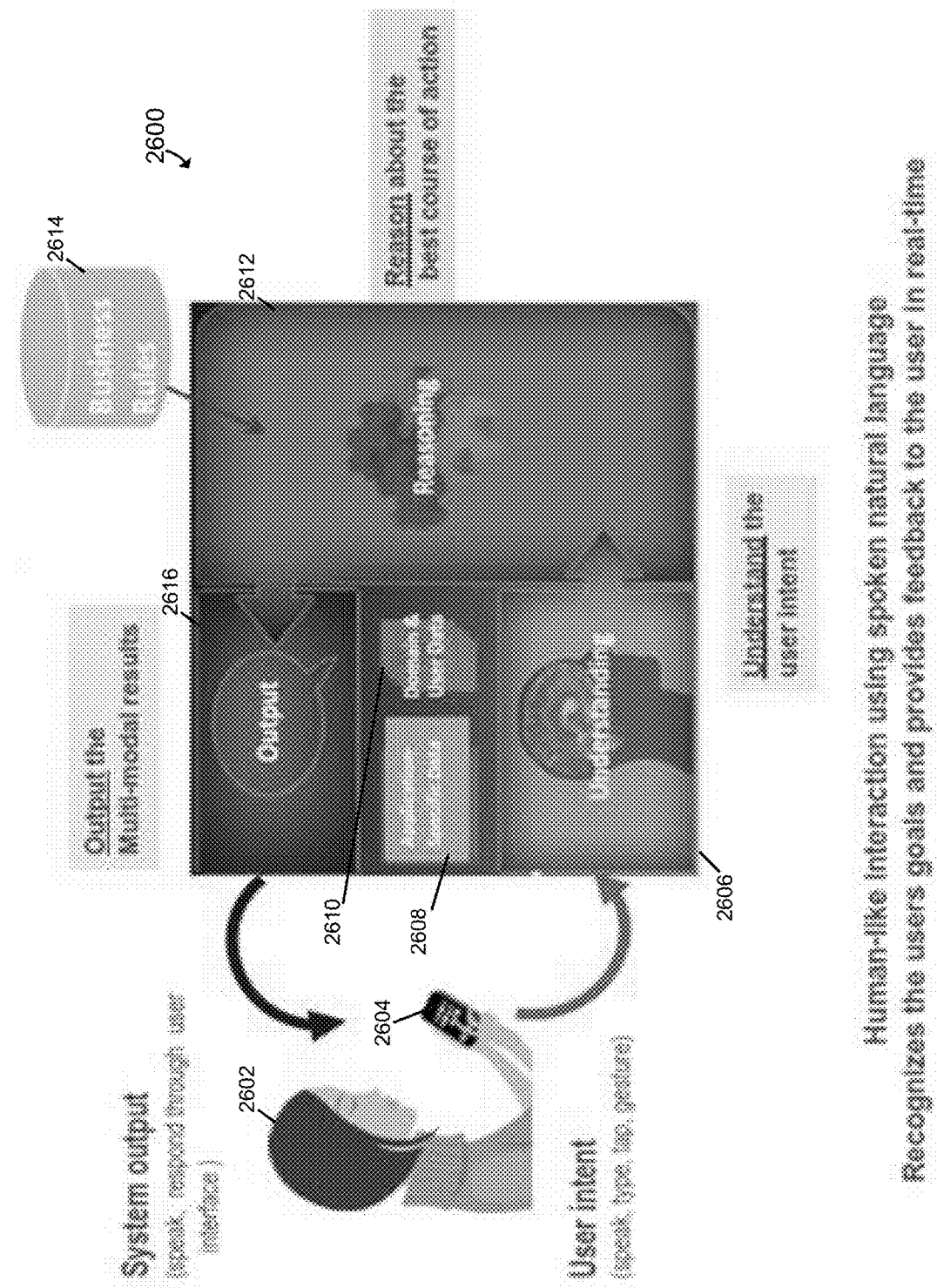
FIG. 26 is a simplified schematic illustration of at least one embodiment of multi-modal human-machine interaction technology that may be used to implement portions of the computing system of FIG. 1.

FIG. 26 schematically illustrates the operation of an embodiment 2600 of a multimodal virtual personal assistant system architecture. The embodiment 260 may include any of the virtual personal assistant technology components described elsewhere herein. FIG. 26 illustrates an iterative loop involving the user 2602 and the system 2600. The user 2602 inputs speech, typed text, taps, gestures, etc. (any type of human-machine interaction), using a computing device 2604 (here, a mobile device). An understanding module 2606 processes the inputs and generates an understanding of the user's intent. The reasoning module 2612 performs e.g., rules-based or statistical inferencing to determine a course of action for the system 110 to execute in response to the user intent. To do this, the reasoning module 2612 may apply domain-specific business rules 2614, application-specific data and/or domain and user data. For example, the user intent may be handled differently by the system 110 depending on the particular application (e.g., an e-commerce inquiry might be handled differently from a financial transaction or an emergency response scenario). The reasoning module 2612 initiates, e.g., task flows or workflows (e.g., programming logic to invoke external services such as search engines or external applications such as mapping software, etc.), and forwards the results to the output module 2616. The output module 2616 outputs the multi-modal results to the user's device 2604 (e.g., a combination of visual overlays and system-generated NL dialog).

Figure 16:
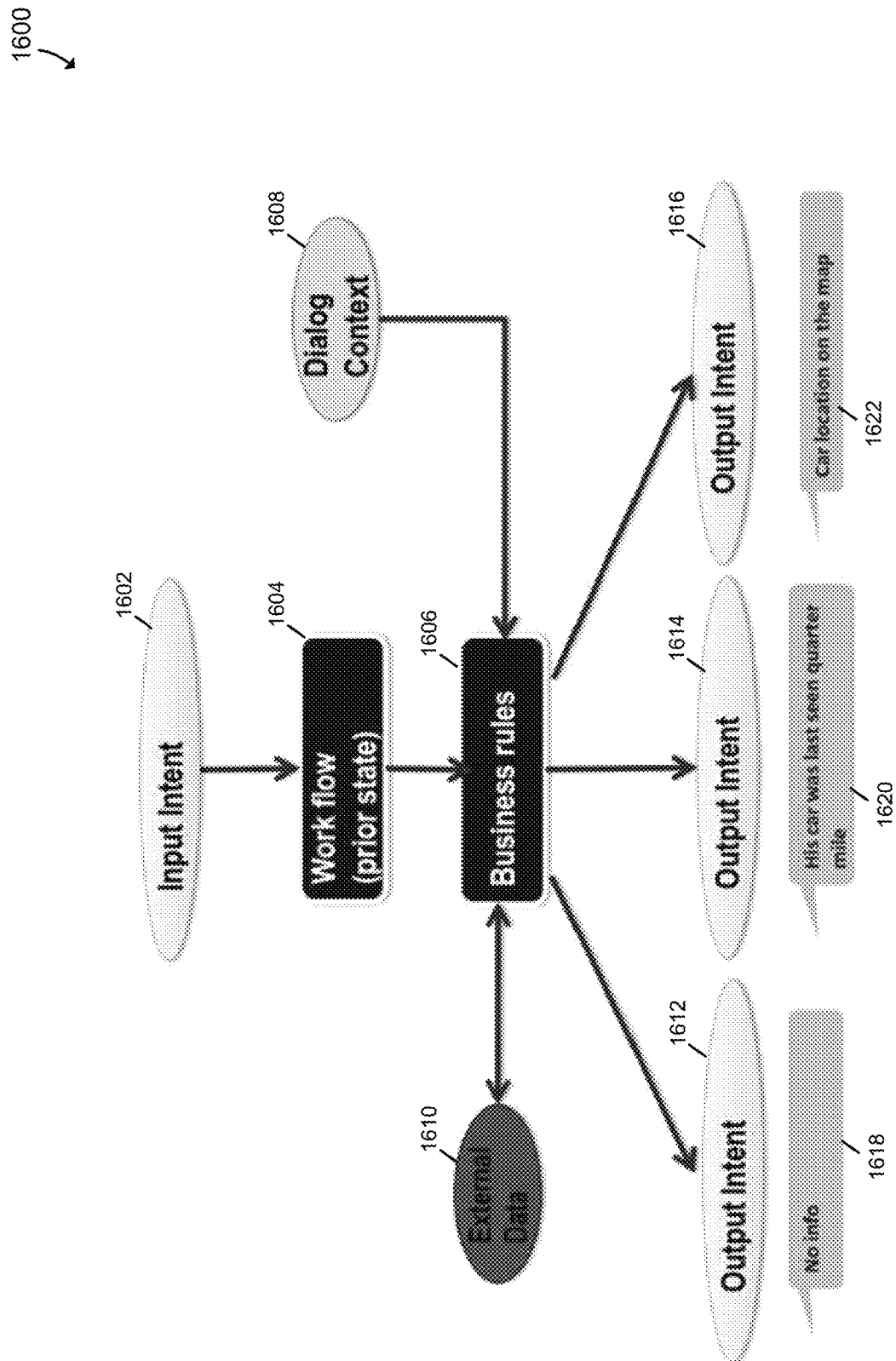
FIG. 16 is a simplified functional block diagram of at least one embodiment of the dynamic information aperture reasoning subsystem of FIG. 2.

FIGS. 16, 18, 19, 21A, 21B, 22-24, 26, and 33-34 illustrate further details of embodiments of the dynamic aperture reasoning subsystem 230. FIG. 16 illustrates an embodiment 1600 of reasoning functionality that processes an input intent 1602, e.g., the final input intent produced by the functionality of FIG. 15. Based on the input intent 1602, the reasoner 1600 determines where in a predefined workflow 1604 (e.g., a dialog template) the current dialog state aligns, or, retrieves information about the prior state, the previous task(s) that have been executed by the system 110. The reasoner 1600 executes one or more business rules 1606 incorporating external data 1610 and/or information gleaned from the dialog context 1608, as needed, based on the state of the workflow determined in 1604. The reasoner 1600 generates one or more output intents 1612, 1614, 1616, each of which may be configured to cause the system 110 to execute a different type of task or process. For example, in response to a user asking "who is that?" the reasoner 1600 may need to analyze gesture and/or gaze data to determine the person in the scene to whom the user is referring as "that", and then initiate a face recognition algorithm to identify such person, and then initiate a search query to determine additional details about the person (e.g., residence, employment status, etc.). The dialog boxes 1618, 1620, 1622 illustrate examples of output intents that may be produced by the reasoner 1600. FIG. 18 is described above.

Figure 22:
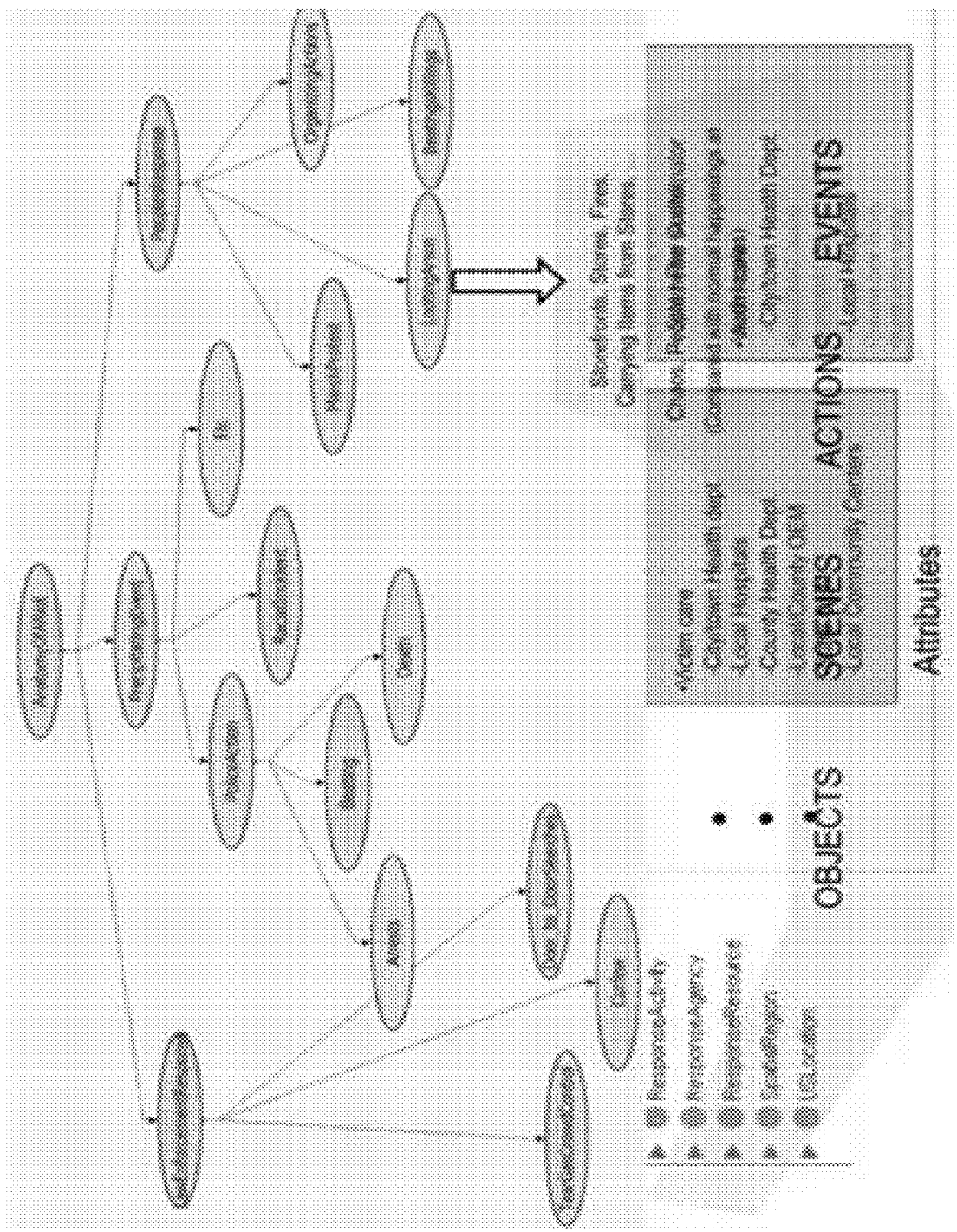
FIG. 22 is a simplified schematic illustration of at least one embodiment of a data structure that may be used to implement portions of the dynamic information aperture technology disclosed herein.
Figure 23:
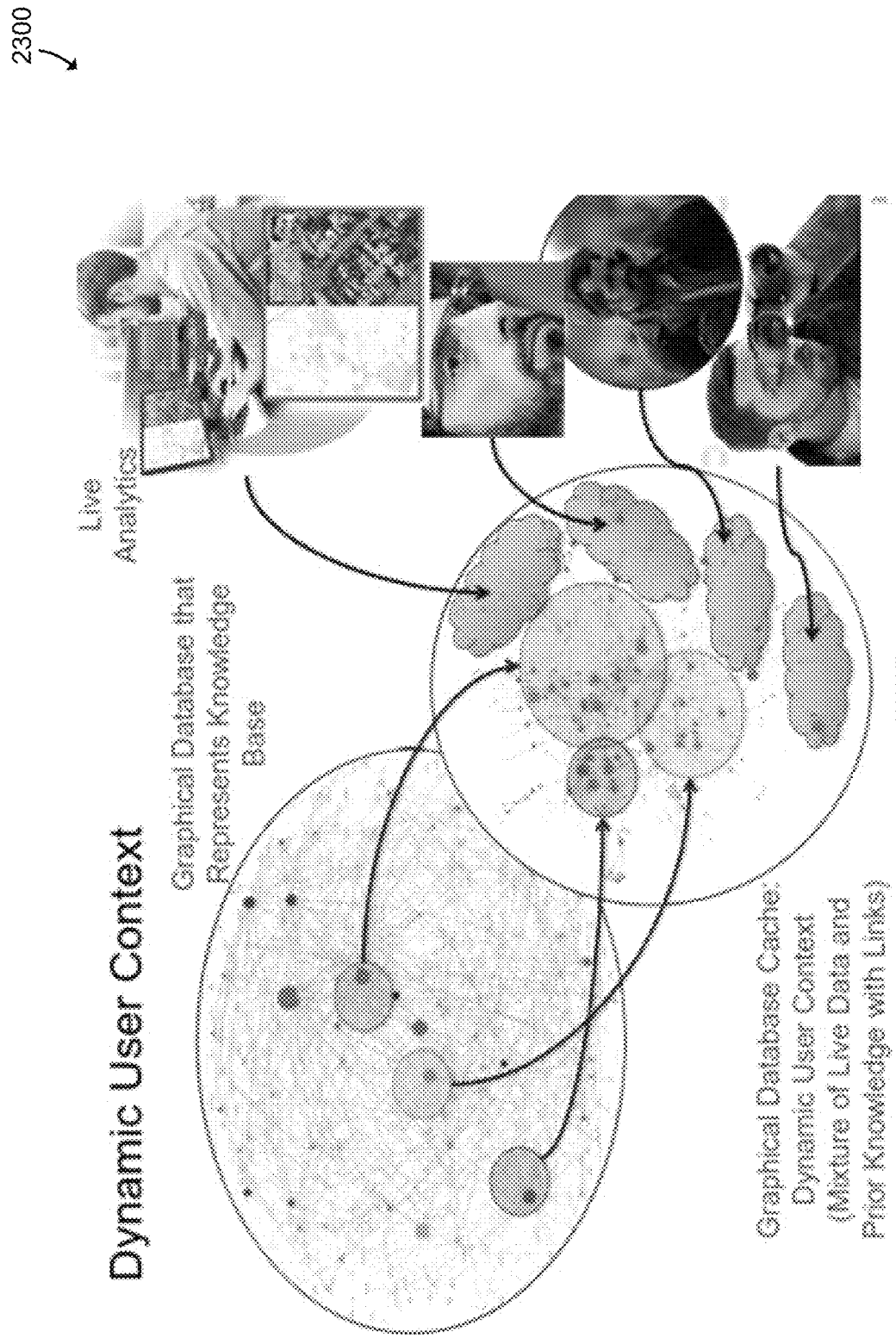
FIG. 23 is a simplified illustration of at least one embodiment of a graphical database that represents a knowledge base in a dynamic user context.
Figure 24:
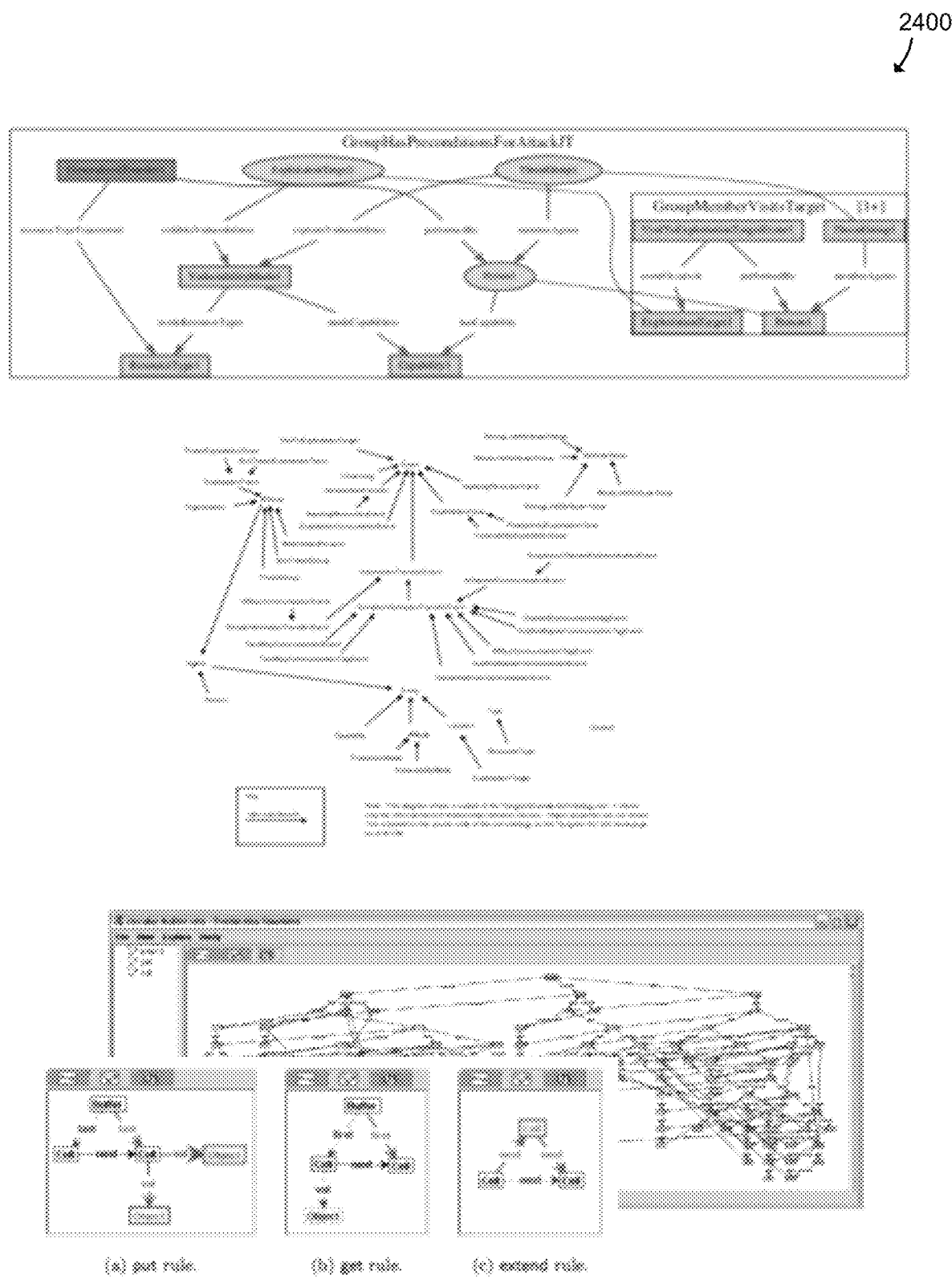
FIG. 24 is a simplified illustration of at least one embodiment of a graphical database that may be used to implement portions of the dynamic user context technology disclosed herein, in which live data can be dynamically linked with stored knowledge.

FIG. 19 illustrates an embodiment 1900 of technology that may be used by the system 110 to perform semantic visual feature recognition on portions of a visual scene captured by video. In some embodiments, the system 110 utilizes technology disclosed in U.S. patent application Ser. No. 14/452,237, filed Aug. 5, 2014 ("Multi-Dimensional Realization of Visual Content of an Image Collection") (U.S. patent application Publication Ser. No. tbd) to perform semantic visual feature recognition. In block 1902, the system 110 uses contextual cues such as geographic location, etc. in combination with visual features extracted from the video and performs visual-semantic-relational searching for information related to the extracted visual features. In block 1904, the system 110 processes the query results (e.g., by performing probabilistic inferencing using, e.g., factor-graphs). In doing so, the system 110 interfaces with data sources including a visual appearance content indices 1906, semantic labels and attributes 1908, and inter-image collection wide relationships 1910. In this way, the system 110 is able to detect not only visual similarities but also semantic relationships between visual features of different images/videos and semantic relationships between the extracted visual features and other multimodal types of information (e.g., text descriptions retrieved from a knowledge source, etc.). FIGS. 22-24 illustrate examples of graphical database technology that may be used to implement the features of the technology described in FIG. 19 in order to identify and generate semantic correlations between visual features and other knowledge.

FIGS. 21A-21B illustrate an example of a type of query generation 2100A that is enabled by the technology of FIGS. 19, and 22-24. In the example, the user's query includes a combination of natural language speech and visual elements shown in one or more frames of a video or images. For example, the user viewing the video scene may say, "find me this vehicle with this person at this location (where "this vehicle" is defined by an image, "this person" is defined by a different image, and "this location" is defined by yet another image) (e.g., images 2108). The system 2100A uses a multimodal template 2102, 2104 to generate the multimodal query. The system 2100A interprets the combination of verbal and visual elements of the query by instantiating each of the fields of the template as shown at 2106. In the example, the system sets a likelihood threshold of 0.7 (e.g., a 0.7 probability of accuracy), and specifies that "at least 2" of the combination of elements described by the query be found. The visual feature extraction technology tags the image associated with the query text "this vehicle" with the label "red sedan" and tags the image associated with the query text "this person" with the label "young male" and tags the image associated with the query text "this location" with the label "outdoor city." The image tags may be generated through image processing or obtained via, e.g., previously performed manual tagging of the images. As a result, the final text query produced and executed by the system may state, "look for images of a red sedan with a young male in an outdoors city" and the text query may be augmented with the images that were associated with the inquiry by the user, to produce a multimodal query. In doing so, the system 110 establishes and preserves links between the images (or the extracted visual features) and the corresponding text content, e.g., image1/feature set 1→red sedan, image2/feature set2→young male, image3/feature set3→outdoors city. FIG. 21B provides additional explanation of the multimodal querying features of FIG. 21A.

Figure 33:
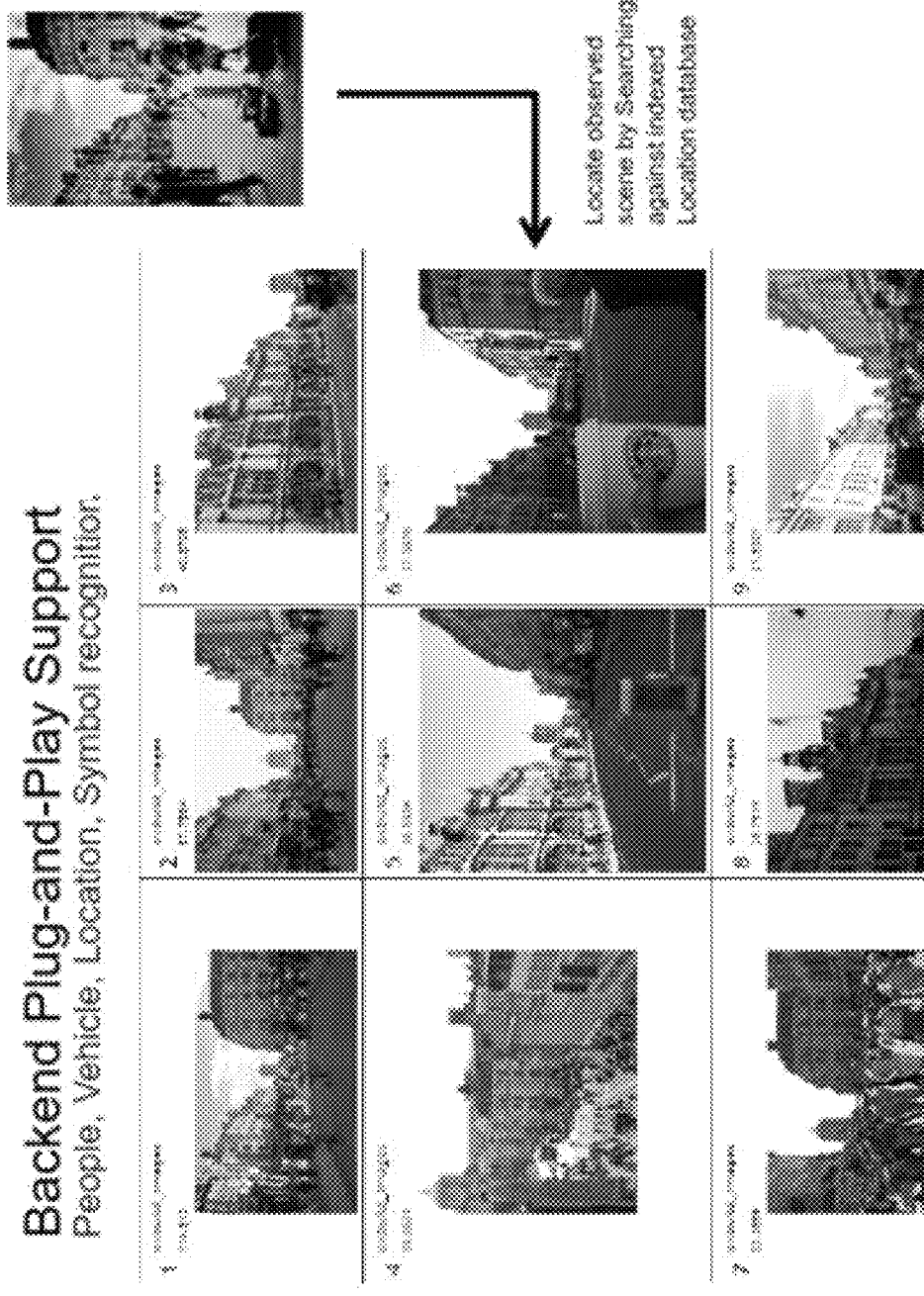
FIG. 33 is a simplified illustration of scene recognition technology that may be used to implement portions of the computing system of FIG. 1, including person, object, location, and symbol recognition.
Figure 34:
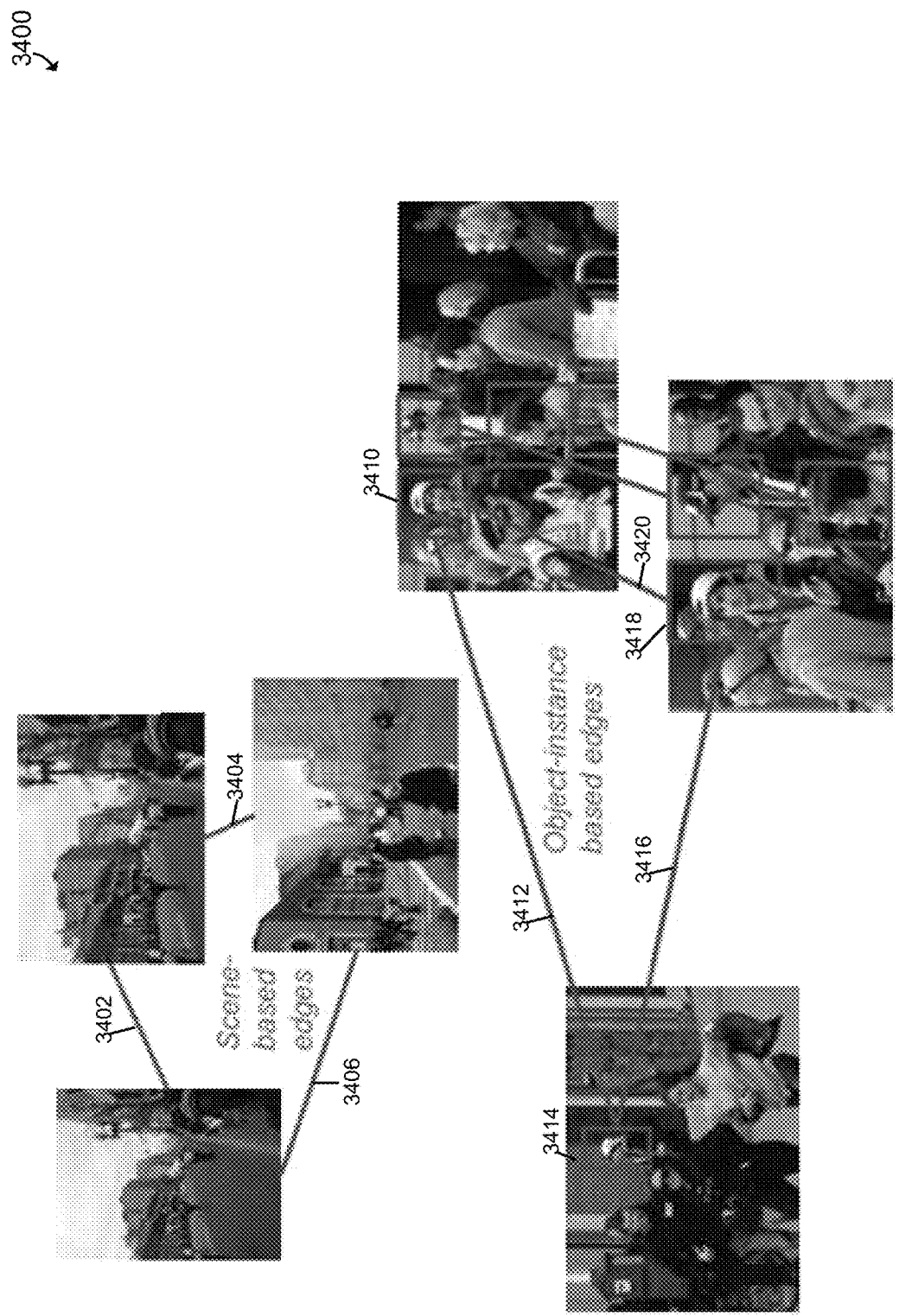
FIG. 34 is a simplified illustration of scene recognition technology that may be used to implement portions of the computing system of FIG. 1, including a use of edge detection technology to identify relationships between images.

FIG. 26 is described above. FIGS. 33-34 illustrate exemplary results of application the semantic visual feature matching technology of FIG. 19. In FIG. 33, the system extracts visual features from an image and uses the extracted features to locate the scene based on a matching of the extracted features to similar features in other images, where such other images have associated therewith geographic location information. In other words, the analyzed scene is geographically located based on visual similarity to another known location. In FIG. 34, an embodiment 3400 illustrates image processing using edge detection and matching algorithms. In the first example, scene based edges are detected using vision algorithm(s) and used to establish links 3402,

3404, 3406 between the images, which may be stored in a database (e.g., stored knowledge 106). In the second example, object-instance based edges are detected using vision algorithm(s) and use to match faces across multiple images and multiple different poses. This technology determines that the face 3410 extracted from one image is the same person as the face 3414 extracted from another image and the face 3418 extracted from yet another image, even though some of the extracted faces are partially obstructed or at different poses. Based on the determined similarity of the extracted faces, the system 1100 establishes the links 3412, 3416, 3420 and may store these links in e.g., knowledge 106.

Figure 32:
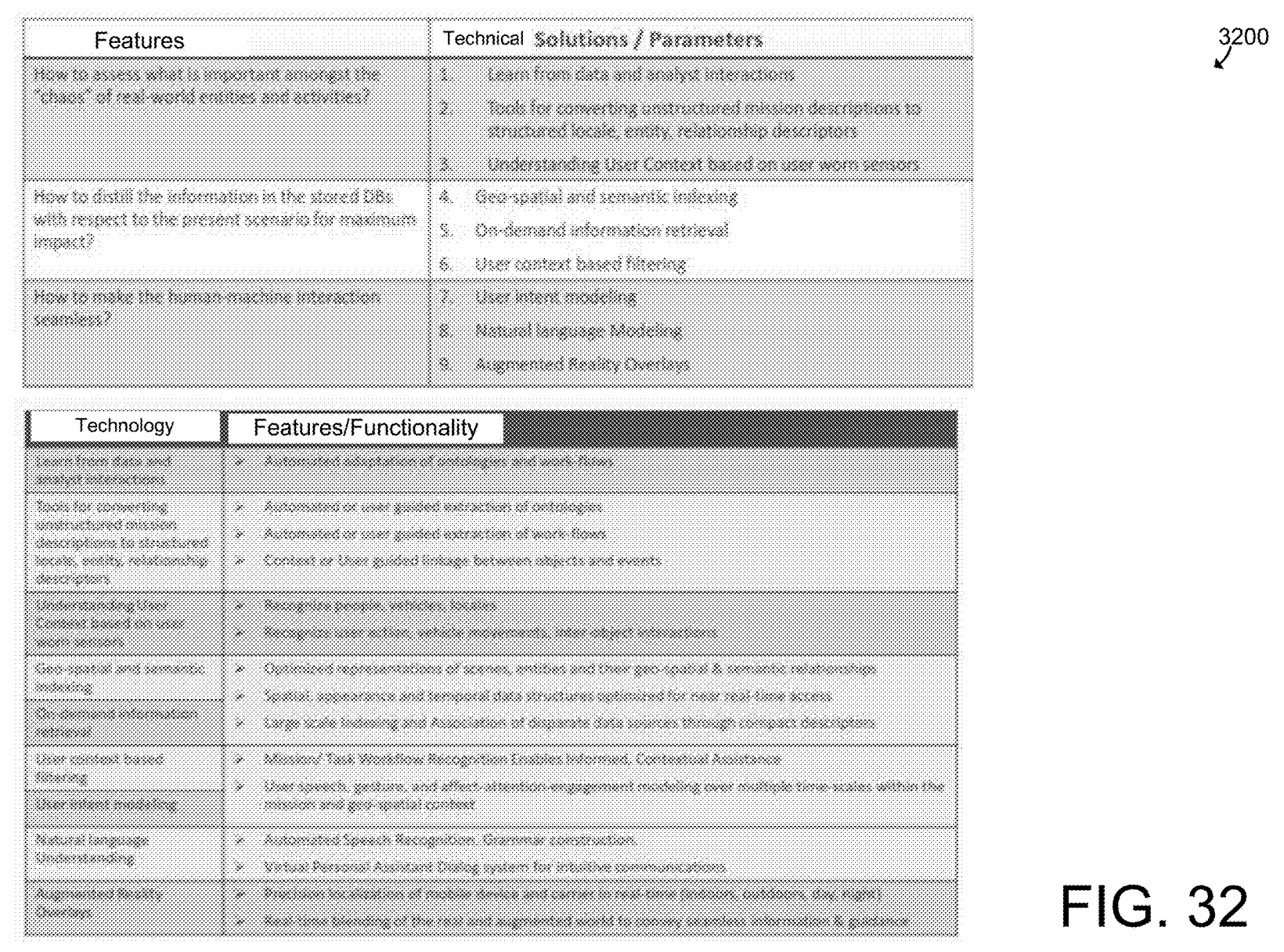

FIGS. 27, 28, and 32 illustrate further details of embodiments of the computing system 110. FIG. 27 provides illustrative examples of augmented reality devices that may be used in connection with the system 110. FIG. 28 provides an explanation of various different ways in which the system 110 may enable user interactions, including example query types, modes of image/entity selection, and modes of image/entity capture. FIG. 32 provides additional descriptions of features, functionality, and technology of embodiments of the system 110, including identification of components of the system that can perform different functionality.

Figure 3:
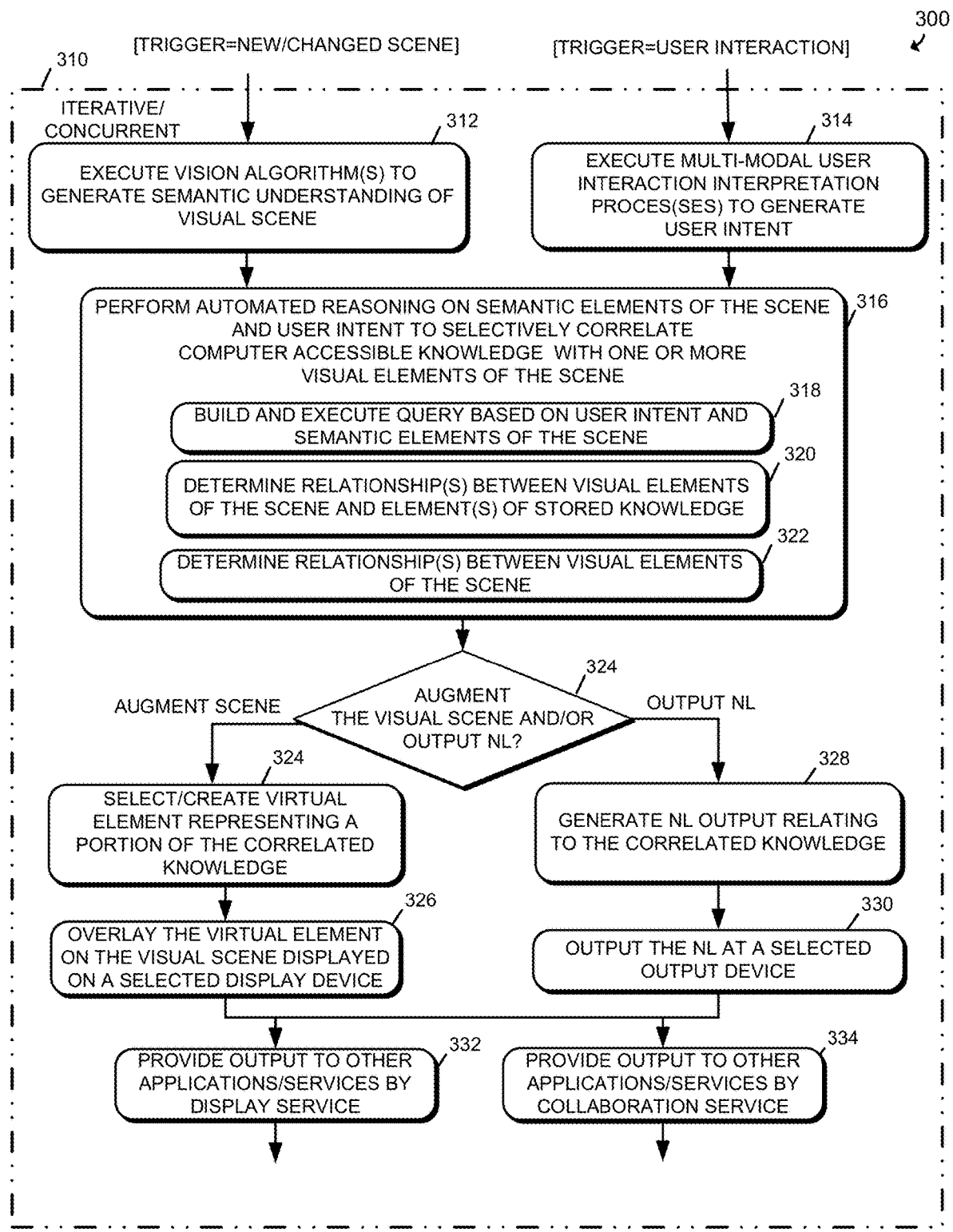
FIG. 3 is a simplified process flow diagram of at least one embodiment of a method for vision-based human-machine interaction, which may be performed by the computing system of FIG. 1.

Referring now to FIG. 3, an example of a method 300 by which the system 110 may provide a vision-based user interface is shown. The method 300 may be embodied as computerized programs, routines, logic and/or instructions executed by the computing system 110, for example by the platform 132. A loop 310 indicates portions of the method 300 that may be repeated iteratively and/or concurrently, for example if there are multiple rounds of dialog/interaction between the person 104 and the platform 132, or with respect to the dynamic scene understanding regarding different visual features of the real world scene 100.

The operations at block 312 may be initiated in response to the system 110 detecting a new real world scene 100 or a change to an existing scene, or after expiration of a time interval, for example. At block 312, the system 110 analyzes video depicting a real world scene, extracts semantic elements from the visual scene, and generates a semantic understanding of the visual scene. To do this, the system 110 executes one or more computer vision algorithms, including object detection algorithms, scene recognition and localization algorithms, and/or occlusion reasoning algorithms. As used herein, "semantic element" may refer to a tag or label, such as a metatag, which describes a visual feature of the scene (e.g., an object or activity name or type, category, or class).

The operations at block 314 may be initiated in response to the system 110 detecting a new user interaction, such as a gesture or speech, or after expiration of a time interval, for example. At block 314, the system 110 interprets user input. The user input may include, for example, NL dialog, gestures, or other human-computer interactions, or a combination of different human interactions. For example, the user input may include a verbal request, such as "who is the person in red jacket," or movement of the user with respect to a part of the real world scene 100 (e.g., pointing to an object). The user input is interpreted by determining an intent of the person 104 with respect to the real world scene 100 and/or a current state of the real world scene 100. To do this, the system 110 generates semantic interpretations for the different forms of input, and merges and correlates the different multi-modal inputs using, e.g., stored models.

Figure 17:
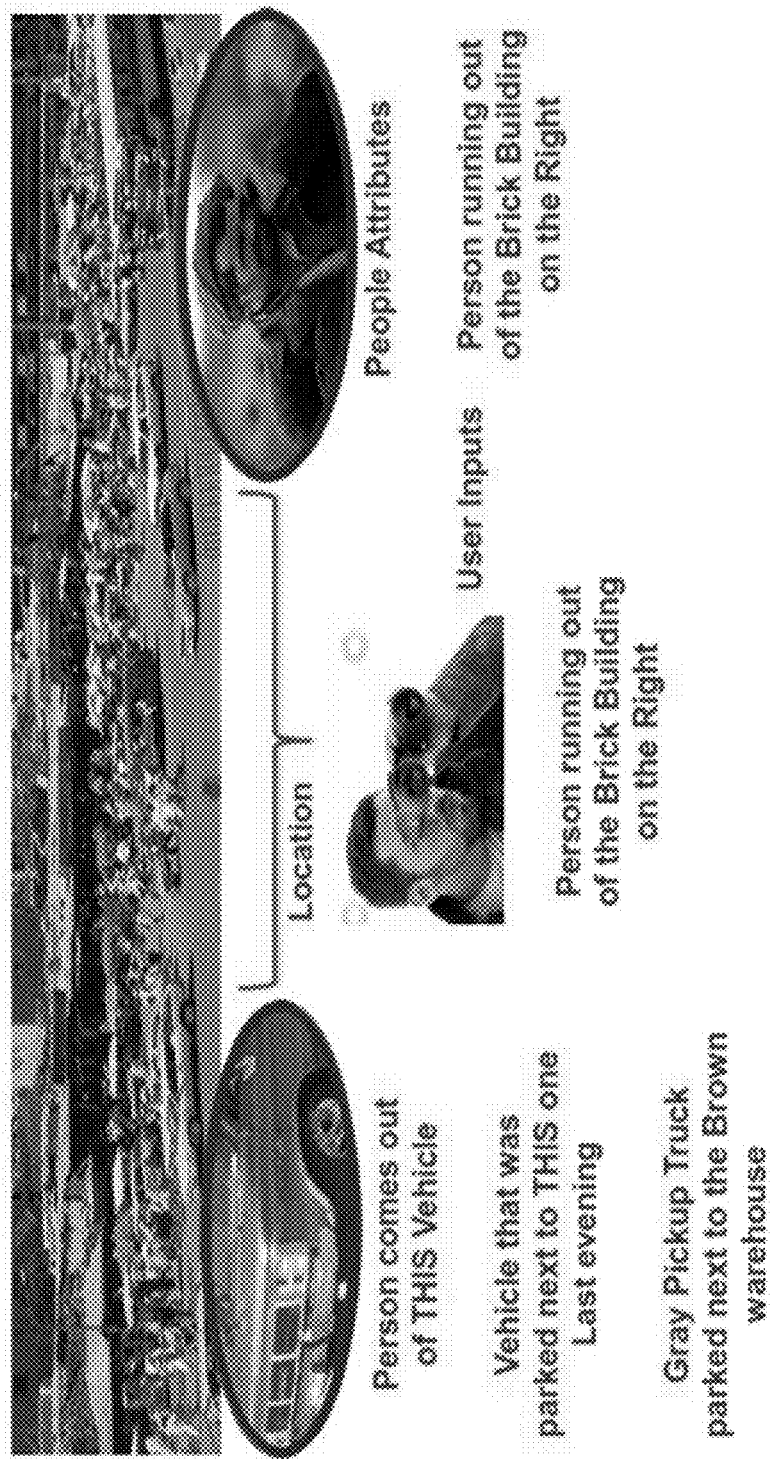
FIG. 17 is a simplified schematic illustration of single entity and multiple entity contextual and relational cues that may be detected by the computing system of FIG. 1.

At block 316, the system 110 determines what to do in response to the user interaction interpreted at block 314 and the visual scene interpreted at block 312. To do this, the system 110, e.g., the reasoning subsystem 230, evaluates the intent/state determined at block 314 and the semantic understanding generated at block 312 by interfacing with, e.g., stored models and workflows, to determine an appropriate course of action. To do this, the system 110 may at block 316 perform functionality described above in connection with the dynamic information aperture. For example, in block 318, the system 110 may build and execute a query based on the user intent and semantic elements extracted from the scene (e.g., scene 100 at block 312). In block 320 the system 110 may determine relationship(s) between visual elements of the scene and elements of stored knowledge, e.g., based on backend knowledge 106, user interactions, or a combination thereof. In block 322, the system 110 may determine relationship(s) between different visual elements of the scene, based on backend knowledge 106, user interactions, or a combination thereof. FIGS. 5, 6 and 17 illustrate examples of the determination of entity and relational cues within a scene. FIGS. 5 and 6 are described above. FIG. 17 illustrates types of single entity and multiple entity relational cues that can be determined and used by the system 110 to tag portions of an image or video. Examples of single entity cues include location, vehicle, person. Example multiple entity cues may be developed based on attributes of the single entities and/or user inputs, for example. For instance, in FIG. 17, the user says, "there is a person running out of the brick building on the right" and the system 110 may then establish links between an image of the person, the brick building, the location of the brick building and the date/time information. Other examples of multi-entity relational cures, which may identify two or more entities and a relationship between them, include "person comes out of this vehicle" (where "this" vehicle is identified by a pointing gesture), "vehicle that was parked next to this one last evening") (relationship includes a temporal component and a spatial component), and "gray pickup truck parked next to brown warehouse" (color used as an attribute/identifier).

If at block 324 the system 110 determines to output a virtual element (e.g., a graphical overlay) on the scene 100, the system 110 proceeds to block 324. At block 324, the system 110 selects virtual element(s) 142 (e.g., an augmented reality overlay) that represent a portion of the stored knowledge correlated with visual feature(s) of the scene 100, in accordance with the system 110's interpretation of the user input at block 314. At block 326, the system 110 displays the virtual element(s) selected at block 324 on the view of the scene. In doing so, the system 110 may align the virtual element with the corresponding visual feature in the scene so that the virtual element directly overlays or is adjacent to the view of the visual feature.

If at block 324 the system 110 determines to output NL speech, the system at blocks 328, 330 selects and outputs the appropriate NL speech 146 (using, e.g., an NL output generator and one or more pre-recorded or system-generated speech samples). In block 332, the system 110 may provide output (e.g., virtual element overlays and/or NL output) to one or more other applications/services (e.g., applications/services 134), by one or more display services 250, for example. In block 334, the system 110 may provide output (e.g., virtual element overlays and/or NL output) to one or more other applications/services (e.g., messaging, mapping, travel, social media), by one or more collaboration services 258, for example.

If executing the system 110 is to continue, the system 110 may record user feedback observed in response to the presentation of virtual elements and/or the presentation of NL output, analyze the user feedback over time (using, e.g., machine learning algorithms), and incorporate the output of the machine learning into one or more of the stored models, knowledge base, and/or other components of the platform 132. The system 110 may return and continues analyzing subsequent frame(s) of the video 122. If the system 110 determines not to continue executing, the method 300 may conclude (e.g., power off) or suspend (e.g., the system 110 may enter a "sleep" mode after a timeout period, until further inputs are detected).

Example Usage Scenarios

Figure 31:
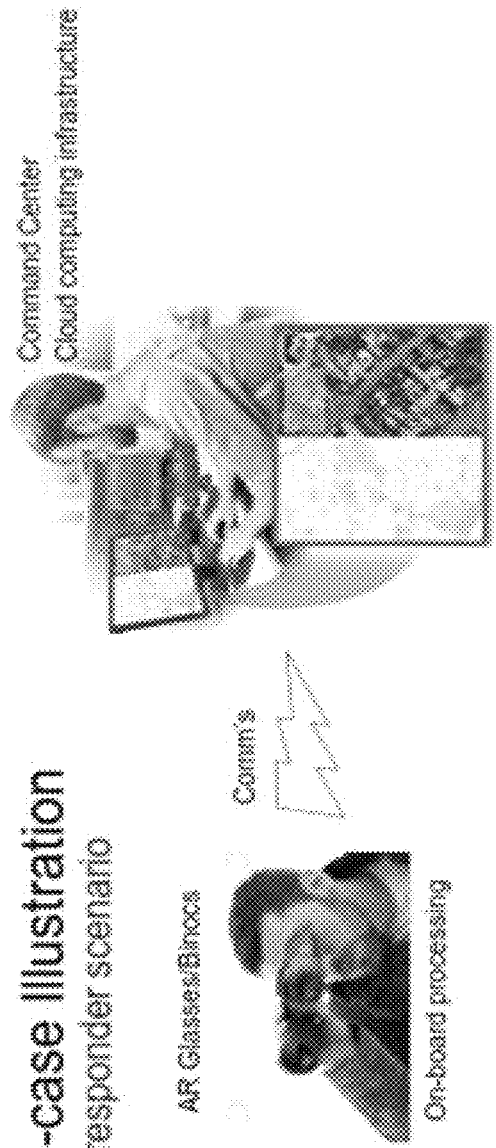
FIG. 31 is a simplified illustration of another use case scenario for at least one embodiment of the computing system of FIG. 1.

Referring now to FIGS. 5-13 and 30-31, illustrative embodiments of the system 110 are shown in operation. FIGS. 5-13 are described above and in the annotations made directly on the figures, as mentioned above. FIG. 30 illustrates a use of an embodiment 3000 of the system 110 to provide contextual data collection and assistance to a "first responder" team, 3002. A member of the team 3002 issues a natural language query 3004. In response, aspects of the system 110 perform the multimodal data collection tasks identified by elements (1) through (5). In FIG. 31, an embodiment 3100 of the system 110 is used to facilitate collaboration between two users, e.g., an observer in the field using AR technology and an analyst at a command station using desktop/laptop computing technology. FIG. 31 illustrates and maps the different functional components of the system 110 that may be used to provide multi-user collaborative features of the system 110.

Implementation Examples

Figure 4:
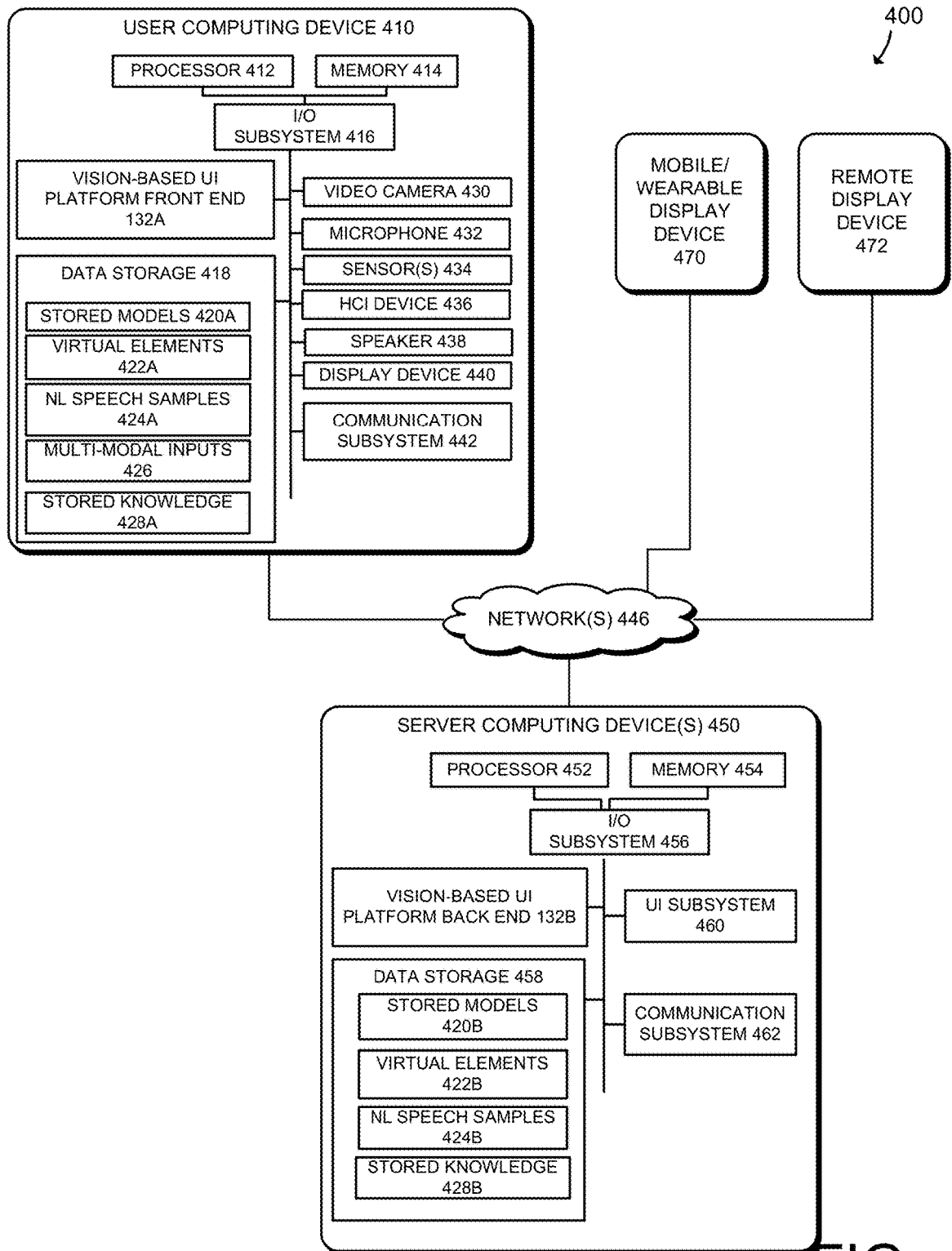
FIG. 4 is a simplified block diagram of an exemplary computing environment in connection with which at least one embodiment of the system of FIG. 1 may be implemented.

Referring now to FIG. 4, a simplified block diagram of an embodiment of the computing system 110 is shown. While the illustrative embodiment 400 is shown as involving multiple components and devices, it should be understood that the computing system 110 may constitute a single computing device, alone or in combination with other devices. For example, the computing device 130 shown in FIG. 1 may be embodied as a single computing device (e.g., computing device 410) or a combination of computing devices (e.g., devices 410, 450). The embodiment 400 includes a user computing device 410, which embodies features and functionality of a "client-side" or "front end" portion 132A of the platform 132 depicted in FIG. 1, and a server computing device 450, which embodies features and functionality of a "server-side" or "back end" portion 132B of the platform 132. The embodiment 400 includes a mobile/wearable display device 470 and a remote display device 472, each of which, along with a display device 440 of the user computing device 410, may embody the functionality of the display device 138 described above. Each or any of the computing devices 410, 450, 470, 472 may be in communication with one another via one or more networks 446.

The platform 132 or portions thereof may be distributed across multiple computing devices that are connected to the network(s) 446 as shown. In other embodiments, however, the platform 132 may be located entirely on, for example, the computing device 410 or a computing device 470, 472. In some embodiments, portions of the platform 132 may be incorporated into other systems or computer applications. Such applications or systems may include, for example, commercial off the shelf (COTS) virtual personal assistant applications, help agent applications, and/or COTS augmented reality systems. As used herein, "application" or "computer application" may refer to, among other things, any type of computer program or group of computer programs, whether implemented in software, hardware, or a combination thereof, and includes self-contained, vertical, and/or shrink-wrapped software applications, distributed and cloud-based applications, and/or others. Portions of a computer application may be embodied as firmware, as one or more components of an operating system, a runtime library, an application programming interface (API), as a self-contained software application, or as a component of another software application, for example.

The illustrative user computing device 410 includes at least one processor 412 (e.g. a microprocessor, microcontroller, digital signal processor, etc.), memory 414, and an input/output (I/O) subsystem 416. The computing device 410 may be embodied as any type of computing device capable of performing the functions described herein, such as a personal computer (e.g., desktop, laptop, tablet, smart phone, body-mounted device, wearable device, etc.), a server, an enterprise computer system, a network of computers, a combination of computers and other electronic devices, or other electronic devices. Although not specifically shown, it should be understood that the I/O subsystem 416 typically includes, among other things, an I/O controller, a memory controller, and one or more I/O ports. The processor 412 and the I/O subsystem 416 are communicatively coupled to the memory 414. The memory 414 may be embodied as any type of suitable computer memory device (e.g., volatile memory such as various forms of random access memory).

The I/O subsystem 416 is communicatively coupled to a number of hardware and/or software components, including the platform 132, a video camera 430 (e.g., the video camera 114), a number of sensors 434 (e.g., the location/orientation sensor(s) 118), a microphone 432 (e.g., the microphone 116), one or more speakers 438 (e.g., the speaker(s) 148), the display device 440, and one or more HCI devices 436 (e.g., the human-computer interface device 120). The camera 430, the sensor(s) 434, the microphone 432, the speaker(s) 438, the display device 440, and the HCI device 436 may form part of a user interface subsystem, which includes one or more user input devices (e.g., a touchscreen, keyboard, virtual keypad, microphone, etc.) and one or more output devices (e.g., speakers, displays, LEDs, etc.). The I/O subsystem 416 is also communicatively coupled to one or more storage media 418 and a communication subsystem 442. It should be understood that each of the foregoing components and/or systems may be integrated with the computing device 410 or may be a separate component or system that is in communication with the I/O subsystem 416 (e.g., over a network 446 or a bus connection).

The storage media 418 may include one or more hard drives or other suitable data storage devices (e.g., flash memory, memory cards, memory sticks, and/or others). In some embodiments, portions "A" of the platform 132, e.g., the stored models 420, the virtual elements 422, the NL speech samples 424, stored knowledge 428, and the multi-modal inputs 426 (e.g., the video 122, audio 124, location/orientation data 126, and HCI data 128), and/or other data, reside at least temporarily in the storage media 1718. Portions of the platform 132, e.g., the stored models 420, the virtual elements 422, the NL speech samples 424, stored knowledge 428, and the multi-modal inputs 426 (e.g., the video 122, audio 124, location/orientation data 126, and HCI data 128), and/or other data may be copied to the memory 414 during operation of the computing device 410, for faster processing or other reasons.

The communication subsystem 428 communicatively couples the user computing device 410 to one or more other devices, systems, or communication networks, e.g., a local area network, wide area network, personal cloud, enterprise cloud, public cloud, and/or the Internet, using, e.g., client/server and/or peer-to-peer networking technology. Accordingly, the communication subsystem 442 may include one or more wired or wireless network interface software, firmware, or hardware, for example, as may be needed pursuant to the specifications and/or design of the particular embodiment of the system 110.

The mobile/wearable display device 470, the remote display device 472, and the server computing device 450 each may be embodied as any suitable type of computing device capable of performing the functions described herein, such as any of the aforementioned types of devices or other electronic devices. For example, in some embodiments, the server computing device 450 may include one or more server computers including storage media 458, which may be used to store portions "B" of the platform 132, the stored models 420, the virtual elements 422, the NL speech samples 424, stored knowledge 428, and the multi-modal inputs 426 (e.g., the video 122, audio 124, location/orientation data 126, and HCI data 128), and/or other data. The illustrative server computing device 450 also includes a user interface subsystem 460, and a communication subsystem 462. In general, components of the server computing device 450 having similar names to components of the computing device 1710 described above may be embodied similarly. Further, each of the computing devices 470, 472 may include components similar to those described above in connection with the user computing device 410 and/or the server computing device 450. The computing system 400 may include other components, sub-components, and devices not illustrated in FIG. 4 for clarity of the description. In general, the components of the computing system 400 are communicatively coupled as shown in FIG. 4 by signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

In an example 1, a vision-based user interface platform for a computing system including one or more computing devices, includes a plurality of instructions embodied in memory accessible by a processor of at least one of the computing devices, where the instructions are configured to cause the computing system to: execute one or more image processing algorithms to extract one or more semantic elements from a scene depicted in a video, wherein the one or more semantic elements are descriptive of one or more visual features of the scene; execute one or more user interaction interpretation processes to determine an intent of a user viewing the scene in relation to the computing system; based on the user intent, execute an automated reasoning process to generate a correlation between at least one of the visual elements extracted from the scene and stored knowledge accessible to the computing system; and augment the scene with a virtual element relating to the correlation between the at least one visual elements extracted from the scene and the knowledge accessible to the computing system.

An example 2 includes the subject matter of example 1, wherein the instructions are configured to cause the computing system to construct a query comprising one or more search terms relating to one or more of the semantic elements. An example 3 includes the subject matter of example 1 or example 2, wherein the instructions are configured to cause the computing system to determine a relationship between a visual element of the scene and an element of knowledge accessible to the computing system and store data indicative of the relationship in computer memory. An example 4 includes the subject matter of any of examples 1-3, wherein the instructions are configured to cause the computing system to augment the scene with a virtual element representative of the relationship between the visual element and the element of knowledge. An example 5 includes the subject matter of any of examples 1-4, wherein the instructions are configured to cause the computing system to, based on the stored knowledge, determine a relationship between two different visual elements of the scene. An example 6 includes the subject matter of any of examples 1-5, wherein the instructions are configured to cause the computing system to augment the scene with a virtual element representative of the relationship between the two different visual elements of the scene. An example 7 includes the subject matter of any of examples 1-6, wherein the instructions are configured to cause the computing system to determine an active context of the user based on sensor data and select a display device for display of the virtual element based on the active context. An example 8 includes the subject matter of any of examples 1-7, wherein the instructions are configured to cause the computing system to display the virtual element on a display device of another user connected to the computing system. An example 9 includes the subject matter of any of examples 1-8, wherein the instructions to execute one or more user interaction interpretation processes are configured to process a plurality of sensor inputs to determine, based on the processing of the sensor inputs, a multi-modal interaction of the user with the computing system, wherein the multi-modal interaction comprises at least two of speech, gesture, gaze, touch, body motion, and facial expression, and the instructions to execute one or more user interaction interpretation processes are configured to determine a multi-modal intent of the user based on the multi-modal interaction, and the instructions to execute an automated reasoning process are configured to generate the correlation based on the multi-modal user intent. An example 10 includes the subject matter of any of examples 1-9, wherein the scene comprises a view of a live real world scene, and the instructions are configured to cause the computing system to augment the view of the live real world scene with the virtual element.

In an example 11, a vision-based communication platform for a computing system including one or more computing devices, includes a plurality of instructions embodied in memory accessible by a processor of at least one of the computing devices, where the instructions are configured to cause the computing system to: execute one or more image processing algorithms to extract one or more semantic elements from a scene depicted in a video, wherein the one or more semantic elements are descriptive of one or more visual features of the scene; execute one or more user interaction interpretation processes to determine an intent of a user viewing the scene in relation to the computing system; based on the user intent, augment the scene with a virtual element relating to the one or more of the semantic elements; and augment a view of the scene depicted on a display device of another user of the computing system with the virtual element. An example 12 includes the subject matter of example 11, wherein the scene comprises a view of a live real world scene, and the instructions are configured to cause the computing system to augment the other user's view of the live real world scene with the virtual element in real time.

In an example 13, a method for augmenting a scene of a video includes, with a computing system comprising one or more computing devices including at least one display device: executing one or more image processing algorithms to extract one or more semantic elements from a scene depicted in a video, wherein the one or more semantic elements are descriptive of one or more visual features of the scene; executing one or more user interaction interpretation processes to determine an intent of a user viewing the scene in relation to the computing system; retrieving stored knowledge relating to one or one or more of the semantic elements; filtering the stored knowledge based on the user intent; executing an automated reasoning process to generate a correlation between at least one of the semantic elements extracted from the scene and at least a portion of the filtered stored knowledge; and augmenting the scene with a virtual element relating to the correlation between the at least one visual elements extracted from the scene and the knowledge accessible to the computing system.

An example 14 includes the subject matter of example 13, and includes performing the determining of the user intent over time and dynamically re-performing the filtering as the user intent changes over time. An example 15 includes the subject matter of example 13 or example 14, and includes performing the extracting of the semantic elements over time and dynamically re-performing the filtering as the semantic elements change over time.

In an example 16, a method for constructing a query includes, with a computing system comprising one or more computing devices including at least one display device: executing one or more image processing algorithms to extract one or more visual features from a scene depicted in a video; executing one or more user interaction interpretation processes to determine an intent of a user viewing the scene in relation to the computing system; selecting a plurality of search terms relating to the user intent and one or one or more of the extracted visual features; constructing a query comprising the selected search terms; and augmenting the scene with a virtual element comprising data retrieved in response to execution of the query.

An example 17 includes the subject matter of example 16, and includes: extracting at least two different visual features from the scene depicted in the video; selecting a plurality of search terms relating to the at least two different visual features; and constructing a query comprising the selected search terms. An example 18 includes the subject matter of example 17, and includes determining a relationship between the at least two different visual features, and constructing the query to include at least one search term indicative of the relationship between the at least two different visual features. An example 19 includes the subject matter of example 17 or example 18, and includes retrieving stored knowledge relating to at least one of the extracted visual features, determining a relationship between the at least two different visual features based on the retrieved stored knowledge, and constructing the query to include at least one search term indicative of the relationship between the at least two different visual features. An example 20 includes the subject matter of any of examples 17-19, and includes retrieving stored knowledge relating to at least one of the extracted visual features, and constructing the query to include at least one search term indicative of the retrieved stored knowledge.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation (e.g., Java, Python, C++, etc.). In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. A vision-based user interface platform for a computing system comprising one or more computing devices, the platform comprising a plurality of instructions embodied in memory accessible by a processor of at least one of the computing devices, the instructions configured to cause the computing system to:

execute one or more image processing algorithms to extract one or more semantic elements from a scene depicted in a video, wherein the one or more semantic elements are descriptive of one or more visual features of the scene;

execute one or more user interaction interpretation processes to determine an intent of a user viewing the scene in relation to the computing system;

based on the user intent, execute an automated reasoning process to generate a correlation between at least one of the one or more visual features and stored knowledge accessible to the computing system;

based on the user intent, execute an automated reasoning process, which compares information from the stored knowledge to the one or more semantic elements extracted from the scene and descriptive of the one or more visual features of the scene, to automatically determine a previously unknown relationship between at least two different ones of the one or more visual features of the scene; and augment the scene with a virtual element relating to at least one of the relationship between the at least two different ones of the one or more visual features and the correlation between the at least one of the one or more visual features and the stored knowledge accessible to the computing system.

2. The platform of claim 1, wherein the instructions are configured to cause the computing system to construct a query comprising one or more search terms relating to one or more of the semantic elements extracted from the scene.

3. The platform of claim 1 or claim 2, wherein the instructions are configured to cause the computing system to determine a relationship between a visual feature of the scene and an element of knowledge accessible to the computing system and store data indicative of the relationship in computer memory.

4. The platform of claim 1 or claim 2, wherein the instructions are configured to cause the computing system to augment the scene with a virtual element representative of the relationship between the visual feature and the element of knowledge.

5. The platform of claim 1 or claim 2, wherein the instructions are configured to cause the computing system to augment the scene with a virtual element representative of the relationship between the two different visual features of the scene.

6. The platform of claim 1 or claim 2, wherein the instructions are configured to cause the computing system to determine an active context of the user based on sensor data and select a display device for display of the virtual element based on the active context.

7. The platform of claim 1 or claim 2, wherein the instructions are configured to cause the computing system to display the virtual element on a display device of another user connected to the computing system.

8. The platform of claim 1 or claim 2, wherein the instructions to execute one or more user interaction interpretation processes are configured to process a plurality of sensor inputs to determine, based on the processing of the sensor inputs, a multi-modal interaction of the user with the computing system, wherein the multi-modal interaction comprises at least two of speech, gesture, gaze, touch, body motion, and facial expression, and the instructions to execute one or more user interaction interpretation processes are configured to determine a multi-modal intent of the user based on the multi-modal interaction, and the instructions to execute an automated reasoning process are configured to generate the correlation based on the multi-modal user intent.

9. The platform of claim 1 or claim 2, wherein the scene comprises a view of a live real world scene, and the instructions are configured to cause the computing system to augment the view of the live real world scene with the virtual element.

10. A vision-based communication platform for a computing system comprising one or more computing devices, the platform comprising a plurality of instructions embodied in memory accessible by a processor of at least one of the computing devices, the instructions configured to cause the computing system to:

execute one or more image processing algorithms to extract one or more semantic elements from a scene depicted in a video, wherein the one or more semantic elements are descriptive of one or more visual features of the scene;

execute one or more user interaction interpretation processes to determine an intent of a user viewing the scene in relation to the computing system;

execute an automated reasoning process, which compares information from the stored knowledge to the one or more semantic elements extracted from the scene and descriptive of the one or more visual features of the scene, to automatically determine a previously unknown relationship between at least two different ones of the one or more visual features of the scene;

based on the user intent, augment the scene with a virtual element relating to the relationship between the at least two different ones of the one or more visual features; and communicate the virtual element to a display device of another user of the computing system to augment a view of the scene depicted on the display device of the other user of the computing system with the virtual element.

11. The platform of claim 10, wherein the scene comprises a view of a live real world scene, and the instructions are configured to cause the computing system to augment the other user's view of the live real world scene with the virtual element in real time.

12. A method for augmenting a scene of a video, the method comprising, with a computing system comprising one or more computing devices including at least one display device:

executing one or more image processing algorithms to extract one or more semantic elements from a scene depicted in a video, wherein the one or more semantic elements are descriptive of one or more visual features of the scene;

executing one or more user interaction interpretation processes to determine an intent of a user viewing the scene in relation to the computing system;

retrieving stored knowledge relating to one or one or more of the semantic elements;

filtering the stored knowledge based on the user intent;

executing an automated reasoning process, which compares information from the stored knowledge to the one or more semantic elements extracted from the scene, to automatically determine a previously unknown relationship between two different visual elements of the scene; and augmenting the scene with a virtual element relating to at least one of the relationship between the at least two different ones of the one or more visual features and the correlation between the at least one of the one or more visual features and the stored knowledge accessible to the computing system.

13. The method of claim 12, comprising performing the determining of the user intent over time and dynamically re-performing the filtering as the user intent changes over time.

14. The method of claim 12 or claim 13, comprising performing the extracting of the semantic elements over time and dynamically re-performing the filtering as the semantic elements change over time.

15. A method for constructing a query, the method comprising, with a computing system comprising one or more computing devices including at least one display device:
  executing one or more image processing algorithms to extract one or more visual features from a scene depicted in a video;
  executing one or more user interaction interpretation processes to determine an intent of a user viewing the scene in relation to the computing system;
  selecting a plurality of search terms relating to the user intent and one or more of the extracted visual features;
  constructing a query comprising the selected search terms and executing an automated reasoning process, which compares information from stored knowledge accessible to the computing system to the one or more visual features extracted from the scene, to determine a previously unknown relationship between at least two different ones of the one or more visual features of the scene; and
  augmenting the scene with a virtual element relating to at least one of the relationship between the at least two different ones of the one or more visual features and the correlation between the at least one of the one or more visual features and the stored knowledge accessible to the computing system.

16. The method of claim 15, comprising:
  extracting at least two different visual features from the scene depicted in the video;
  selecting a plurality of search terms relating to the at least two different visual features; and
  constructing a query comprising the selected search terms.

17. The method of claim 16, comprising determining a relationship between the at least two different visual features, and constructing the query to include at least one search term indicative of the relationship between the at least two different visual features.

18. The method of claim 16 or claim 17, comprising retrieving stored knowledge relating to at least one of the extracted visual features, determining a relationship between the at least two different visual features based on the retrieved stored knowledge, and constructing the query to include at least one search term indicative of the relationship between the at least two different visual features.

19. The method of claim 16 or claim 17, comprising retrieving stored knowledge relating to at least one of the extracted visual features, and constructing the query to include at least one search term indicative of the retrieved stored knowledge.

* * * * *